United States Patent
Kang et al.

(10) Patent No.: US 11,231,798 B2
(45) Date of Patent: Jan. 25, 2022

(54) TOUCHSCREEN DISPLAY DEVICE, TOUCH DRIVING CIRCUIT, AND DRIVING METHOD

(71) Applicant: LG Display Co., Ltd., Seoul (KR)

(72) Inventors: Seongkyu Kang, Paju-si (KR); SungChul Kim, Paju-si (KR); HoonBae Kim, Seoul (KR); SunYeop Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/883,426

(22) Filed: May 26, 2020

(65) Prior Publication Data

US 2020/0401258 A1 Dec. 24, 2020

(30) Foreign Application Priority Data

Jun. 20, 2019 (KR) .................. 10-2019-0073705

(51) Int. Cl.
| | | |
|---|---|---|
| *G06F 3/041* | (2006.01) | |
| *G09G 3/36* | (2006.01) | |
| *G09G 3/3275* | (2016.01) | |
| *G06F 3/044* | (2006.01) | |
| *G09G 3/20* | (2006.01) | |

(52) U.S. Cl.
CPC ............ *G06F 3/0412* (2013.01); *G06F 3/044* (2013.01); *G09G 3/2007* (2013.01); *G09G 3/3275* (2013.01); *G09G 3/3685* (2013.01); *G09G 2320/0276* (2013.01)

(58) Field of Classification Search
CPC ............... G06F 3/0412; G06F 3/04164; G06F 3/04166; G06F 3/0418; G06F 3/044; G06F 3/0443; G06F 3/0446; G09G 3/20; G09G 3/2007; G09G 3/3275; G09G 3/3685; G09G 3/3688; G09G 2320/0276
See application file for complete search history.

(56) References Cited

U.S. PATENT DOCUMENTS

| | | | | |
|---|---|---|---|---|
| 8,429,439 | B2* | 4/2013 | Asmanis | H04L 25/03878 713/503 |
| 9,024,913 | B1* | 5/2015 | Jung | G06F 3/04184 345/174 |
| 2006/0232316 | A1* | 10/2006 | Nomura | H03K 5/133 327/291 |
| 2008/0204422 | A1* | 8/2008 | Moon | H03K 17/9622 345/173 |
| 2009/0127005 | A1* | 5/2009 | Zachut | G06F 3/0446 178/18.03 |
| 2009/0213089 | A1* | 8/2009 | Hwang | G06F 3/0412 345/174 |
| 2012/0075220 | A1* | 3/2012 | Matsui | G06F 3/04166 345/173 |

(Continued)

*Primary Examiner* — Mihir K Rayan
(74) *Attorney, Agent, or Firm* — Fenwick & West LLP

(57) ABSTRACT

Provided are a touchscreen display device, a touch driving circuit, and a driving method. Image display and touch sensing are simultaneously performed and the interference between display driving and touch driving are minimized or removed, so that excellent image display and touch sensing performance is obtained. Poor touch sensitivity occurring in a specific area (e.g. an edge area) is reduced by using differential sensing sequence control, internal correction resistors of the touch driving circuit, and signal characteristics control.

18 Claims, 41 Drawing Sheets

(56) References Cited

U.S. PATENT DOCUMENTS

| | | | |
|---|---|---|---|
| 2013/0033439 A1* | 2/2013 | Kim | G02F 1/13338 |
| | | | 345/173 |
| 2013/0154998 A1* | 6/2013 | Yang | G06F 3/0418 |
| | | | 345/174 |
| 2014/0132526 A1* | 5/2014 | Lee | G06F 3/0412 |
| | | | 345/173 |
| 2016/0342265 A1* | 11/2016 | Geaghan | G06F 3/0446 |
| 2016/0374573 A1* | 12/2016 | Kashi | H03F 3/087 |
| | | | 600/479 |
| 2018/0107315 A1* | 4/2018 | Lee | G06F 3/044 |
| 2019/0114027 A1* | 4/2019 | Tanaka | G06F 3/0416 |
| 2019/0384475 A1* | 12/2019 | Kim | G06F 3/044 |
| 2019/0385551 A1* | 12/2019 | Kim | G06F 3/04184 |

\* cited by examiner

FIG.8
TDS
(Case 1)  TDS1    AMP1
(Case 2)  TDS2  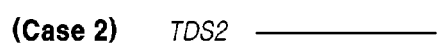
(Case 3)  TDS3  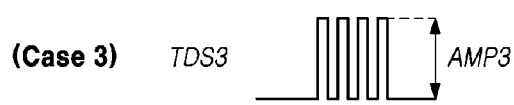  AMP3

(Case 1)

(Case 2)

(Case 3)

FIG.28

| Channel | RC [ns] |
|---------|---------|
| #1      | 250     |
| #2      | 245     |
| #3      | 240     |
| ...     | ...     |
| #11     | 200     |
| ...     | ...     |
| #35     | 80      |
| ...     | ...     |
| #43     | 40      |
| #44     | 35      |
| #45     | 30      |

RC Deviation = 5ns

RC Deviation = 5ns

RC Deviation = 50ns

RC Comparison :
30 ns → 80 ns
(166% Increased)

FIG.31

| Channel | RC [ns] |
|---------|---------|
| #1      | 250     |
| #2      | 245     |
| #3      | 240     |
| ...     | ...     |
| #11     | 200     |
| ...     | ...     |
| #35     | 80      |
| ...     | ...     |
| #43     | 40      |
| #44     | 35      |
| #45     | 30      |

RC Deviation = 5ns (between #2 and #3)

RC Deviation = 50ns (between #2 and #11)

RC Comparison:
250 ns → 200 ns
(20% Reduced)

RC Deviation = 5ns (between #43 and #44)

TOUCHSCREEN DISPLAY DEVICE, TOUCH DRIVING CIRCUIT, AND DRIVING METHOD

CROSS REFERENCE TO RELATED APPLICATION

This application claims priority from Republic of Korea Patent Application No. 10-2019-0073705, filed on Jun. 20, 2019, which is hereby incorporated by reference in its entirety.

BACKGROUND

Field

Embodiments relate to a touchscreen display device, a touch driving circuit, and a driving method.

Description of Related Art

Along with the development of the information society, demand for a variety of types of touchscreen display devices for displaying images is increasing. In this regard, a range of display devices, such as liquid crystal display (LCD) devices, plasma display devices, and organic light-emitting diode (OLED) display devices, have recently come into widespread use.

Among such display devices, touchscreen display devices provide a touch-based user interface enabling users to intuitively and conveniently input data or instructions directly to devices, rather than using a conventional data input system, such as buttons, a keyboard, or a mouse.

A touchscreen display device of the related art alternately performs image display and touch sensing in divided time segments, since both a display function (i.e. image display function) and a touch sensing function should be provided.

In the case of such time division driving, significantly elaborate timing control and thereto expensive components may be required to perform display driving and touch driving in a time division manner.

In addition, in the time division driving, both display driving time and touch driving time may be insufficient, thereby degrading image quality and touch sensitivity, which is problematic. In particular, due to the time division driving, high-resolution and high-quality images may not be provided, which is problematic.

In addition, in case of the touchscreen display device, a variety of driving times for the display driving and the touch driving are required, since a variety of driving environments may be present. However, the touchscreen display device of the related art may disadvantageously fail to provide a variety of driving times for the display driving and the touch driving.

In addition, the touchscreen display device may have the problem of poor touch sensitivity occurring especially in specific portions.

SUMMARY

Embodiments may provide a touchscreen display device, a data driving circuit, and a driving method able to simultaneously perform image display and touch sensing in an efficient manner.

Embodiments may provide a touchscreen display device, a data driving circuit, and a driving method able to minimize or remove the interference between display driving and touch driving while simultaneously performing the image display and the touch sensing, thereby obtaining excellent image display and touch sensing performance.

Embodiments may provide a touchscreen display device, a data driving circuit, and a driving method able to perform the touch sensing so as to minimize the influence of the display driving even in the case in which the touch sensing is performed simultaneously with the image display.

Embodiments may provide a touchscreen display device, a data driving circuit, and a driving method able to reduce poor touch sensitivity from occurring in a specific area (e.g. an edge area).

According to an aspect, embodiments may provide a touchscreen display device including: a display panel including a plurality of data lines, a plurality of gate lines, a plurality of touch electrodes, and a plurality of touch lines; and a touch driving circuit located on one side of the display panel, electrically connected to the plurality of touch electrodes through the plurality of touch lines, and differentially sensing at least two touch electrodes selected from among the plurality of touch electrodes.

The plurality of touch electrodes may include n number of touch electrodes disposed in order.

A first touch electrode among the n number of touch electrodes may be disposed farthest from the touch driving circuit. An nth touch electrode among the n number of touch electrodes may be disposed closest to the touch driving circuit During a first sensing timing period, the touch driving circuit may differentially sense a third touch electrode selected as a sensing touch electrode from among the n number of touch electrodes and a second touch electrode selected as a reference touch electrode from among the n number of touch electrodes.

In addition, during the first sensing timing period, the touch driving circuit may differentially sense the first touch electrode selected as a sensing touch electrode from among the n number of touch electrodes and the nth touch electrode selected as a reference touch electrode from among the n number of touch electrodes.

During a second sensing timing period different from the first sensing timing period, the touch driving circuit may differentially sense the nth touch electrode and an (n−1)th touch electrode by selecting the nth touch electrode as a sensing touch electrode for the differential sensing and the (n−1)th touch electrode as a reference touch electrode for the differential sensing.

In a touch electrode pair in which the first touch electrode is the sensing touch electrode and the nth touch electrode is the reference touch electrode, the reference touch electrode may have a smaller time constant than that of the sensing touch electrode.

In another touch electrode pair other than the touch electrode pair in which the first touch electrode is the sensing touch electrode and the nth touch electrode is the reference touch electrode, the reference touch electrode may have a greater time constant than that of the sensing touch electrode.

The touch driving circuit may include: a differential amplifier differentially sensing the two touch electrodes selected from among the plurality of touch electrodes; and a first correction resistor and a second correction resistor electrically connected between the two touch electrodes and the differential amplifier.

In the touch driving circuit, during the first sensing timing period, the differential amplifier may differentially sense the first touch electrode selected as the sensing touch electrode and the nth touch electrode selected as the reference touch electrode.

The first correction resistor may be electrically connected between the nth touch electrode selected as the reference touch electrode and the differential amplifier.

The second correction resistor may be electrically connected between the first touch electrode selected as the sensing touch electrode and the differential amplifier.

The first correction resistor and the second correction resistor may be variable resistors.

During the first sensing timing period, the first correction resistor may have a higher resistance than the second correction resistor.

According to another aspect, embodiments may provide a touchscreen display device including: a display panel including a plurality of data lines, a plurality of gate lines, a plurality of touch electrodes, and a plurality of touch lines; a gate driving circuit sequentially outputting gate signals to the plurality of gate lines; a data driving circuit outputting data signals, converted from digital image signals in response to a gamma reference voltage, to the plurality of data lines; a touch driving circuit outputting a touch electrode driving signal to at least one touch electrode among the plurality of touch electrodes; a first power circuit supplying the touch electrode driving signal to the touch driving circuit; and a second power circuit supplying the gamma reference voltage, signal characteristics of which correspond to those of the touch electrode driving signal, to the data driving circuit.

The touchscreen display device may further include a delay resistor disposed on a path through which the touch electrode driving signal is transferred from the first power circuit to the display panel through the touch driving circuit.

A voltage variation gradient of the touch electrode driving signal between the delay resistor and the display panel may be smaller than a voltage variation gradient of the touch electrode driving signal between the first power circuit and the delay resistor.

According to another aspect, embodiments may provide a touchscreen display device including: a display panel including a plurality of data lines, a plurality of gate lines, a plurality of touch electrodes, and a plurality of touch lines; a gate driving circuit sequentially outputting gate signals to the plurality of gate lines; a data driving circuit outputting data signals, converted from digital image signals in response to a plurality of gamma reference voltages, to the plurality of data lines; a touch driving circuit outputting a touch electrode driving signal to at least one touch electrode among the plurality of touch electrodes; a first power circuit supplying the touch electrode driving signal to the touch driving circuit; and a second power circuit supplying the plurality of gamma reference voltages, signal characteristics of which correspond to those of the touch electrode driving signal, to the data driving circuit.

The touchscreen display device may further include rapid resistors disposed on a circuit generating one or more gamma reference voltages among the plurality of gamma reference voltages or disposed on a path through which one or more gamma reference voltages among the plurality of gamma reference voltages are transferred.

The second power circuit may include a plurality of voltage distribution circuits outputting the plurality of gamma reference voltages as distribution voltages.

Each of the voltage distribution circuits may include distribution resistors connected between a modulation driving voltage and a modulated base voltage.

The distribution resistors in a voltage distribution circuit outputting a lowest gamma reference voltage, among the voltage distribution circuits, may have a lower resistance than the distribution resistors in another voltage distribution circuit among the voltage distribution circuits.

The distribution resistors in a voltage distribution circuit outputting a lowest gamma reference voltage, among the voltage distribution circuits, may be the rapid resistors.

A touch power circuit including the first power circuit and the second power circuit may be a single touch power integrated circuit (IC). Alternatively, in the first power circuit and the second power circuit of the touch power integrated circuit, the first power circuit may be included in a touch power integrated circuit, and the second power circuit may be provided outside the touch power integrated circuit.

According to another aspect, embodiments may provide a method of driving a touchscreen display device including a display panel including a plurality of data lines, a plurality of gate lines, a plurality of touch electrodes, and a plurality of touch lines, the method including: differentially sensing, by the touch driving circuit, two touch electrodes selected from among the plurality of touch electrodes; and detecting a touch according to a result of the differential sensing.

The plurality of touch electrodes may include n number of touch electrodes disposed in order.

A first touch electrode among the n number of touch electrodes may be disposed farthest from the touch driving circuit. An nth touch electrode among the n number of touch electrodes may be disposed closest to the touch driving circuit.

In the differential sensing, the touch driving circuit may differentially sense a third touch electrode selected as a sensing touch electrode from among the n number of touch electrodes and a second touch electrode selected as a reference touch electrode from among the n number of touch electrodes. In addition, the touch driving circuit may differentially sense the first touch electrode selected as a sensing touch electrode from among the n number of touch electrodes and the nth touch electrode selected as a reference touch electrode from among the n number of touch electrodes.

According to another aspect, embodiments may provide a touch driving circuit of a touchscreen display device including a display panel including a plurality of data lines, a plurality of gate lines, a plurality of touch electrodes, and a plurality of touch lines, the touch driving circuit includes: a differential amplifier differentially sensing two touch electrodes selected from among the plurality of touch electrodes; and an analog-to-digital converter outputting a sensing value in accordance with an output signal of the differential amplifier.

The touch driving circuit may be located on one side of the display panel.

The plurality of touch electrodes may include n number of touch electrodes disposed in order.

A first touch electrode among the n number of touch electrodes may be disposed farthest from the touch driving circuit. An nth touch electrode among the n number of touch electrodes may be disposed closest to the touch driving circuit.

The differential amplifier may differentially sense a third touch electrode selected as a sensing touch electrode from among the n number of touch electrodes and a second touch electrode selected as a reference touch electrode from among the n number of touch electrodes.

In addition, the differential amplifier may differentially sense the first touch electrode selected as a sensing touch electrode from among the n number of touch electrodes and the nth touch electrode selected as a reference touch electrode from among the n number of touch electrodes.

According to embodiments, the image display and the touch sensing may be simultaneously performed in an efficient manner.

According to embodiments, it may be possible to minimize or remove the interference between display driving and touch driving while simultaneously performing the image display and the touch sensing, thereby obtaining excellent image display and touch sensing performance.

According to embodiments, even in the case in which the touch sensing is performed simultaneously with the image display, the touch sensing may be performed so as to minimize the influence of the display driving.

According to the embodiments, it may be possible to reduce poor touch sensitivity from occurring in a specific area (e.g. an edge area). In particular, touch sensing performance in the edge area adjacent to the touch driving circuit TDC may be improved.

BRIEF DESCRIPTION OF THE DRAWINGS

FIG. 8 is a diagram illustrating touch electrode driving signals according to the three cases of the time-free driving of the touchscreen display device according to embodiments;

FIG. 28 is a diagram illustrating channel-specific time constants in the differential sensing of FIG. 27 according to embodiments;

FIG. 31 is a diagram illustrating channel-specific time constants in the differential sensing method illustrated in FIGS. 29 and 30 according to embodiments;

DETAILED DESCRIPTION

Figure 1:
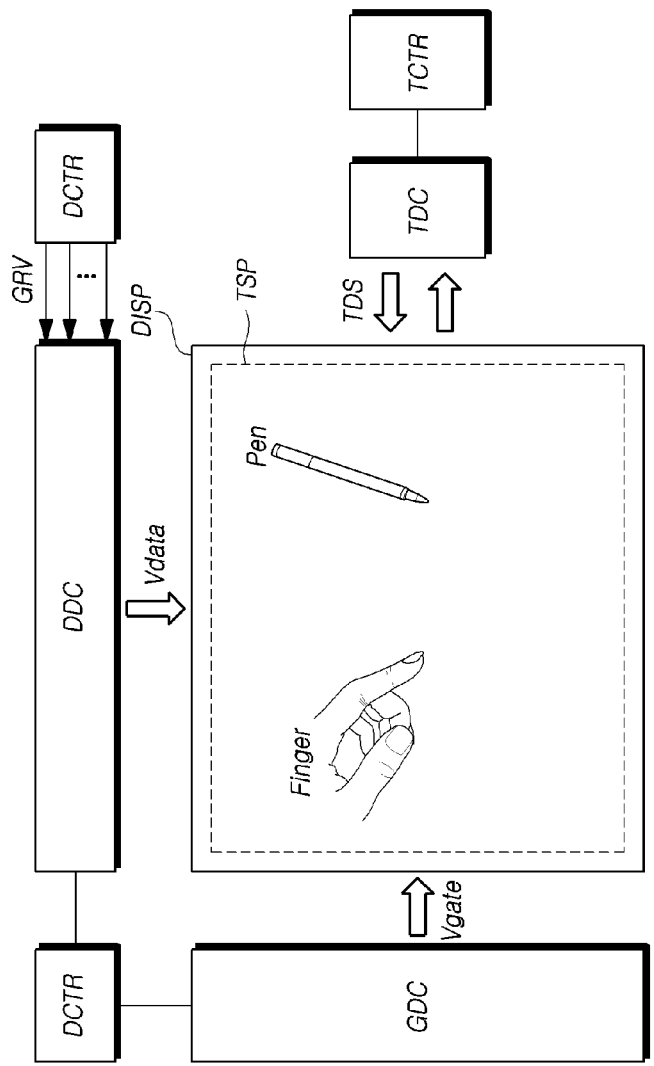
FIG. 1 is a schematic diagram illustrating a system configuration of a touchscreen display device according to embodiments.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as "including", "having", "containing", "constituting", "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present invention. Each of these terms is not used to define essence, order, sequence, number of elements, etc., but is used merely to distinguish the corresponding element from other elements.

When it is mentioned that a first element "is connected or coupled to", "contacts or overlaps", etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc., each other.

When time relative terms, such as "after", "subsequent to", "next", "before", and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
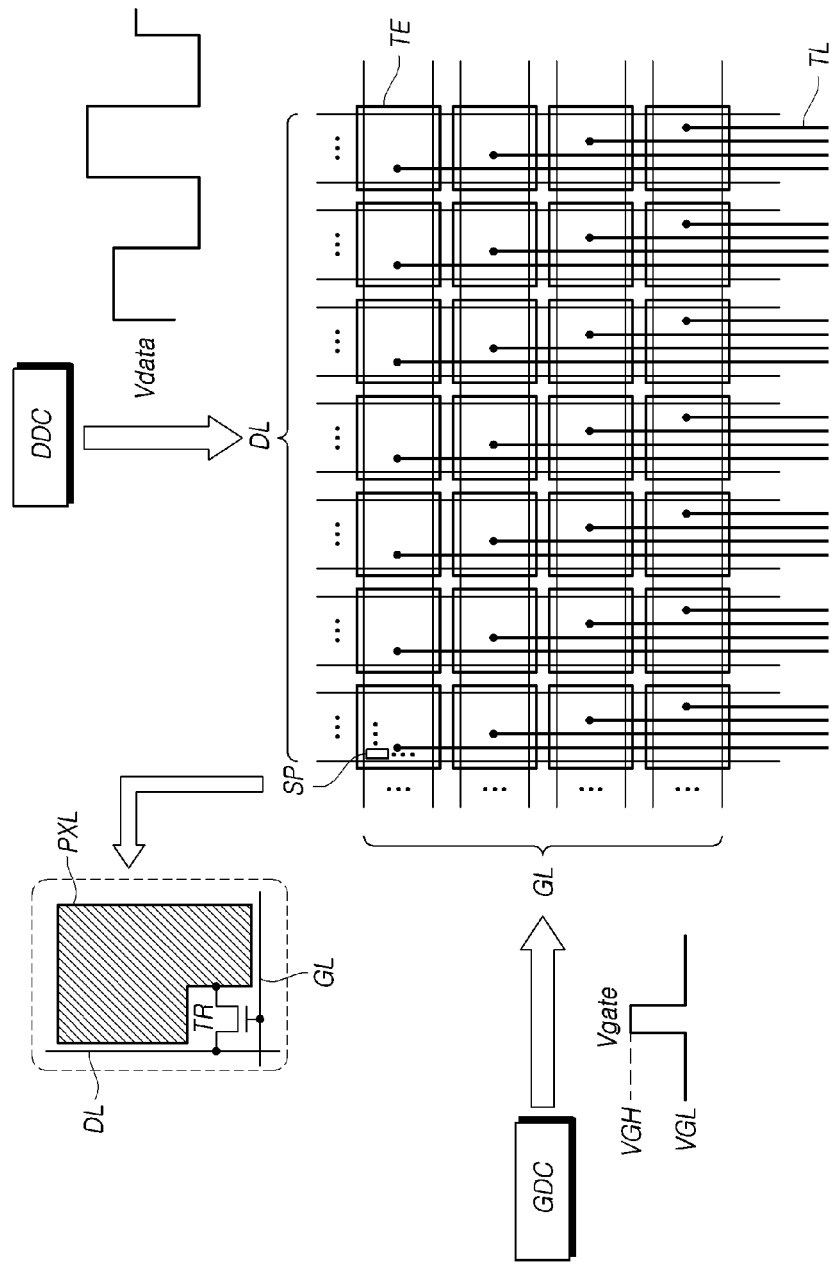
FIG. 2 is a schematic diagram illustrating display driving of the touchscreen display device according to embodiments.
Figure 3:
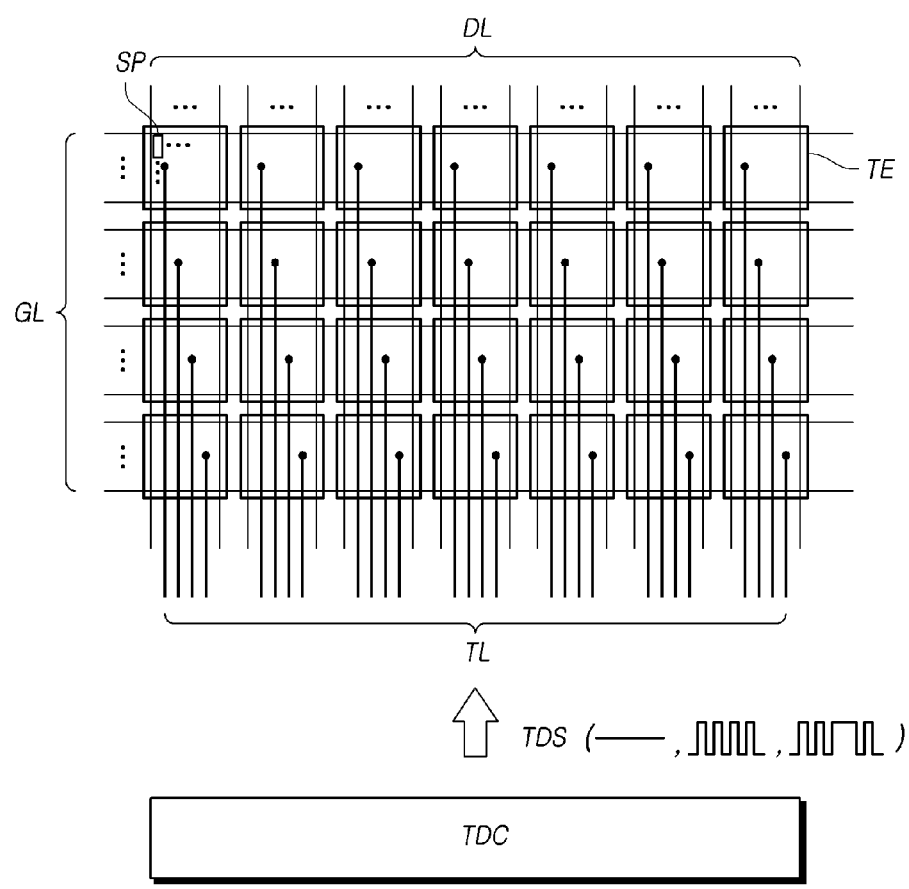
FIG. 3 is a schematic diagram illustrating touch driving of the touchscreen display device according to embodiments.

FIG. 1 is a schematic diagram illustrating a system configuration of a touchscreen display device according to embodiments, FIG. 2 is a schematic diagram illustrating display driving of the touchscreen display device according to embodiments, and FIG. 3 is a schematic diagram illustrating touch driving of the touchscreen display device according to embodiments.

Referring to FIG. 1, the touchscreen display device according to embodiments may provide a display function to display images. In addition, the touchscreen display device according to embodiments may provide a touch sensing function of detecting a touch of a user and a touch input function of performing input processing in response to the touch of the user using a touch sensing result.

Hereinafter, components for providing the display function, as well as the display driving, will be described with reference to FIGS. 1 and 2, and components for providing the touch sensing function, as well as the touch driving, will be described with reference to FIGS. 1 and 3.

Referring to FIGS. 1 and 2, to provide the display function, the touchscreen display device according to embodiments may include a display panel DISP in which a plurality of data lines DL and a plurality of gate lines GL may be disposed and a plurality of subpixels SP defined by the plurality of data lines DL and the plurality of gate lines GL may be disposed, a data driving circuit DDC driving the plurality of data lines DL, a gate driving circuit GDC driving the plurality of gate lines GL, a display controller DCTR controlling the data driving circuit DDC and the gate driving circuit GDC, and the like.

The display controller DCTR controls the data driving circuit DDC and the gate driving circuit GDC by supplying a variety of control signals to the data driving circuit DDC and the gate driving circuit GDC.

The display controller DCTR starts scanning at points in time realized by respective frames, converts image data input from an external source into the format of a data signal Vdata readable by the data driving circuit DDC, outputs the converted image data, and controls data driving at appropriate points in time according to the scanning.

The gate driving circuit GDC sequentially supplies a gate signal Vgate to the plurality of gate lines GL, under the control of the display controller DCTR.

When a specific gate line GL is opened by the gate driving circuit GDC, the data driving circuit DDC converts the image data, received from the display controller DCTR, into an analog image signal, and supplies a data signal Vdata, corresponding to the analog image signal, to the plurality of data lines DL.

The display controller DCTR may be a timing controller used in typical display technology, may be a control device including a timing controller and performing other control functions, or may be a control device different from the timing controller.

The display controller DCTR may be provided as a component separate from the data driving circuit DDC or may be combined with the data driving circuit DDC to form an integrated circuit (IC).

The data driving circuit DDC drives the plurality of data lines DL by supplying the data signal Vdata to the plurality of data lines DL. Herein, the data driving circuit DDC may also be referred to as a "source driver".

The data driving circuit DDC may include one or more source driver ICs (SDICs). Each of the source driver ICs may include a shift register, a latch circuit, a digital-to-analog converter (DAC), an output buffer circuit, and the like. In some cases, each of the source driver ICs may further include an analog-to-digital converter (ADC).

Each of the source driver ICs may be connected to a bonding pad of the display panel DISP by a tape-automated bonding (TAB) method or a chip-on-glass (COG) method, may be directly mounted on the display panel DISP, or in some cases, may be provided as an integrated portion of the display panel DISP. In addition, each of the source driver ICs may be implemented using a chip-on-film (COF) structure mounted on a film connected to the display panel DISP.

The gate driving circuit GDC sequentially drives the plurality of gate lines GL by sequentially supplying a gate signal Vgate (also referred to as a scan signal) to the plurality of gate lines GL. Herein, the gate driving circuit GDC may also be referred to as a "scan driver".

The gate signal Vgate may be comprised of a turn-off-level gate voltage by which a corresponding gate line GL is closed and a turn-on-level gate voltage by which the corresponding gate line GL is opened.

More specifically, the gate signal Vgate may be comprised of a turn-off-level gate voltage by which a transistor connected to the corresponding gate line GL is turned off and a turn-on-level gate voltage by which the transistor connected to the corresponding gate line GL is turned on.

In a case in which the transistor is an N-type transistor, the turn-off-level gate voltage may be a low-level gate voltage VGL, and the turn-on-level gate voltage may be a high-level gate voltage VGH. In a case in which the transistor is a P-type transistor, the turn-off-level gate voltage may be the high-level gate voltage VGH, and the turn-on-level gate voltage may be a low-level gate voltage VGL. Hereinafter, for the sake of brevity, the turn-off-level gate voltage will be described as being the low-level gate voltage VGL and the on-level gate voltage will be described as being the high-level gate voltage VGH as an example.

The gate driving circuit GDC may include one or more gate driver ICs (GDICs). Each of the gate driver ICs may include a shift register, a level shifter, and the like.

Each of the gate driver ICs may be connected to a bonding pad of the display panel DISP by a TAB method or a COG method, may be implemented using a gate-in-panel (GIP) structure directly mounted on the display panel DISP, or in some cases, may be provided as an integrated portion of the display panel DISP. In addition, each of the gate driver ICs may be implemented using a COF structure mounted on a film connected to the display panel DISP.

The data driving circuit DDC may be disposed on one side of the display panel DISP (e.g. on or adjacent to the upper or lower portion of the display panel DISP), as illustrated in FIG. 1. In some cases, the data driving circuit DDC may be disposed on both sides of the display panel DISP (e.g. on or adjacent to the upper and lower portions of the display panel DISP), depending on the driving method, the design of the display panel, or the like.

The gate driving circuit GDC may be disposed on one side of the display panel DISP (e.g. on or adjacent to the right or left portion of the display panel DISP), as illustrated in FIG. 1. In some cases, the gate driving circuit GDC may be disposed on both sides of the display panel DISP (e.g. on or adjacent to the right and left portions of the display panel DISP), depending on the driving method, the design of the display panel, or the like.

The touchscreen display device according to embodiments may be a variety of display devices, such as a liquid crystal display (LCD) device and an organic light-emitting diode (OLED) display device. The display panel DISP according to embodiments may be a variety of display panels, such as an LCD panel and an OLED display panel.

Each of the subpixels SP disposed on the display panel DISP may include one or more circuit elements (e.g. a transistor and a capacitor).

For example, in a case in which the display panel DISP is an LCD panel, a pixel electrode PXL may be disposed in each of the subpixels SP, and a transistor TR may be electrically connected to the pixel electrode PXL and a corresponding data line DL. The transistor TR may be turned on by the gate signal Vgate supplied to a gate node through a corresponding gate line GL. When turned on, the transistor TR may output the data signal Vdata, supplied to a source node (or drain node) through the data line DL, through a drain node (or source node) to be applied to the pixel electrode PXL electrically connected to the drain node (or source node). An electric field may be generated between the pixel electrode PXL, to which the data signal Vdata is applied, and a corresponding touch electrode TE, to which the common voltage VCOM is applied, and storage capacitance may be generated between the pixel electrode PXL and the touch electrode TE.

The structure of each of the subpixels SP may be determined variously, depending on the type of the panel, functions to be provided, the design, and the like.

Referring to FIGS. 1 to 3, the touchscreen display device according to embodiments may include a touchscreen panel TSP, a touch driving circuit TDC driving and sensing the touchscreen panel TSP, and a touch controller TCTR detecting a touch using a result of the touch driving circuit TDC sensing the touchscreen panel TSP, in order to provide the touch sensing function.

A touch may be made by a pointer of a user in contact with or close to the touchscreen panel TSP. In the touchscreen panel TSP, touch sensors may be disposed.

Here, the pointer of the user may be a finger, a pen, or the like.

The pen may be a passive pen without a signal transmission and reception function or an active pen having a signal transmission and reception function. The touch driving circuit TDC may supply a touch driving signal (or touch electrode driving signal TDS) to the touchscreen panel TSP and sense the touchscreen panel TSP. The touch controller TCTR may detect a touch using the result of the touch driving circuit TDC sensing the touchscreen panel TSP. Here, detecting a touch may indicate performing at least one of detecting a touch input, determining touch coordinates, or a combination thereof.

The touchscreen panel TSP may be an external touchscreen panel disposed outside the display panel DISP or an internal touchscreen panel disposed inside the display panel DISP.

In a case in which the touchscreen panel TSP is the external touchscreen panel, the touchscreen panel TSP and the display panel DISP may be fabricated separately and combined thereafter using an adhesive or the like. The external touchscreen panel may also be referred to as an add-on touchscreen panel.

In a case in which the touchscreen panel TSP is the internal touchscreen panel, the touchscreen panel TSP may be fabricated together with the fabrication process of the display panel DISP. That is, the touch sensors of the touchscreen panel TSP may be disposed inside the display panel DISP. The internal touchscreen panel TSP may be an in-cell touchscreen panel, an on-cell touchscreen panel, a hybrid touchscreen panel, or the like.

Hereinafter, for the sake of brevity, the touchscreen panel TSP will be described as being an internal touchscreen panel disposed inside the display panel DISP.

In a case in which the touchscreen panel TSP is disposed inside the display panel DISP, i.e. a plurality of touch electrodes TE are disposed in the display panel DISP, the plurality of touch electrodes TE may be provided as components of the display panel DISP, separately from electrodes used in the display driving, or the electrodes disposed in the display panel DISP for the display driving may be used as the plurality of touch electrodes TE.

For example, common electrodes disposed in the display panel DISP may be divided into a plurality of pieces to be used as the plurality of touch electrodes TE. That is, the plurality of touch electrodes TE disposed in the display panel DISP may be touch sensing electrodes while being display driving electrodes. Hereinafter, the plurality of touch electrodes TE disposed in the display panel DISP will be described as being the common electrodes.

The touch controller TCTR may be implemented as, for example, a micro-control unit (MCU), a processor, or the like.

The display controller DCTR and the touch controller TCTR may be provided separately or may be integrated together.

Referring to FIG. 3, in the touchscreen panel TSP of the touchscreen display device according to embodiments, the plurality of touch electrodes TE may be disposed, and a plurality of touch lines TL electrically connecting the plurality of touch electrodes TE and the touch driving circuit TDC may be disposed.

The touchscreen display device according to embodiments may detect a touch on the basis of self-capacitance of the touch electrodes TE or mutual capacitance between the touch electrodes TE.

In a case in which the touchscreen display device according to embodiments detects a touch on the basis of the self-capacitance, a plurality of first touch electrode lines and a plurality of second touch electrode lines intersecting the plurality of first touch electrode lines may be disposed in the touchscreen panel TSP. For example, the plurality of first touch electrode lines may be disposed in the x-axis direction, while the plurality of second touch electrode lines may be disposed in the y-axis direction. Here, each of the first touch electrode lines and the second touch electrode lines may be a single bar-shaped touch electrode or a structure comprised of two or more touch electrodes electrically connected. The first touch electrode lines may be referred to as driving lines, driving electrodes, driving touch electrode lines, transmission (Tx) lines, Tx electrodes, Tx touch electrode lines, or the like, while the second touch electrode lines may be referred to as receiving lines, receiving electrodes, receiving touch electrode lines, sensing lines, sensing electrodes, sensing touch electrode lines, reception (Rx) lines, Rx electrodes, Rx touch electrode lines, or the like.

In this case, the touch driving circuit TDC may output sensing data by supplying the driving signal to one or more first touch electrode lines among the plurality of first touch electrode lines and sensing the second touch electrode lines, and the touch controller TCTR may perform at least one of detecting a touch, determining touch coordinates, or a combination thereof, using the sensing data.

In a case in which the touchscreen display device according to embodiments detects a touch on the basis of mutual capacitance, the plurality of touch electrodes TE separated from each other may be disposed in the touchscreen panel TSP, as illustrated in FIG. 3.

In this case, the touch driving circuit TDC may output the sensing data by supplying the driving signal (hereinafter, referred to as the touch electrode driving signal TDS) to entirety or some of the plurality of touch electrodes TE, and sensing one or more touch electrodes TE, to which the driving signal is supplied, and the touch controller TCTR may perform at least one of detecting a touch, determining touch coordinates, or a combination thereof, using the sensing data.

Hereinafter, for the sake of brevity, the touchscreen display device according to embodiments will be described as detecting a touch on the basis of the self-capacitance, and the touchscreen panel TSP will be described as being configured as illustrated in FIGS. 2 and 3.

The touch electrode driving signal TDS output from the touch driving circuit TDC may be a signal having a constant voltage level or a signal having a variable voltage level.

In a case in which the touch electrode driving signal TDS is a signal having a variable voltage level, the voltage level may vary regularly. That is, in the touch electrode driving signal TDS, all of high-level periods may have the same length, and all of low-level periods may have the same length.

Alternatively, in a case in which the touch electrode driving signal TDS is a signal having a variable voltage level, the voltage level may vary irregularly. That is, in the touch electrode driving signal TDS, some of high-level periods may have different lengths, and some of low-level periods may have different lengths. Such a touch electrode driving signal TDS may be, for example, a beacon signal including information related to pen touch sensing.

In a case in which the touch electrode driving signal TDS is a signal having a variable voltage level, the touch electrode driving signal TDS may be a variety of signal waveforms, for example, a sine wave, a triangular wave, or a square wave.

Hereinafter, in a case in which the touch electrode driving signal TDS is a signal having a variable voltage level, the touch electrode driving signal TDS will be described as being a pulse signal comprised of a plurality of pulses. In a case in which the touch electrode driving signal TDS is a pulse signal comprised of a plurality of pulses, the touch electrode driving signal TDS may have a constant frequency or a variable frequency.

The amplitude of the touch electrode driving signal TDS may be constant or variable.

Referring to FIGS. 2 and 3, the size of an area occupied by a single touch electrode TE may correspond to the size of an area occupied by a single subpixel SP or may correspond to the size of an area occupied by two or more subpixels SP.

Each of the plurality of touch electrodes TE may overlap one or more subpixels SP. Each of the plurality of touch electrodes TE may overlap one or more gate lines GL. Each of the plurality of touch electrodes TE may overlap a pixel electrode PXL in a subpixel SP.

A single touch electrode column may include a plurality of touch electrodes TE. A plurality of touch lines TL electrically connected to the plurality of touch electrodes TE may overlap the plurality of touch electrodes TE. For example, in a case in which a plurality of touch electrodes TE disposed in a single touch electrode column are described as including a first touch electrode and a second touch electrode, a first touch line connected to the first touch electrode may overlap the second touch electrode while being electrically disconnected from the second touch electrode.

In the digital-to-analog conversion, the data driving circuit DDC may convert the digital image data DATA into the data signal Vdata in the form of an analog voltage, on the basis of a plurality of gamma reference voltages (GRV).

The plurality of gamma reference voltages are supplied by a gamma circuit (GMA). The gamma circuit may be located outside or inside the data driving circuit DDC.

In addition, a ground voltage GND may be applied to the display panel DISP. The ground voltage GND may be a voltage (e.g. a direct current (DC) voltage) having a constant voltage level or a voltage (e.g. an alternating current (AC) voltage) having a variable voltage level.

For example, in a case in which the ground voltage GND is a voltage having a variable voltage level, at least one of the frequency, the phase, the amplitude, or combinations thereof, of the ground voltage GND may correspond to that of the touch electrode driving signal TDS having a variable voltage level.

Figure 4:
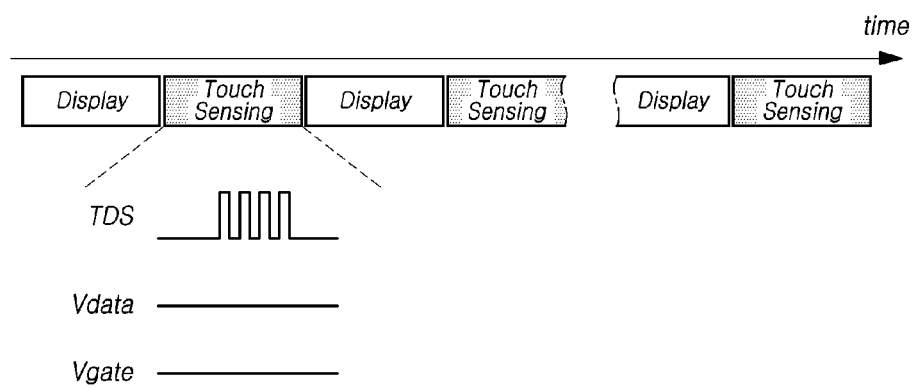
FIGS. 4 and 5 are diagrams illustrating time division driving of the touchscreen display device according to embodiments.
Figure 5:
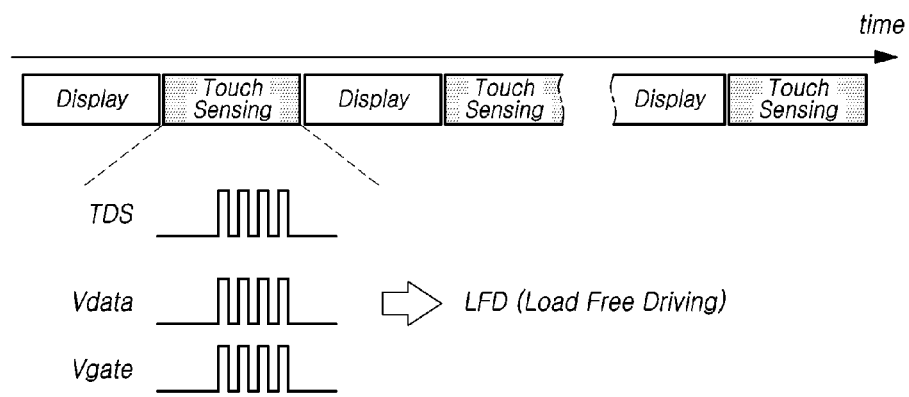

FIGS. 4 and 5 are diagrams illustrating time division driving (TDD) of the touchscreen display device according to embodiments.

Referring to FIG. 4, the touchscreen display device according to embodiments may alternately perform image display and touch sensing. Such a method of alternately performing display driving for the image display and touch driving for the touch sensing is referred to as a time division driving method.

According to the time division driving method, a display period for the image display and a touch sensing period for the touch sensing alternate with each other. During the display period, the touchscreen display device may perform the display driving. During the touch sensing period, the touchscreen display device may perform the touch driving.

In an example of the time division driving method, one-frame period may be divided into a single display period and a single touch sensing period. In another example of the time division driving method, one-frame period may be divided into two or more display periods and one or more touch sensing periods.

Referring to FIG. 4, according to the time division driving method, during the touch sensing period, the touch electrode driving signal TDS may be applied to one or more touch electrodes TE among the plurality of touch electrodes TE. In this case, neither the plurality of data lines DL nor the plurality of gate lines GL may be driven.

In this case, unnecessary parasitic capacitance may be generated between a touch electrode TE, to which the touch electrode driving signal TDS is applied, and one or more data lines DL located close thereto, due to a potential difference. Such unnecessary parasitic capacitance may increase a resistance-capacitance (RC) delay in the corresponding touch electrode TE and the touch line TL connected thereto, thereby reducing touch sensitivity.

In addition, unnecessary parasitic capacitance may also be generated between a touch electrode TE, to which the touch electrode driving signal TDS is applied, and one or more gate lines GL located close thereto, due to a potential difference. Such unnecessary parasitic capacitance may increase a resistance-capacitance delay in the corresponding touch electrode TE and the touch line TL connected thereto, thereby reducing touch sensitivity.

In addition, unnecessary parasitic capacitance may also be generated between a touch electrode TE, to which the touch electrode driving signal TDS is applied, and one or more other touch electrodes TE located adjacent thereto, due to a potential difference. Such unnecessary parasitic capacitance may increase a resistance-capacitance delay in the corresponding touch electrode TE and the touch line TL connected thereto, thereby reducing touch sensitivity.

The RC delay described above may also be referred to as a time constant or load.

In order to remove the load, the touchscreen display device according to embodiments may perform load free driving (LFD) during the touch sensing period as shown in FIG. 5.

In load free driving, when the touch electrode driving signal TDS is applied to the entirety or some of the plurality of touch electrodes TE, the touchscreen display device according to embodiments may apply a load free driving signal to the entirety of the plurality of data lines DL or some of the plurality of data lines DL, in which parasitic capacitance may occur, as a data signal Vdata.

In load free driving, when the touch electrode driving signal TDS is applied to the entirety or some of the plurality of touch electrodes TE, the touchscreen display device according to embodiments may apply the load free driving signal to the entirety of the plurality of gate lines GL or some of the plurality of gate lines GL, in which parasitic capacitance may occur, as a gate signal Vgate.

In load free driving, when the touch electrode driving signal TDS is applied to the entirety or some of the plurality of touch electrodes TE, the touchscreen display device according to embodiments may apply the load free driving signal to the entirety of the remaining touch electrodes TE or some of the remaining touch electrodes TE, in which parasitic capacitance may occur.

The load free driving signal may be a touch electrode driving signal or a signal, characteristics of which are the same as or similar to those of the touch electrode driving signal TDS.

For example, the frequency and phase of the load free driving signal may be the same as, or within a predetermined error range (or predetermined tolerance range) of, those of the touch electrode driving signal TDS. In addition, the amplitude of the load free driving signal may be the same as, or within a predetermined error range of, the amplitude of the touch electrode driving signal TDS. In some cases, the amplitude of the load free driving signal may have an intended difference from that of the touch electrode driving signal TDS.

Figure 6:
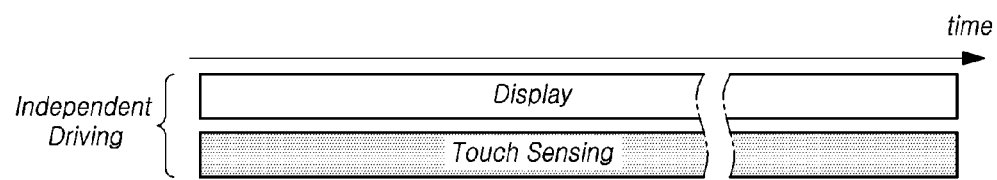
FIG. 6 is a diagram illustrating time-free driving of the touchscreen display device according to embodiments.

FIG. 6 is a diagram illustrating time-free driving (TFD) of the touchscreen display device according to embodiments.

Referring to FIG. 6, the touchscreen display device according to embodiments may perform the image display and the touch sensing independently of each other. Such a driving method of performing the display driving for the image display and the touch driving for the touch sensing independently of each other is referred to as a time-free driving method.

According to the time-free driving method, the display driving for the image display and the touch driving for the touch sensing may be simultaneously performed. In addition, in a specific period, only one of the display driving for the image display and the touch driving for the touch sensing may be performed.

Figure 7A:
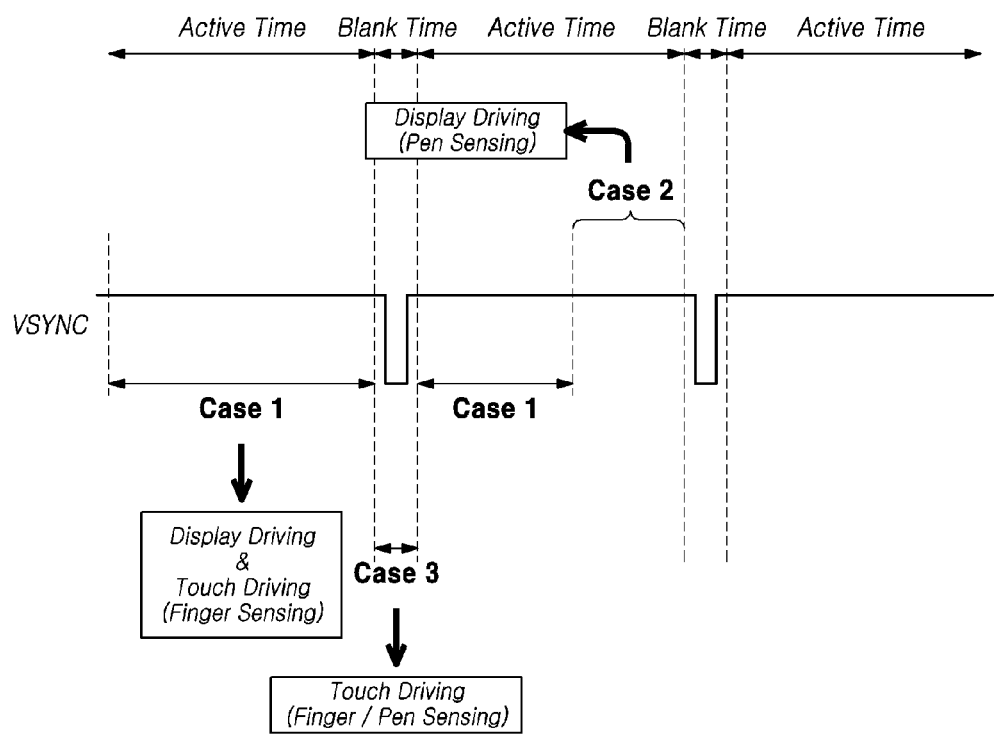
FIG. 7A is a diagram illustrating three cases of the time-free driving performed by the touchscreen display device according to embodiments.
Figure 7B:
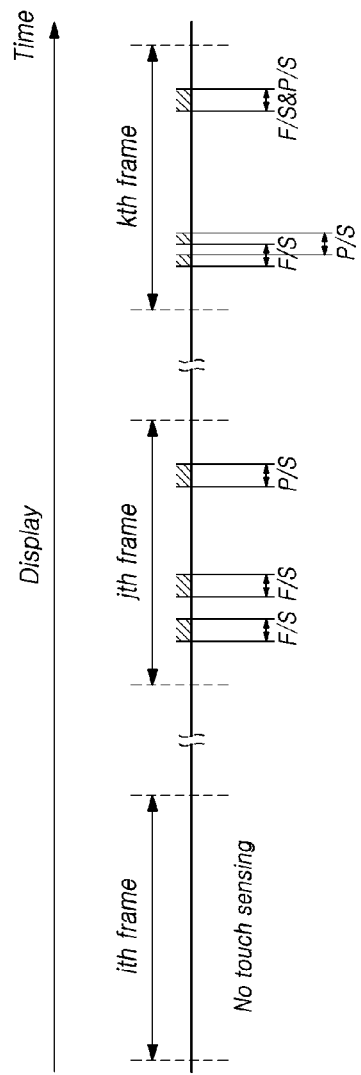
FIG. 7B is a diagram illustrating various points in time of finger sensing and pen sensing according to the time-free driving method in the touchscreen display device according to embodiments.

FIG. 7A is a diagram illustrating three cases Case 1, Case 2, and Case 3 of the time-free driving performed by the touchscreen display device according to embodiments, FIG. 7B is a diagram illustrating various points in time of finger sensing F/S and pen sensing P/S according to the time-free driving method in the touchscreen display device according to embodiments, and FIG. 8 is a diagram illustrating touch electrode driving signals TDS according to Case 1, Case 2, and Case 3 of the time-free driving of the touchscreen display device according to embodiments.

Case 1 of the time-free driving is a case in which touchscreen display device simultaneously performs the display driving for the image display and the touch driving for finger touch sensing.

Case 2 of the time-free driving is a case in which touchscreen display device simultaneously performs the display driving for the image display. In Case 2, touchscreen display device may perform the touch driving for pen touch sensing during the display driving.

Case 3 of the time-free driving is a case in which touchscreen display device may perform the touch driving for at least one of the finger touch sensing, the pen touch sensing, or a combination thereof, during a blank time for the image display.

In Case 1, the touchscreen display device may supply the touch electrode driving signal TDS having a variable voltage level to the touch electrodes TE in order to perform the touch driving.

In Case 1, the touch electrode driving signal TDS applied to the touch electrodes TE will be referred to as a first touch electrode driving signal TDS1. The first touch electrode driving signal TDS1 has a first amplitude AMP1. The first touch electrode driving signal TDS1 will also be referred to as a touch driving signal or a touch sensing signal.

In Case 1, the touchscreen display device may detect a finger touch on the touchscreen panel TSP by performing the touch driving. Such touch detection will also be referred to as finger sensing.

In addition, in Case 1, in a case in which a finger or a pen has approached the touchscreen panel TSP without contacting the touchscreen panel TSP, the touchscreen display device may detect a finger touch or a pen touch by performing the touch driving. Such touch detection will be referred to as hover sensing.

In Case 2, the touchscreen display device does not perform typical touch driving, since it is not required to detect a finger touch. That is, the touchscreen display device does not supply the touch electrode driving signal TDS having a variable voltage level to the plurality of touch electrodes TE disposed in the touchscreen panel TSP.

In Case 2, the touchscreen display device may supply the touch electrode driving signal TDS in the form of a direct current (DC) voltage. Hereinafter, in Case 2, the touch electrode driving signal TDS applied to the touch electrodes TE will also be referred to as a second touch electrode driving signal TDS2.

In addition, in Case 2, the touchscreen display device may detect the pen by receiving a pen signal output from the pen. The touchscreen display device may obtain various pieces of information regarding the pen, such as the position, tilt, pressure (writing pressure), or various additional pieces of information, as a result of the pen sensing.

In Case 3, the touchscreen display device may supply the touch electrode driving signal TDS having a variable voltage level to the touch electrodes TE in order to perform the touch driving.

Hereinafter, in Case 3, the touch electrode driving signal TDS applied to the touch electrodes TE will be referred to as a third touch electrode driving signal TDS3. The third touch electrode driving signal TDS3 has a third amplitude AMP3 different from the first amplitude AMP1. The third touch electrode driving signal TDS3 will also be referred to as the touch driving signal or the touch sensing signal.

In Case 3, the touchscreen display device may detect a finger touch on the touchscreen panel TSP by performing the touch driving.

Referring to FIG. 7A, in the touchscreen display device, the three cases Case 1, Case 2, and Case 3, Case 1 of the time-free driving may be performed in an active time corresponding to a substantial display driving time, while Case 3 may be performed in a blank time. The active time may correspond to a period of time in which a screen of a single frame is displayed, while the blank time may correspond to a period of time maintained before a screen of the next frame is displayed (update) after a screen of a single frame has been displayed. The substantial display driving may indicate the scanning of the plurality of gate lines and the supply of the data signal Vdata to the plurality of data lines DL.

Referring to FIG. 7A, during the active time, Case 1 may be changed to Case 2.

Referring to FIG. 7A, during the active time, the touchscreen display device may perform both the display driving and the touch driving (Case 1) and then stop the touch driving for the finger sensing to enable the pen sensing (Case 1 changed to Case 2).

In Case 1 and Case 3, in the touch driving for the finger sensing, the touch electrode driving signals TDS1 and TDS3 having the amplitudes AMP1 and AMP1, respectively, may be applied to the touch electrodes TE.

In Case 2, the touch electrode driving signal TDS2 in the form of a DC voltage may be applied to the touch electrodes TE to enable the pen sensing.

In addition, referring to FIG. 8, the first amplitude AMP1 of the first touch electrode driving signal TDS1 applied to the touch electrodes TE in a case in which both the display driving and the touch driving are performed (Case 1) may be smaller than the third amplitude AMP3 of the third touch electrode driving signal TDS3 applied to the touch electrodes TE in a case in which only the touch driving is performed (Case 3).

The first amplitude AMP1 of the first touch electrode driving signal TDS1 applied to the touch electrodes TE during the active time may be smaller than the third amplitude AMP3 of the third touch electrode driving signal TDS3 applied to the touch electrodes TE during the blank time.

Figure 9:
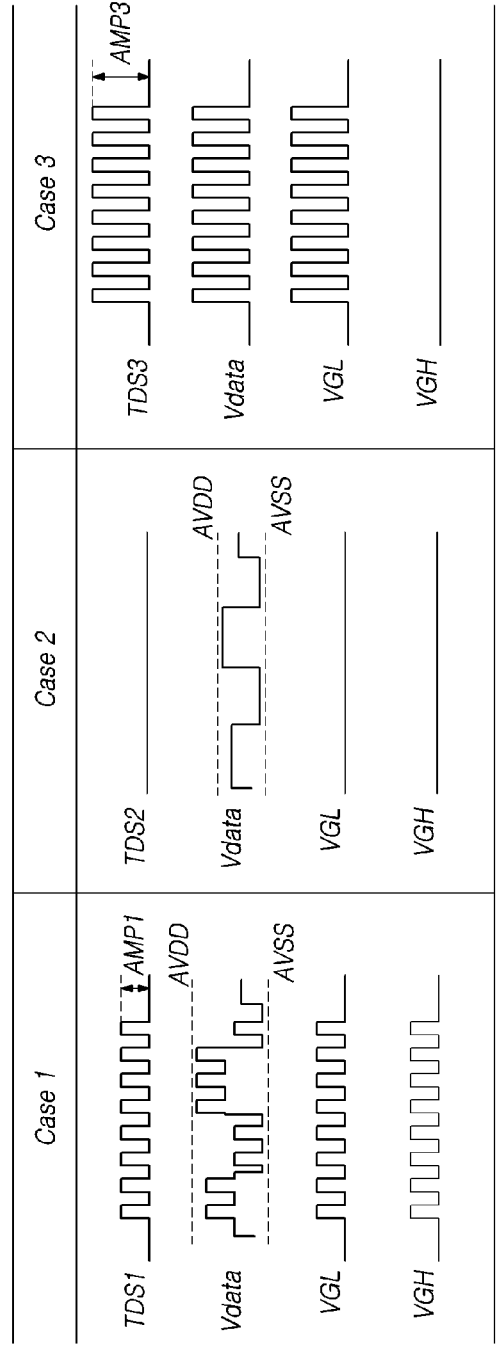
FIG. 9 is a diagram illustrating signal waveforms of major signals according to the three cases of the time-free driving in the touchscreen display device according to embodiments.

Referring to FIGS. 7 and 9, during the active time, the touch driving circuit TDC may supply the first touch electrode driving signal TDS1 having the first amplitude AMP1 or the second touch electrode driving signal TDS2 corresponding to a DC voltage to the plurality of touch electrodes TE.

Referring to FIGS. 7 and 9, during the blank time, the touch driving circuit TDC may supply the third touch electrode driving signal TDS3 having the third amplitude AMP3 to one or more touch electrodes TE among the plurality of touch electrodes TE.

Here, the driving corresponding to Case 1 may be performed during the entirety of a one-frame period or may be performed only in one or more time intervals within the one-frame period. The driving corresponding to Case 2 may be performed during all or some frames or may be performed only in some time intervals within a one-frame period. In the driving corresponding to Case 3, finger sensing driving or pen sensing driving may be performed.

Referring to FIG. 7B, in the touchscreen display device according to embodiments, according to the time-free driving method, the finger sensing F/S and the pen sensing P/S may be performed in various points in time.

For example, as in the ith frame, during a one-frame period, only the display driving may be performed without the finger sensing F/S or the pen sensing P/S. This may correspond to Case 2 without the pen sensing P/S.

In addition, as in the jth frame, during a one-frame period, the finger sensing F/S may be performed during necessary time intervals of the one-frame period. This may correspond to Case 1. In addition, during one-frame period, the pen sensing P/S may be performed during necessary time intervals of the one-frame period. This may correspond to Case 2 In addition, during one-frame period, the finger sensing F/S and the pen sensing P/S may only be performed in non-overlapping time intervals of the one-frame period.

In addition, as in the kth frame, during one-frame period, the finger sensing F/S and the pen sensing P/S may only be performed during overlapping time intervals. In this case, the result of the finger sensing F/S and the result of the pen sensing P/S may be distinguished by the touch controller TCTR, using a predetermined algorithm or sensing position-specific signal analysis.

In addition to the above-described examples, the image display and the touch sensing (i.e. at least one of the finger sensing, the pen sensing, or a combination thereof) may be performed independently of each other in various points in time.

FIG. 9 is a diagram illustrating signal waveforms of major signals TDS1, Vdata, VGL_M, and VGH_M according to the three cases Case 1, Case 2, and Case 3 of the time-free driving in the touchscreen display device according to embodiments.

Case 1 and Case 2 are driving cases during the active time. Case 3 is a driving case during the blank time.

A turn-off-level gate voltage VGL and an turn-on-level gate voltage VGH supplied to the gate driving circuit GDC to generate the touch electrode driving signal TDS applied to the touch electrodes TE, the data signal Vdata applied to the data lines DL, and the gate signal Vgate applied to the gate lines GL will be described according to the above-described three cases.

In Case 2 in which only the display driving is performed during the active time, the touch electrode driving signal TDS applied to the touch electrodes TE is the second touch electrode driving signal TDS2 in the form of a DC voltage.

The data signal Vdata applied to the data lines DL is a signal corresponding to an analog image signal obtained from a digital image signal by digital-analog conversion for the image display. The data signal Vdata may be a pixel voltage applied to pixel electrodes of corresponding subpixels SP through the data lines DL. Here, the voltage of the data signal Vdata may vary between a driving voltage AVDD and a base voltage AVSS.

Each of the turn-off-level gate voltage VGL and the turn-on-level gate voltage VGH of the scan signal applied to the gate lines GL is a corresponding DC voltage.

As described above, the touch electrodes TE may also serve as common electrodes for the display driving. Thus, in Case 2 in which only the display driving is performed during the active time, the second touch electrode driving signal TDS2 applied to the touch electrodes TE corresponds to a common voltage for the image display.

Accordingly, in each of the corresponding subpixel SP, an electric field may be generated between the pixel electrode and the touch electrode TE, due to a voltage difference between the data signal Vdata, applied to the pixel electrode through the data line DL, and the second touch electrode driving signal TDS2 serving as a common voltage applied to the touch electrode TE, so that intended light may be emitted from the subpixels SP.

In Case 3 in which only the touch driving is performed during the blank time, the touch electrode driving signal TDS applied to the touch electrode TE is the third touch electrode driving signal TDS3 having the third amplitude AMP3.

During the blank time, the data lines DL may have the data signal Vdata corresponding to a DC voltage, applied thereto, or may be in a floating state. During the blank time, the gate lines GL may have the gate signal Vgate applied thereto, the gate signal Vgate being the off-level gate voltage VGL corresponding to a DC voltage, or may be in an electrically floating state.

In a case in which load free driving is performed during the blank time in which only the touch driving is performed, voltage characteristics of the data lines DL and the gate lines GL may fluctuate in the same manner as those of the touch electrodes TE.

According to load free driving, during the blank time, the data signal Vdata applied to the data lines DL may be a third touch electrode driving signal TD3 or the load free driving signal having similar characteristics (e.g. phase, frequency, or amplitude) to those of the third touch electrode driving signal TD3.

In addition, according to load free driving, during the blank time, the turn-off-level gate voltage VGL applied to the gate lines GL may be the third touch electrode driving signal TD3 or the load free driving signal having similar characteristics (e.g. phase, frequency, or amplitude) to those of the third touch electrode driving signal TD3.

In Case 1 in which the display driving and the touch driving are simultaneously performed during the active time, the touch electrode driving signal TDS applied to the touch electrodes TE is the first touch electrode driving signal TDS1 having the first amplitude AMP1.

In Case 1, the first touch electrode driving signal TDS1 is also the common voltage VCOM for the display driving while being the driving signal for the touch sensing, since the display driving and the touch driving are simultaneously performed during the active time.

The first touch electrode driving signal TDS1 applied to the touch electrodes TE must have a voltage difference from the data signal Vdata corresponding to the pixel voltage for the image display, the voltage difference being determined for the image display.

In Case 1 in which the display driving and the touch driving are simultaneously performed, the first touch electrode driving signal TDS1 has two functions (to serve as the driving signal for the touch sensing and as the common voltage for the image display).

Since, as described above, the common voltage VCOM corresponding to the first touch electrode driving signal TDS1 have a variable voltage level instead of having a constant voltage, the data signal Vdata applied to the data lines DL must have an additional voltage change by a value equal to the first amplitude AMP1 of the first touch electrode driving signal TDS1, in addition to the original voltage change, so that none of the data lines DL is influenced by the touch driving.

This ensures that only the original voltage change for the image display is present in, and a voltage change component (i.e. the first amplitude AMP1) of the first touch electrode driving signal TDS1 is removed from, the voltage difference between the data signal Vdata corresponding to the pixel voltage and the first touch electrode driving signal TDS1 corresponding to the common voltage VCOM, so that the image display may be performed properly.

Accordingly, the data signal Vdata of Case 1 in which the display driving and the touch driving are simultaneously performed may be a combined signal of the data signal Vdata of a case in which only the display driving is performed (Case 2) and the first touch electrode driving signal TDS1.

Explained in a different manner, the data signal Vdata of Case 1 in which the display driving and the touch driving are simultaneously performed may be an offset signal of the original data signal Vdata of Case 2 in which only the display driving is performed, obtained by offsetting the original data signal Vdata of Case 2 by the first touch electrode driving signal TDS1. Here, the voltage of the data signal Vdata may change between the driving voltage AVDD and the base voltage AVSS.

Accordingly, the voltage difference between the data signal Vdata and the first touch electrode driving signal TDS1 of Case 1 in which the display driving and the touch driving are simultaneously performed is the same as the voltage difference between the data signal Vdata and the second touch electrode driving signal TDS2 of Case 2 in which only the display driving is performed.

In Case 1, load free driving may be required, since the display driving and the touch driving are simultaneously performed.

That is, in Case 1, since the display driving and the touch driving are simultaneously performed, it may be necessary to reduce parasitic capacitance from being generated between the touch electrodes TE and the data lines DL due to the touch driving and reduce parasitic capacitance from being generated between the touch electrodes TE and the gate lines GL due to the touch driving.

As described above, in Case 1, only a voltage difference for the image display is present between the touch electrodes TE and the data lines DL and unnecessary parasitic capacitance is not generated by the touch driving, since the voltages of the touch electrodes TE and the data lines DL fluctuate with changes in the voltage of the first touch electrode driving signal TDS1. That is, in Case 1, the load free driving of the data lines DL is essentially performed.

In Case 1, each of the turn-off-level gate voltage VGL and the turn-on-level gate voltage VGH supplied to the gate driving circuit GDC may be a load free driving signal, the characteristics (e.g. phase, frequency, or amplitude) of which are the same as or similar to those of the third touch electrode driving signal TD3, so that the gate driving circuit GDC may generate a gate signal Vgate to be applied to the gate lines GL.

Hereinafter, the above-described time free driving of the touchscreen display device according to embodiments will be described in more detail.

Figure 10:
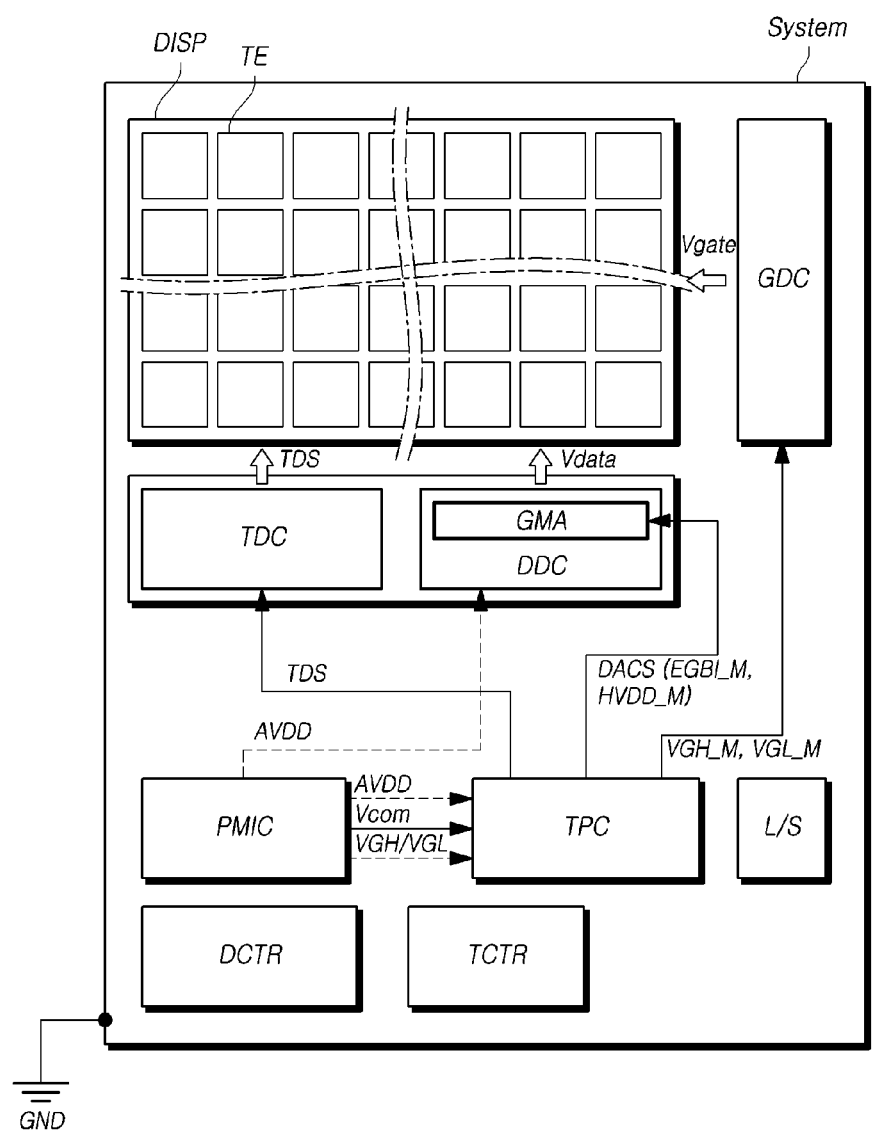
FIG. 10 is a diagram illustrating a time free driving system of the touchscreen display device according to embodiments.

FIG. 10 is a diagram illustrating a time free driving (TFD) system of the touchscreen display device according to embodiments.

Referring to FIG. 10, the touchscreen display device according to embodiments may include the display panel DISP, the gate driving circuit GDC, the data driving circuit DDC, the touch driving circuit TDC, and the like.

In the display panel DISP, the plurality of data lines DL and the plurality of gate lines GL are disposed and the plurality of touch electrodes TE are disposed. The gate driving circuit GDC may be electrically connected to the plurality of gate lines GL to drive the plurality of gate lines GL. The data driving circuit DDC may be electrically connected to the plurality of data lines DL to drive the plurality of data lines DL. The touch driving circuit TDC may be electrically connected to the plurality of touch electrodes TE to drive the plurality of touch electrodes TE.

In addition, the touchscreen display device according to embodiments may further include: the display controller DCTR controlling the driving operations of the data driving circuit DDC and the gate driving circuit GDC; the touch controller TCTR controlling the driving operation of the touch driving circuit TDC or determining at least one of a touch or touch coordinates using the sensing data output from the touch driving circuit TDC; and the like.

In addition, the touchscreen display device according to embodiments may further include a touch power circuit TPC for supplying power, a power management circuit PMIC, and the like.

The touch power circuit TPC may supply a turn-on-level gate voltage VGH_M and a turn-off-level gate voltage VGL_M, necessary for driving the gate lines GL, to the gate driving circuit GDC.

The touch power circuit TPC may supply the touch electrode driving signal TDS, necessary for driving the touch electrodes TE, to the touch driving circuit TDC.

The touch power circuit TPC may be implemented as a single touch power IC (TPIC) or may be divided into a first power circuit and a second power circuit. For example, the touch power circuit TPC is divided into the first power circuit and the second power circuit, one of the first power circuit and the second power circuit may be a TPIC while the other one of the first power circuit and the second power circuit may be a circuit including multiplexers (e.g. MUX_VDD and MUX_VSS in FIG. 37 or MUX_VGH in FIG. 39).

In addition, from the perspective of the driving subject of the touch electrodes TE, the touch driving circuit TDC may supply the touch-sensing touch electrode driving signal TDS1 or TDS3, on the basis of a modulated signal (e.g. pulse width modulated signal) received from the touch controller TCTR, to electrodes TE selected as sensing targets, among the plurality of touch electrodes TE. In addition, the touch power circuit TPC may also supply the modulated signal (e.g. pulse width modulated signal), received from the touch controller TCTR, to touch electrodes TE not selected as sensing targets, among the plurality of touch electrodes TE, as a load free driving signal (i.e. a type of touch electrode driving signal). Here, the touch electrode driving signal TDS1 or TDS3 supplied to the touch electrodes TE selected as sensing targets and the load free driving signal (also referable as a touch electrode driving signal) applied to the touch electrodes TE not selected as sensing targets may be the same signal.

The power management circuit PMIC may supply a variety of DC voltages (e.g. AVDD, VCOM, VGH, and VGL), necessary for signal supply of the touch power circuit TPC, to the touch power circuit TPC.

The power management circuit PMIC may supply a variety of DC voltages (e.g. AVDD and AVSS), necessary for data driving of the data driving circuit DDC, to the data driving circuit DDC.

The touch controller TCTR may supply a pulse-width modulated (PWM) signal, necessary for output or generation of a variety of signals (e.g. TDS), to circuits, such as the touch power circuit TPC, the touch driving circuit TDC, or the data driving circuit DDC. The touch controller TCTR may be implemented as, for example, a micro-control unit (MCU) or a processor.

In addition, the touchscreen display device according to embodiments may further include one or more level shifters L/S to change the voltage levels of a variety of signals.

Each of the one or more level shifters L/S may be provided separately form the data driving circuit DDC, the gate driving circuit GDC, the touch driving circuit TDC, the touch power circuit TPC, the power management circuit PMIC, the display controller DCTR, the touch controller TCTR, or the like, or may be included as an internal module in one or more of the data driving circuit DDC, the gate driving circuit GDC, the touch driving circuit TDC, the touch power circuit TPC, the power management circuit PMIC, the display controller DCTR, the touch controller TCTR, or the like.

Referring to FIG. 10, the data driving circuit DDC may include a gamma block GMA necessary for converting digital image signals, input from the display controller DCTR or the like, into analog image signals.

Referring to FIG. 10, the touch power circuit TPC may be configured to supply D/A conversion control signals DACS, necessary for converting digital image signals into analog image signals, to the gamma block GMA in the data driving circuit DDC.

The above-stated D/A conversion control signals DACS may include, for example, a gamma reference voltage GRV. In some cases, the D/A conversion control signals DACS may further include a half driving voltage HVDD_M having an intermediate voltage level between the driving voltage AVDD, i.e. a high-level voltage, and the base voltage AVSS, i.e. a low-level voltage, and the like. Hereinafter, the gamma reference voltage GRV will be described as EGBI_M instead of GRV, in a case in which the gamma reference voltage has a variable voltage level.

The gamma reference voltage EGBI_M, which may be one of the D/A conversion control signals, may include, for example, a high gamma reference voltage and a low gamma reference voltage input to both ends of a resistor string in the gamma block GMA.

The half driving voltage HVDD_M, which may be another of the D/A conversion control signals, may be a voltage substantially half of the driving voltage AVDD.

As described above, the touch driving circuit TDC may output the first touch electrode driving signal TDS1, swinging with the first amplitude AMP1, to the plurality of touch electrodes TE, output the second touch electrode driving signal TDS2, corresponding to a DC voltage, to the plurality of touch electrodes TE, or output the third touch electrode driving signal TDS3, swinging with the third amplitude AMP3, to the entirety or some of the plurality of touch electrodes TE.

Here, the first touch electrode driving signal TDS1 is a driving signal for the touch sensing and corresponds to the common voltage VCOM for the image display. The second touch electrode driving signal TDS2 corresponds to the common voltage VCOM for the image display. The third touch electrode driving signal TDS3 corresponds to a driving signal for the touch sensing.

In Case 1 in which the touch driving and the display driving are simultaneously performed, when the first touch electrode driving signal TDS1 is output to the plurality of touch electrodes TE, the load free driving is required to reduce unnecessary parasitic capacitance from being generated between the plurality of touch electrodes TE and the plurality of data lines DL.

In this regard, the data driving circuit DDC may supply a data signal Vdata to the data lines DL to cause the same voltage change situations in the data lines DL as those in the touch electrodes TE caused by the first touch electrode driving signal TDS1.

For such load free driving, the data driving circuit DDC may use gamma modulation.

More specifically, in response to the gamma reference voltage EGBI_M in the form of a modulated signal swinging with a predetermined amplitude, the data driving circuit DDC according to embodiments may convert a digital image signal into an analog image signal and output the data signal Vdata, corresponding to the converted analog image signal, to the data lines DL.

The data driving circuit DDC according to embodiments may include a digital-to-analog converter (DAC) converting a digital image signal into an analog image signal, in response to the gamma reference voltage EGBI_M in the form of a modulated signal swinging with a predetermined amplitude, an output buffer circuit outputting the data signal Vdata, corresponding to the converted analog image signal, to the data lines DL, and the like.

The gamma reference voltage EGBI_M may be a modulated signal, characteristics (e.g. a frequency, phase, amplitude, or signal waveform) of which correspond those of the first touch electrode driving signal TDS1 applied to the touch electrodes TE and swinging with the first amplitude AMP1. Herein, the corresponding signal characteristics of two signals may include the same signal characteristics (or swing characteristics or modulation characteristics) of the two signals and a case in which the signal characteristics (or swing characteristics or modulation characteristics) of the two signals are similar within a predetermined error range (e.g. 2% or ±3%).

The frequency and phase of the gamma reference voltage EGBI_M in the form of a modulated signal may correspond to those of the first touch electrode driving signal TDS1. In some cases, the amplitude of the gamma reference voltage EGBI_M may be the same as or similar to the first amplitude AMP1 of the first touch electrode driving signal TDS1.

The data signal Vdata, generated on the basis of the gamma reference voltage EGBI_M in the form of a modulated signal, may include a voltage change component corresponding to a voltage change in the first touch electrode driving signal TDS1.

For the gamma modulation of the above-described data driving circuit DDC, at points in driving time corresponding to Case 1, the touch power circuit TPC may output the gamma reference voltage EGBI_M, the amplitude of which corresponds to the first amplitude AMP1 of the first touch electrode driving signal TDS1, to the data driving circuit DDC.

In addition, at points in driving time corresponding to Case 2, the touch power circuit TPC may output the gamma reference voltage EGBI_M, corresponding to a DC voltage, to the data driving circuit DDC.

In addition, at points in driving time corresponding to Case 3, the touch power circuit TPC does not supply any form of the gamma reference voltage EGBI_M to the data driving circuit DDC.

Referring to FIG. 10, in the touchscreen display device according to embodiments, the display panel DISP, the data driving circuit DDC, the gate driving circuit GDC, the touch driving circuit TDC, and the like may be grounded to a DC ground voltage GND.

Figure 11:
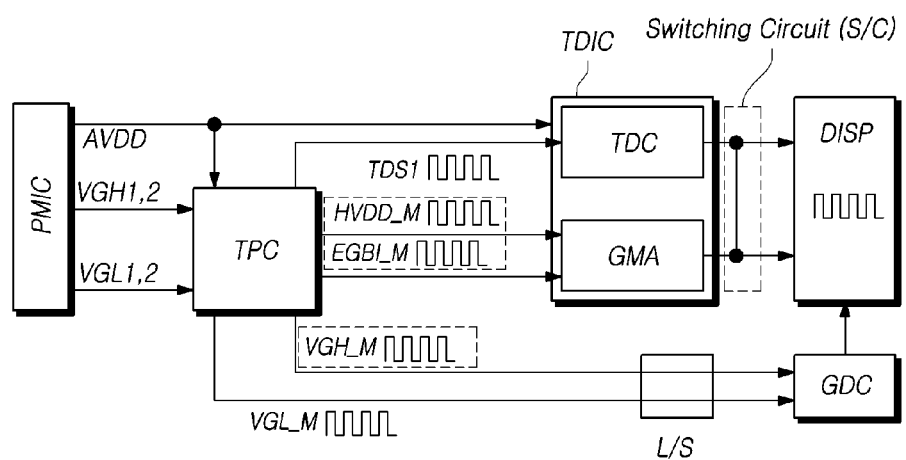
FIG. 11 is a diagram illustrating a system for transmitting signals among components according to Case 1 of the three cases of the time free driving in the touchscreen display device according to embodiments.
Figure 12:
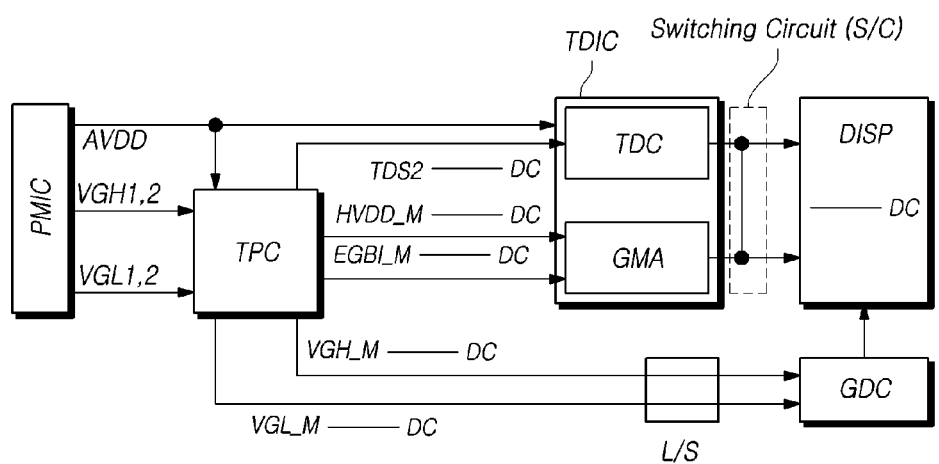
FIG. 12 is a diagram illustrating a system for transmitting signals among components according to Case 2 of the three cases of the time free driving in the touchscreen display device according to embodiments.
Figure 13:
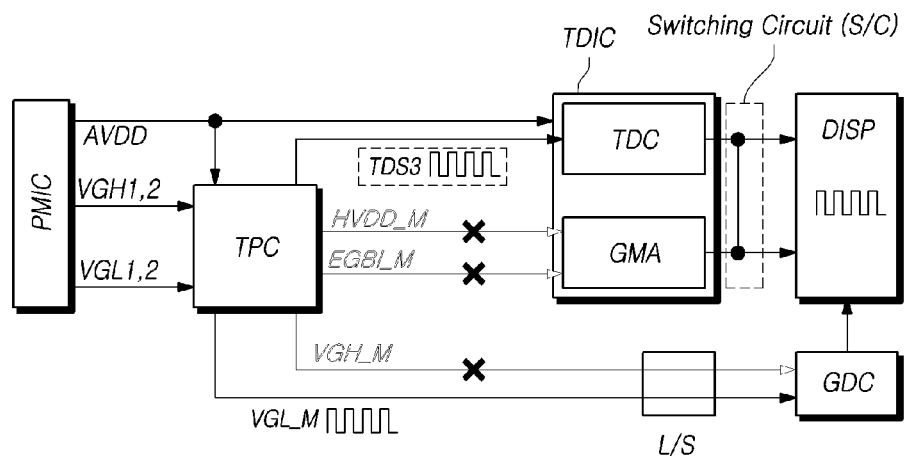
FIG. 13 is a diagram illustrating a system for transmitting signals among components according to Case 3 of the three cases of the time free driving in the touchscreen display device according to embodiments.

FIGS. 11 to 13 are diagrams illustrating a system for transmitting signals among components according to the three cases of the time free driving in the touchscreen display device according to embodiments. Hereinafter, the touch driving circuit TDC and the data driving circuit DDC will be described as being integrated into a single touch/data driving circuit TDIC, but the present disclosure is not limited thereto.

Referring to FIGS. 11 to 13, the touch power circuit TPC receives a DC driving voltage AVDD, turn-on-level gate voltages VGH1 and VGH2, and turn-off-level gate voltages VGL1 and VGL2 from the power management circuit PMIC.

Referring to FIG. 11, in a case in which the display driving and the touch driving are simultaneously performed (Case 1), the touch power circuit TPC may supply the first touch electrode driving signal TDS1 having the first amplitude AMP1 to the touch driving circuit TDC.

The touch power circuit TPC may supply the half driving voltage HVDD_M and the gamma reference voltage EGBI_M, signal characteristics (e.g. a frequency, phase, or amplitude) of which correspond to those of the first touch electrode driving signal TDS1, to the gamma block GMA of the data driving circuit DDC. Here, the frequency and phase of each of the half driving voltage HVDD_M and the gamma reference voltage EGBI_M may correspond to those of the first touch electrode driving signal TDS1.

The touch power circuit TPC may supply the turn-on-level gate voltage VGH_M and the turn-off-level gate voltage VGL_M, swinging in synchronization with the first touch electrode driving signal TDS1, to the gate driving circuit GDC. Here, the frequency and phase of each of the turn-on-level gate voltage VGH_M and the turn-off-level gate voltage VGL_M may correspond to those of the first touch electrode driving signal TDS1.

The touch power circuit TPC may supply the turn-on-level gate voltage VGH_M and the turn-off-level gate voltage VGL_M to the gate driving circuit GDC by changing the voltage levels thereof through the level shifter L/S. The level shifter L/S may be present inside the gate driving circuit GDC.

The touch driving circuit TDC may output the first touch electrode driving signal TDS1 having the first amplitude AMP1 to the plurality of touch electrodes TE.

Here, the first touch electrode driving signal TDS1 may not only be a driving signal for the touch sensing, but also be the common voltage VCOM for the image display.

In response to the gamma reference voltage EGBI_M, the frequency and phase of which correspond to those of the first touch electrode driving signal TDS1, the data driving circuit DDC may convert a digital image signal into an analog image signal and output the data signal Vdata, corresponding to the converted analog image signal, to the data lines DL.

In a case in which the first touch electrode driving signal TDS1 is output to the plurality of touch electrodes TE, the gate driving circuit GDC may supply the first turn-off-level gate voltage VGL_M, the frequency and phase of which correspond to those of the first touch electrode driving signal TDS1, to the gate lines GL or the first turn-on-level gate voltage VGH_M, offset by a value equal to the first turn-off-level gate voltage VGL_M, to the gate lines GL.

In Case 1, the display panel 110 may have voltage swing characteristics.

Referring to FIG. 12, in a case in which only the display driving is performed during the active time (Case 2), the touch power circuit TPC may supply the second touch electrode driving signal TDS2, corresponding to a DC voltage, to the touch driving circuit TDC.

The touch power circuit TPC may supply the half driving voltage HVDD_M in the form of a DC voltage and the gamma reference voltage EGBI_M in the form of a DC voltage to the gamma block GMA of the data driving circuit DDC.

The touch power circuit TPC may supply the turn-on-level gate voltage VGH_M and the turn-off-level gate voltage VGL_M, respectively in the form of a DC voltage, to the gate driving circuit GDC.

The touch power circuit TPC may supply the turn-on-level gate voltage VGH_M and the turn-off-level gate voltage VGL_M, respectively in the form of a DC voltage, to the gate driving circuit GDC by changing the voltage levels thereof through the level shifter L/S. The level shifter L/S may be present inside the gate driving circuit GDC.

The touch driving circuit TDC may supply the second touch electrode driving signal TDS2 in the form of a DC voltage to the plurality of touch electrodes TE.

Here, the second touch electrode driving signal TDS2 in the form of a DC voltage, supplied to the plurality of touch electrodes TE, may be a common voltage for the display driving. Accordingly, the plurality of touch electrodes TE may be common electrodes.

In response to the gamma reference voltage EGBI_M and the half driving voltage HVDD_M respectively corresponding to a DC voltage, the data driving circuit DDC may convert a digital image signal into an analog image signal and output the data signal Vdata, corresponding to the converted analog image signal, to the data lines DL.

In a case in which the second touch electrode driving signal TDS2 is output to the plurality of touch electrodes TE, the gate driving circuit GDC may supply the second turn-off-level gate voltage VGL_M in the form of a DC voltage to the gate lines GL or supply the second turn-on-level gate voltage VGH_M in the form of a DC voltage to the gate lines GL.

In Case 2, the display panel 110 may have a DC voltage characteristic.

Referring to FIG. 13, in a case in which the touch driving is simultaneously performed during the blank time (Case 3), the touch power circuit TPC may supply the third touch electrode driving signal TDS3 having the third amplitude AMP3 to the touch driving circuit TDC.

Since the display driving is not necessary during the blank time, the touch power circuit TPC does not supply either the half driving voltage HVDD_M or the gamma reference voltage EGBI_M to the gamma block GMA of the data driving circuit DDC. That is, during the blank time, according to Case 3 of the time free driving, the gamma reference voltage EGBI_M is not input to the data driving circuit DDC, since the display driving is not performed, even though the touch driving is performed.

The touch power circuit TPC may supply the turn-off-level gate voltage VGL_M, swinging in synchronization with the third touch electrode driving signal TDS3, to the gate driving circuit GDC. Here, the frequency and phase of the turn-off-level gate voltage VGL_M may correspond to those of the third touch electrode driving signal TDS3.

Since the display driving is not necessary during the blank time, the touch power circuit TPC does not output the turn-on-level gate voltage VGH_M swinging in synchronization with the third touch electrode driving signal TDS3.

The touch power circuit TPC may supply the turn-off-level gate voltage VGL_M to the gate driving circuit GDC by changing the voltage level thereof through the level shifter L/S. The level shifter L/S may be present inside the gate driving circuit GDC.

During the blank time, the touch driving circuit TDC may output the third touch electrode driving signal TDS3, having the third amplitude AMP3 different from the first amplitude AMP1, to the entirety or some of the plurality of touch electrodes TE.

Here, the third touch electrode driving signal TDS3 is not a common voltage for the image display but is instead a driving signal for the touch sensing.

The third touch electrode driving signal TDS3, output from the touch driving circuit TDC, may be applied not only to the entirety or some of the plurality of touch electrodes TE, but also to other electrodes (e.g. other touch electrodes) or other conductive lines (e.g. DL and GL) disposed in the display panel DISP via a switching circuit S/C for the load free driving.

More specifically, during the blank time, the third touch electrode driving signal TDS3 or a signal corresponding to the third touch electrode driving signal TDS3 may be applied to the entirety or some of the plurality of data lines DL. Here, the third touch electrode driving signal TDS3 or the signal corresponding to the third touch electrode driving signal TDS3, applied to the entirety or some of the plurality of data lines DL, is a load free driving signal able to reduce parasitic capacitance from being generated between the corresponding touch electrodes TE and the corresponding data lines DL, thereby removing a load (or RC delay) between the corresponding touch electrodes TE and the corresponding touch lines TL.

In a case in which the third touch electrode driving signal TDS3 is output to the plurality of touch electrodes TE, the gate driving circuit GDC may supply the third turn-off-level gate voltage VGL_M, the frequency and phase of which correspond to those of the third touch electrode driving signal TDS3, to the gate lines GL.

During the blank time, the third touch electrode driving signal TDS3 or a signal (e.g. the third turn-off-level voltage gate voltage) corresponding to the third touch electrode driving signal TDS3 may be applied to the entirety or some of the plurality of gate lines GL.

Here, the third touch electrode driving signal TDS3 or the signal corresponding to the third touch electrode driving signal TDS3, applied to the entirety or some of the plurality of gate lines GL, is a load free driving signal able to reduce parasitic capacitance from being generated between the corresponding touch electrodes TE and the corresponding gate lines GL, thereby removing a load (or RC delay) between the corresponding touch electrodes TE and the corresponding data lines DL.

In Case 3, the display panel 110 may have voltage swing characteristics.

Hereinafter, among the three cases Case 1, Case 2, and Case 3 of the time free driving, Case 1 in which the display driving and the touch driving are simultaneously performed will be described in more detail.

Figure 14:
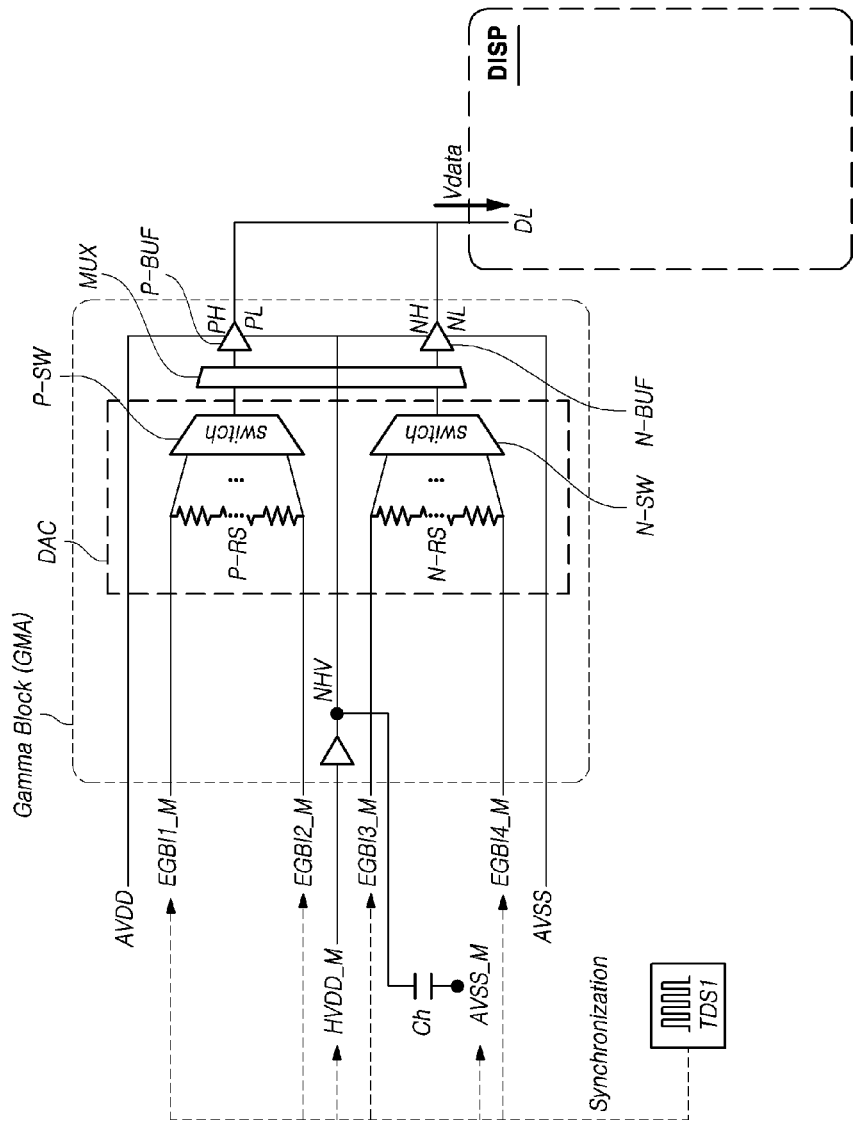
FIG. 14 is a diagram illustrating the gamma block performing the time free driving on the data lines by the gamma modulation in the time free driving system of the touchscreen display device according to embodiments.
Figure 15:
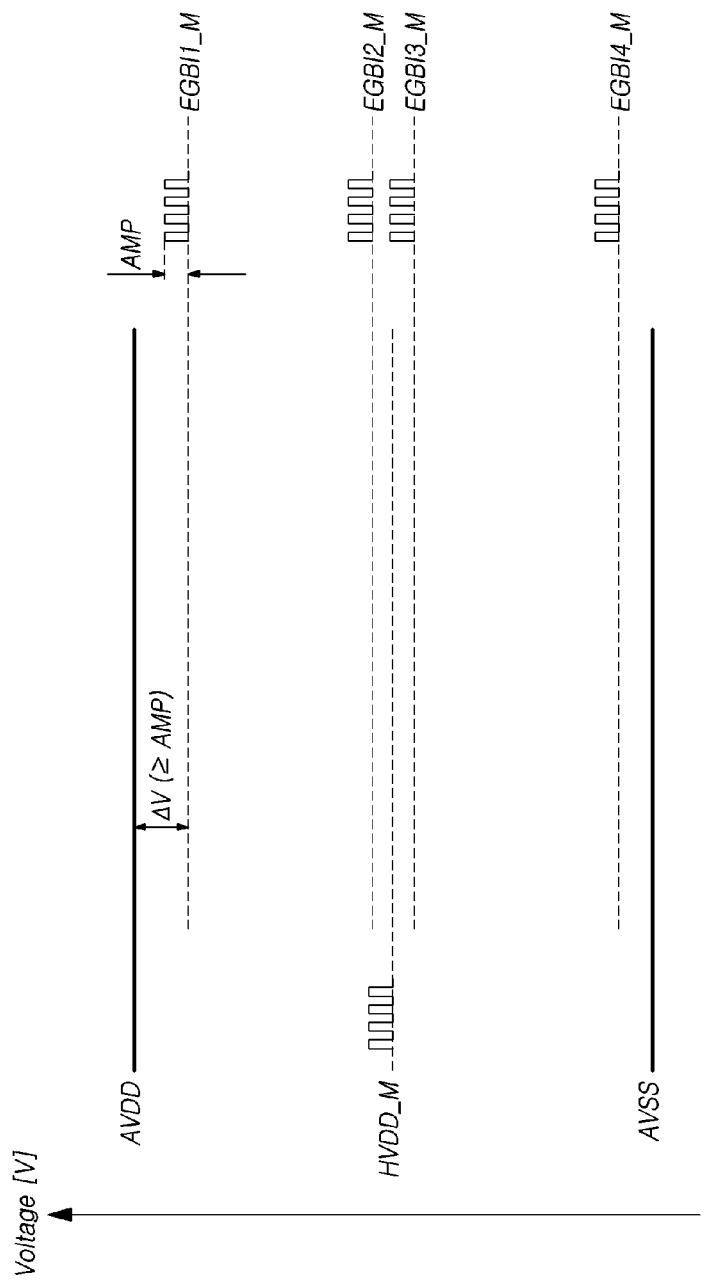
FIG. 15 is a diagram illustrating the voltage levels and characteristics of gamma reference voltages used in the gamma block for performing the time free driving on the data lines by the gamma modulation in the time free driving system of the touchscreen display device according to embodiments.

FIG. 14 is a diagram illustrating the gamma block GMA performing the time free driving on the data lines DL by the gamma modulation in the time free driving system of the touchscreen display device according to embodiments, and FIG. 15 is a diagram illustrating the voltage levels and characteristics of gamma reference voltages EGBI1_M, EGBI2_M, EGBI3_M, and EGBI4_M used in the gamma block GMA for performing the time free driving on the data lines DL by the gamma modulation in the time free driving system of the touchscreen display device according to embodiments.

Hereinafter, the data lines DL will be described as being driven by polarity inversion driving.

The gamma block GMA in the data driving circuit DDC according to embodiments may include a digital-to-analog converter DAC converting a digital image signal to an analog image signal having a positive polarity or a negative polarity using the gamma reference voltages EGBI1_M, EGBI2_M, EGBI3_M, and EGBI4_M.

The digital-to-analog converter DAC may include a first converter (or positive converter) and a second converter (or negative converter).

The first converter of the digital-to-analog converter DAC includes a first resistor string P-RS comprised of a plurality of resistors connected in series, a first switch P-SW selecting an analog image voltage having a positive polarity depending on the digital image signal, and the like. The second converter of the digital-to-analog converter DAC includes a second resistor string N-RS comprised of a plurality of resistors connected in series, a second switch N-SW selecting an analog image voltage having a negative polarity depending on the digital image signal, and the like.

The gamma block GMA in the data driving circuit DDC according to embodiments may include: a multiplexer MUX selecting the analog image voltage having a positive polarity and the analog image voltage having a negative polarity; a first output buffer circuit P-BUF outputting a first data signal Vdata, corresponding to the analog image voltage having a positive polarity, to the data lines DL; a second output buffer circuit N-BUF outputting a second data signal Vdata, corresponding to the analog image voltage having a negative polarity, to the data lines DL; and the like.

Referring to FIGS. 14 and 15, in a case in which the data driving circuit DDC performs the polarity inversion driving, the gamma reference voltage EGBI_M in the form of a modulated signal may include the first gamma reference voltage EGBI1_M and the second gamma reference voltage EGBI2_M, applied to both ends of the resistor string P-RS having a positive polarity, and the third gamma reference voltage EGBI3_M and the fourth gamma reference voltage EGBI4_M applied to both ends of the resistor string N-RS having a negative polarity.

Each of the four gamma reference voltages EGBI1_M, EGBI2_M, EGBI3_M, and EGBI4_M may be a modulated signal, the frequency, phase, and the like of which are synchronized with those of the first touch electrode driving signal TDS1.

Each of the four gamma reference voltages EGBI1_M, EGBI2_M, EGBI3_M, and EGBI4_M may have a variable voltage level, the amplitude of which is the same as or similar to the first amplitude AMP1 of the first touch electrode driving signal TDS1.

In other words, in the data driving circuit DDC, the digital-to-analog converter DAC may receive a digital image signal, receive the first gamma reference voltage EGBI1_M, the second gamma reference voltage EGBI2_M, the third gamma reference voltage EGBI3_M, and the fourth gamma reference voltage EGBI4_M, the phase and frequency of each of which correspond to those of the first touch electrode driving signal TDS1, and convert the digital image signal into a first analog image signal (i.e. an analog image signal having a positive polarity), in response to the first gamma reference voltage EGBI1_M and the second gamma reference voltage EGBI2_M, or convert the digital image signal into a second analog image signal (i.e. an analog image signal having a negative polarity), in response to the third gamma reference voltage EGBI3_M and the fourth gamma reference voltage EGBI4_M.

The first output buffer circuit P-BUF may receive the first analog image signal and output the first data signal Vdata to the data lines DL.

The second output buffer circuit N-BUF may receive the second analog image signal and output the second data signal Vdata to the data lines DL.

The first data signal Vdata may be a data signal Vdata having a positive polarity, output to the data lines DL in the ith frame. The second data signal Vdata may be a data signal Vdata having a negative polarity, output to the data lines DL in the (i+1)th frame.

Referring to FIGS. 14 and 15, the first gamma reference voltage EGBI1_M may be a positive high gamma reference voltage, the second gamma reference voltage EGBI2_M may be a positive low gamma reference voltage, the third gamma reference voltage EGBI3_M may be a negative high gamma reference voltage, and the fourth gamma reference voltage EGBI4_M may be a negative low gamma reference voltage.

Each of the first gamma reference voltage EGBI1_M, the second gamma reference voltage EGBI2_M, the third gamma reference voltage EGBI3_M, and the fourth gamma reference voltage EGBI4_M may be a modulated signal swinging in synchronization with the first touch electrode driving signal TDS1, with the frequency and phase thereof corresponding to those of the first touch electrode driving signal TDS1.

The amplitude of each of the first gamma reference voltage EGBI1_M, the second gamma reference voltage EGBI2_M, the third gamma reference voltage EGBI3_M, and the fourth gamma reference voltage EGBI4_M may correspond to the first amplitude AMP1 of the first touch electrode driving signal TDS1.

The first gamma reference voltage EGBI1_M may be set to be higher than the second gamma reference voltage EGBI2_M. The second gamma reference voltage EGBI2_M may be set to be higher than the third gamma reference voltage EGBI3_M. The third gamma reference voltage EGBI3_M may be set to be higher than the fourth gamma reference voltage EGBI4_M.

In addition, referring to FIG. 14, the first output buffer circuit P-BUF may be activated by the driving voltage AVDD applied to a PH node and the half driving voltage HVDD_M applied to a PL node.

The second output buffer circuit N-BUF may be activated by the half driving voltage HVDD_M applied to an NH node and the base voltage AVSS applied to an NL node.

The driving voltage AVDD, applied to the first output buffer circuit P-BUF, and the half driving voltage HVDD_M, applied to the second output buffer circuit N-BUF, are voltages having the same function (i.e. buffer driving voltages). The half driving voltage HVDD_M, applied to the first output buffer circuit P-BUF, and the base voltage AVSS, applied to the second output buffer circuit N-BUF, are voltages (e.g. buffer base voltages) having the same function.

The driving voltage AVDD may be a DC voltage. The base voltage AVSS may be a DC voltage lower than the driving voltage AVDD. For example, the base voltage AVSS may be 0V.

The half driving voltage HVDD_M may be a signal, the voltage of which swings between the driving voltage AVDD and the base voltage AVSS.

The half driving voltage HVDD_M may be a signal, the frequency and phase of which correspond to those of the first touch electrode driving signal TDS1. Accordingly, the frequency and phase of the half driving voltage HVDD_M may correspond to those of the first gamma reference voltage EGBI1_M, the second gamma reference voltage EGBI2_M, the third gamma reference voltage EGBI3_M, and the fourth gamma reference voltage EGBI4_M.

In some cases, the amplitude of the half driving voltage HVDD_M may correspond to the first amplitude AMP1 of the first touch electrode driving signal TDS1. Accordingly, the amplitude of the half driving voltage HVDD_M may correspond to the amplitude of each of the first gamma reference voltage EGBI1_M, the second gamma reference voltage EGBI2_M, the third gamma reference voltage EGBI3_M, and the fourth gamma reference voltage EGBI4_M.

Each of the first gamma reference voltage EGBI1_M and the second gamma reference voltage EGBI2_M may be set to be higher than the half driving voltage HVDD_M. Each of the third gamma reference voltage EGBI3_M and the fourth gamma reference voltage EGBI4_M may be set to be lower than the half driving voltage HVDD_M.

The low-level voltage of the fourth gamma reference voltage EGBI4_M may be set to be higher than the base voltage AVSS. In particular, a difference ΔV between the low-level voltage of the first gamma reference voltage EGBI1_M and the driving voltage AVDD may be set to be equal to or greater than the amplitude AMP of the first gamma reference voltage EGBI_M.

Referring to FIG. 14, a voltage AVSS M, the amplitude of which corresponds to the first amplitude AMP1 of the first touch electrode driving signal TDS1, may be applied to an NHV node via a capacitor Ch. The NHV node is commonly connected to a point (i.e. the PL node), at which the half driving voltage HVDD_M is applied to the first output buffer circuit P-BUF, and a point (i.e. the NH node), at which the half driving voltage HVDD_M is applied to the second output buffer circuit N-BUF.

The half driving voltage HVDD_M serves as a low-level base voltage for the first output buffer circuit P-BUF while serving as a high-level driving voltage for the second output buffer circuit N-BUF. In this regard, the capacitor Ch connected to the NHV node may contribute to the stabilization of the voltage of the NHV node and the half driving voltage HVDD_M.

Figure 16:
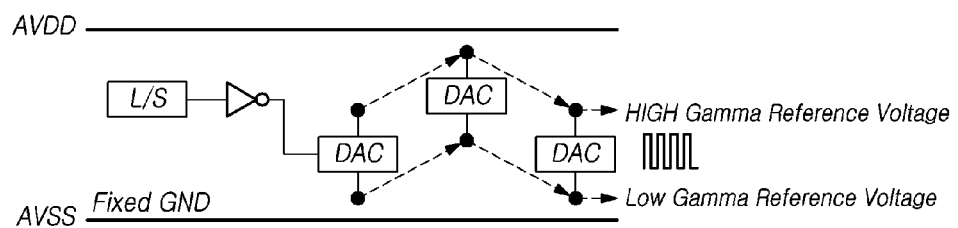
FIG. 16 is a diagram illustrating digital-analog conversion characteristics in the gamma block for performing the time free driving on the data lines by the gamma modulation in the time free driving system of the touchscreen display device according to embodiments.

FIG. 16 is a diagram illustrating digital-analog conversion characteristics in the gamma block GMA for performing the time free driving on the data lines DL by the gamma modulation in the time free driving system of the touchscreen display device according to embodiments.

Referring to FIG. 16, the digital-to-analog converter DAC operates the first converter (i.e. positive converter) and the second converter (i.e. negative converter) in an alternating manner.

In the digital-analog conversion in the first converter (i.e. positive converter), the high gamma reference voltage is the first gamma reference voltage EGBI1_M, while the low gamma reference voltage is the second gamma reference voltage EGBI2_M.

In the case of digital-analog conversion in the second converter (i.e. negative converter), the high gamma reference voltage is the third gamma reference voltage EGBI3_M, while the low gamma reference voltage is the fourth gamma reference voltage EGBI4_M.

The analog image signal output from the digital-to-analog converter DAC may swing between the driving voltage AVDD and the base voltage AVSS. Here, the base voltage AVSS may be a fixed ground voltage GND.

The analog image signal output from the digital-to-analog converter DAC may have not only a significant voltage change due to the polarity inversion driving, but also an insignificant voltage change due to the low gamma reference voltage and a change in the low gamma reference voltage itself.

Figure 17:
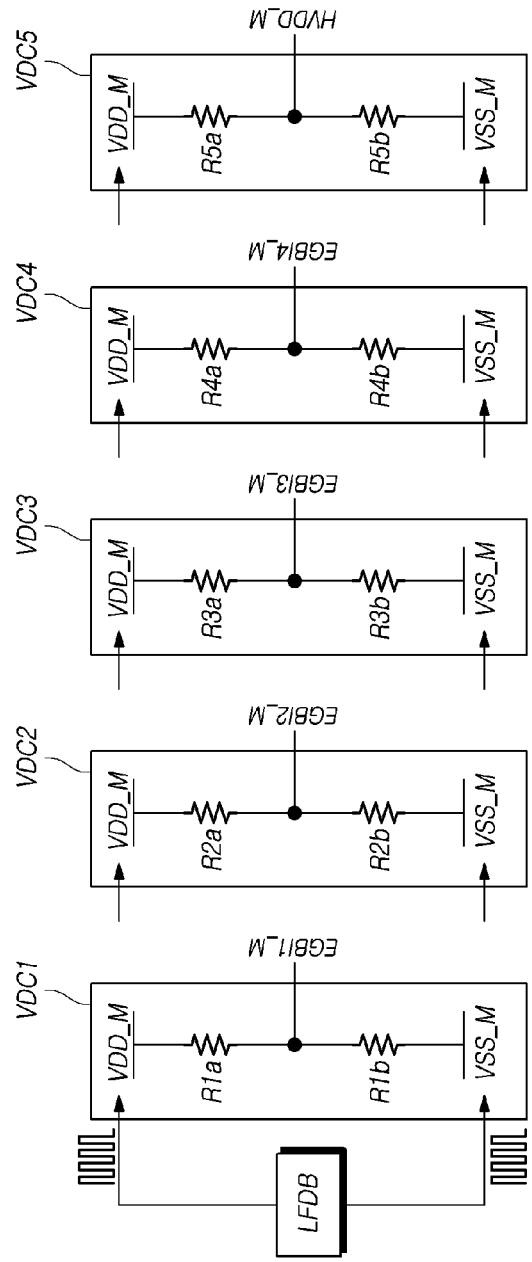
FIG. 17 is a diagram illustrating a circuit generating a variety of voltages for the gamma modulation in the time free driving system of the touchscreen display device according to embodiments.

FIG. 17 is a diagram illustrating a circuit generating a variety of voltages EGBI1_M, EGBI2_M, EGBI3_M, EGBI4_M, and HVDD_M for the gamma modulation in the time free driving system of the touchscreen display device according to embodiments.

Referring to FIG. 17, the touch power circuit TPC may include first to fifth voltage distribution circuits VDC1, VDC2, VDC3, VDC4, and VDC5 generating and outputting the gamma reference voltages EGBI1_M, EGBI2_M, EGBI3_M, and EGBI4_M and the half driving voltage HVDD_M.

In addition, the touch power circuit TPC may further include a load free driving block LFDB supplying a modulated driving voltage VDD_M and a modulated base voltage VSS_M to the first to fifth voltage distribution circuits VDC1, VDC2, VDC3, VDC4, and VDC5.

The first to fifth voltage distribution circuits VDC1, VDC2, VDC3, VDC4, and VDC5 generate the gamma reference voltages EGBI1_M, EGBI2_M, EGBI3_M, and EGBI4_M and the half driving voltage HVDD_M using the modulated driving voltage VDD_M and the modulated base voltage VSS_M. Each of the first to fifth voltage distribution circuits VDC1, VDC2, VDC3, VDC4, and VDC5 is a circuit outputting a distribution voltage using a distribution resistor string.

The load free driving block LFDB generates modulated signals (including TDS, VDD_M, VSS_M, VGH_M, and the like, and able to further include VGL_M and TDS) and applies the modulated driving voltage VDD_M and the modulated base voltage VSS_M, among such modulated signals, to both ends of the first to fifth voltage distribution circuits VDC1, VDC2, VDC3, VDC4, and VDC5.

The first voltage distribution circuit VDC1 includes a resistor R1a and a resistor R1b connected to the modulated driving voltage VDD_M and the modulated base voltage VSS_M in series, and outputs the first gamma reference voltage EGBI1_M through a connection point between the two resistors R1a and R1b.

Here, the first gamma reference voltage EGBI1_M may be a modulated signal having a variable voltage level like the modulated driving voltage VDD_M and the modulated base voltage VSS_M. The level of the first gamma reference voltage EGBI1_M may vary depending on the magnitudes of the resistors R1a and R1b.

The second voltage distribution circuit VDC2 includes a resistor R2a and a resistor R2b connected to the modulated driving voltage VDD_M and the modulated base voltage VSS_M in series, and outputs the second gamma reference voltage EGBI2_M through a connection point between the two resistors R2a and R2b.

Here, the second gamma reference voltage EGBI2_M may be a modulated signal having a variable voltage level like the modulated driving voltage VDD_M and the modulated base voltage VSS_M. The level of the second gamma reference voltage EGBI2_M may vary depending on the magnitudes of the resistors R2a and R2b.

The third voltage distribution circuit VDC3 includes a resistor R3a and a resistor R3b connected to the modulated driving voltage VDD_M and the modulated base voltage VSS_M in series, and outputs the third gamma reference voltage EGBI3_M through a connection point between the two resistors R3a and R3b.

Here, the third gamma reference voltage EGBI3_M may be a modulated signal having a variable voltage level like the modulated driving voltage VDD_M and the modulated base voltage VSS_M. The level of the third gamma reference voltage EGBI3_M may vary depending on the magnitudes of the resistors R1a and R3b.

The fourth voltage distribution circuit VDC4 includes a resistor R4a and a resistor R4b connected to the modulated driving voltage VDD_M and the modulated base voltage VSS_M in series, and outputs the fourth gamma reference voltage EGBI4_M through a connection point between the two resistors R4a and R4b.

Here, the fourth gamma reference voltage EGBI4_M may be a modulated signal having a variable voltage level like the modulated driving voltage VDD_M and the modulated base voltage VSS_M. The level of the fourth gamma reference voltage EGBI4_M may vary depending on the magnitudes of the resistors R4a and R4b.

The first to fifth voltage distribution circuits VDC1, VDC2, VDC3, VDC4, and VDC5 may be included within the touch power circuit TPC, or may be mounted on a printed circuit board (PCB). In this case, the touch power circuit TPC may be mounted on the printed circuit board.

Figure 18:
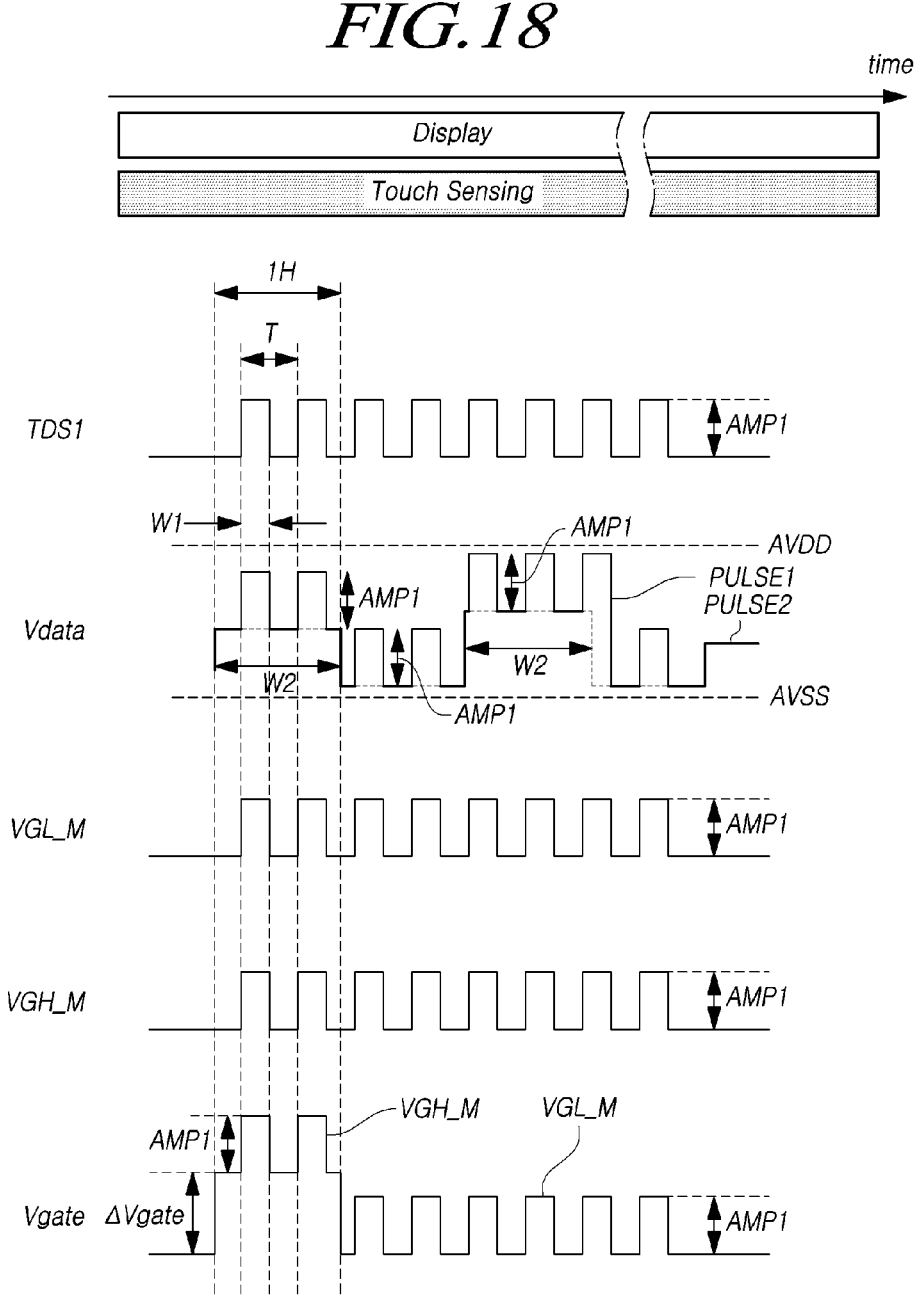
FIG. 18 is a diagram illustrating signal waveforms of major signals for the time-free driving in the time-free driving system of the touchscreen display device according to embodiments, in a case in which the first touch electrode driving signal has a high frequency.
Figure 19:
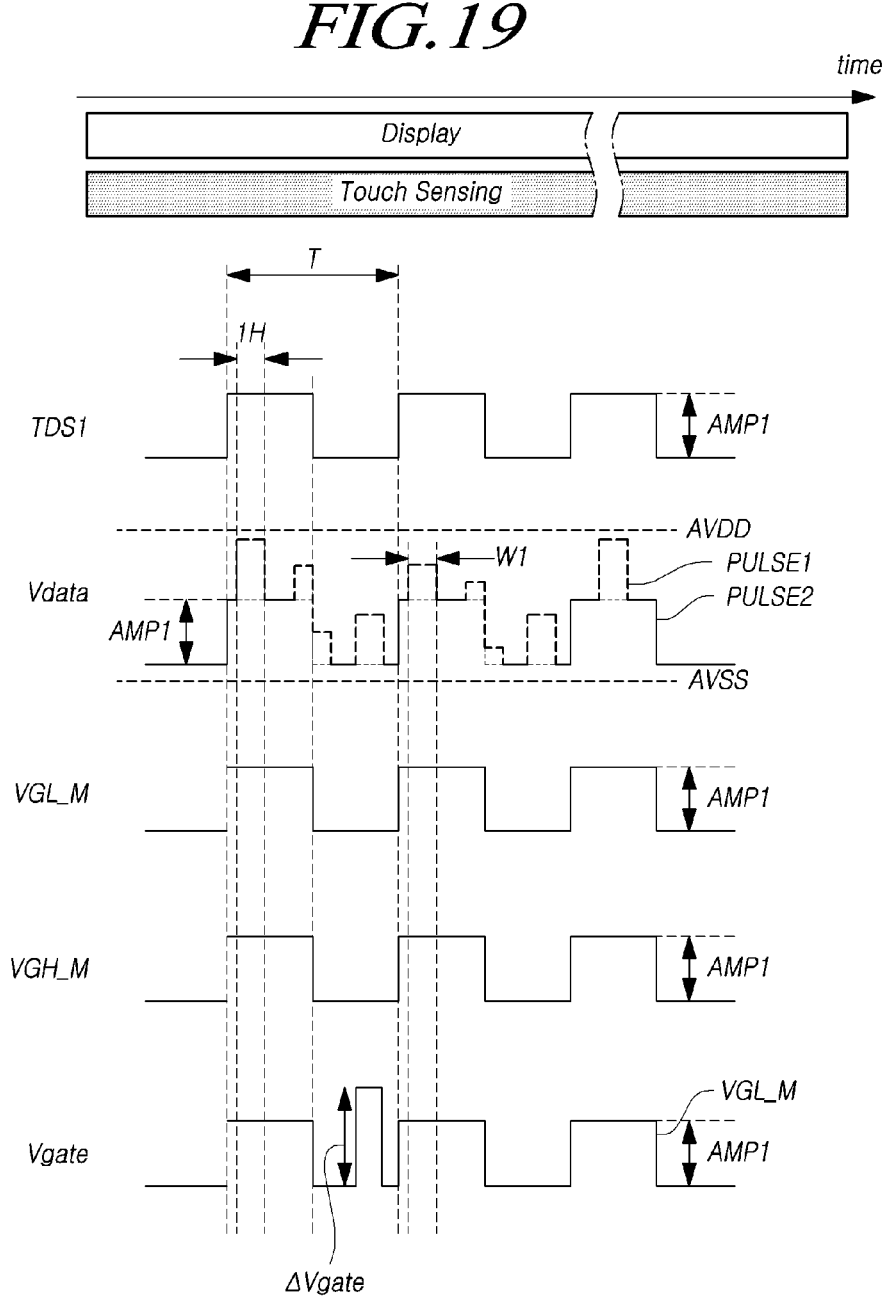
FIG. 19 is a diagram illustrating signal waveforms of major signals for the time-free driving in the time-free driving system of the touchscreen display device according to embodiments, in a case in which the first touch electrode driving signal has a low frequency.

FIG. 18 is a diagram illustrating signal waveforms of major signals TDS1, Vdata, VGL_M, VGH_M, and Vgate for the time-free driving in the time-free driving system of the touchscreen display device according to embodiments, in a case in which the first touch electrode driving signal TDS1 has a high frequency, FIG. 19 is a diagram illustrating signal waveforms of major signals TDS1, Vdata, VGL_M, VGH_M, and Vgate for the time-free driving in the time-free driving system of the touchscreen display device according to embodiments, in a case in which the first touch electrode driving signal TDS1 has a low frequency.

The frequency of the first touch electrode driving signal TDS1 may be set to be higher or lower. That is, the period T of the first touch electrode driving signal TDS1 may be set to be shorter or longer.

As illustrated in FIG. 18, the period T of the first touch electrode driving signal TDS1 may be shorter than a predetermined horizontal period. As illustrated in FIG. 19, the period T of the first touch electrode driving signal TDS1 may be longer than the predetermined horizontal period.

Here, the predetermined horizontal period may be 1H, 2H, 3H, or the like. Hereinafter, the predetermined horizontal period will be described as being 1H as an example.

Referring to FIGS. 18 and 19, in a case in which the display driving and the touch driving are simultaneously performed according to the time-free driving method, the data signal Vdata may be a combined signal comprised of first pulses PULSE1 having a first pulse width W1 and second pulses PULSE2 having a second pulse width W2. Here, the second pulse width W2 may be wider than the first pulse width W1.

Referring to FIGS. 18 and 19, the voltage of the data signal Vdata may change between the driving voltage AVDD and the base voltage AVSS.

As illustrated in FIG. 18, in a case in which the period T of the first touch electrode driving signal TDS1 is shorter than the predetermined horizontal period (e.g. 1H), the first pulses PULSE1 of the data signal Vdata may respectively have a portion, the amplitude of which corresponds to the first amplitude AMP1 of the first touch electrode driving signal TDS1. The first pulse width W1 of the first pulses PULSE1 may correspond to the pulse width of the first touch electrode driving signal TDS1.

As illustrated in FIG. 19, in a case in which the period T of the first touch electrode driving signal TDS1 is longer than the predetermined horizontal period (e.g. 1H), the second pulses PULSE2 of the data signal Vdata may have a portion, the amplitude of which corresponds to the first amplitude AMP1 of the first touch electrode driving signal TDS1. The second pulse width W2 of the second pulses PULSE2 may correspond to the pulse width of the first touch electrode driving signal TDS1.

Referring to FIGS. 18 and 19, the frequency and phase of the turn-off-level gate voltage VGL_M, supplied from the touch power circuit TPC to the gate driving circuit GDC, correspond to those of the first touch electrode driving signal TDS1. The frequency and phase of the turn-on-level gate voltage VGH_M, supplied from the touch power circuit TPC to the gate driving circuit GDC, correspond to those of the first touch electrode driving signal TDS1.

Referring to FIGS. 18 and 19, the amplitude of each of the turn-off-level gate voltage VGL_M and the turn-on-level gate voltage VGH_M may be the same as, or within a tolerance range of, the first amplitude AMP1 of the first touch electrode driving signal TDS1.

Referring to FIG. 18, the gate signal Vgate applied to a gate line GL may be the turn-on-level gate voltage VGH_M during the horizontal period 1H in which the corresponding gate line GL is opened while being the turn-off-level gate voltage VGL_M during the remaining period other than the horizontal period 1H in which the corresponding gate line GL is opened. The gate signal Vgate may be a signal obtained by adding a voltage ΔVgate, corresponding to an amplitude necessary for opening the corresponding gate line GL, to the turn-on-level gate voltage VGH_M. The voltage ΔVgate, corresponding to the amplitude necessary for opening the corresponding gate line GL, may be a voltage difference between the high-level gate voltage VGH and the low-level gate voltage VGL in the form of a DC voltage.

Referring to FIG. 18, during the horizontal period 1H in which the corresponding gate line GL is opened, the gate signal Vgate applied to the gate line GL is a signal in which the turn-off-level gate voltage VGL_M in the form of a modulated signal is superimposed on the turn-on-level gate voltage VGH. During the remaining period other than the horizontal period 1H, the gate signal Vgate is the turn-off-level gate voltage VGL_M in the form of a modulated signal. Here, the frequency and phase of the turn-off-level gate voltage VGL_M in the form of a modulated signal correspond to those of the first touch electrode driving signal TDS1.

Referring to FIG. 19, during the horizontal period 1H in which the corresponding gate line GL is opened, the gate signal Vgate applied to the gate line GL is a signal in which the voltage ΔVgate corresponding to an amplitude necessary for opening the corresponding gate line GL is superimposed on the turn-off-level gate voltage VGL_M in the form of a modulated signal. During the remaining period other than the horizontal period 1H, the gate signal Vgate is the turn-off-level gate voltage VGL_M in the form of a modulated signal. Here, the frequency and phase of the turn-off-level gate voltage VGL_M in the form of a modulated signal correspond to those of the first touch electrode driving signal TDS1.

Figure 20:
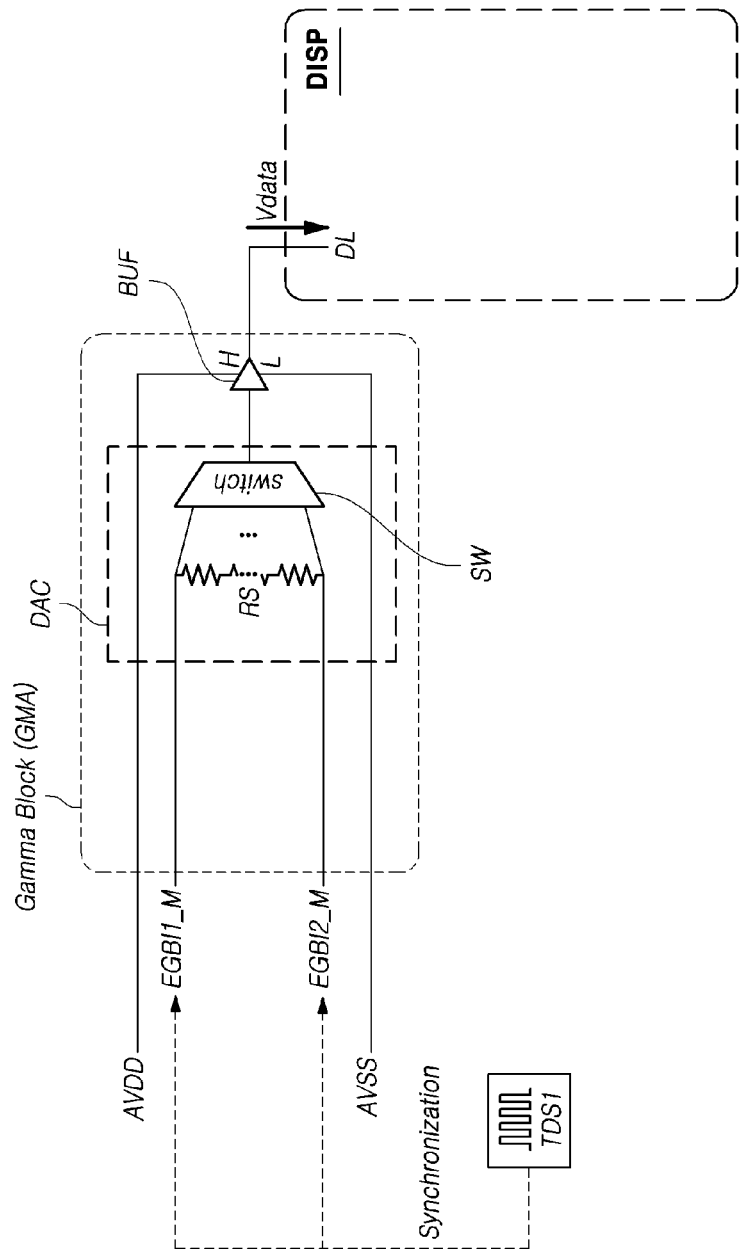
FIG. 20 is a diagram illustrating another example of the gamma block performing the time free driving on the data lines DL by the gamma modulation in the time free driving system of the touchscreen display device according to embodiments.

FIG. 20 is a diagram illustrating another example of the gamma block GMA performing the time free driving on the data lines DL by the gamma modulation in the time free driving system of the touchscreen display device according to embodiments.

Referring to FIG. 20, in a case in which the polarity inversion driving is not performed in the data driving, the gamma block GMA in the data driving circuit DDC may include a digital-to-analog converter DAC receiving the digital image signal, receiving the first gamma reference voltage EGBI1_M and the second gamma reference voltage EGBI2_M, the frequency and phase of which correspond to those of the first touch electrode driving signal TDS1, and converting the digital image signal into the analog image signal in response to the first gamma reference voltage EGBI1_M and the second gamma reference voltage EGBI2_M; and an output buffer circuit BUF receiving the analog image signal and outputting the data signal Vdata to the data lines DL.

The digital-to-analog converter DAC may include a resistor string RS, a switch SW, and the like.

The output buffer circuit BUF may operate, with the driving voltage AVDD and the base voltage AVSS being applied to an H node and an L node thereof, respectively.

The first gamma reference voltage EGBI1_M may be set to be higher than the second gamma reference voltage EGBI2_M.

The low-level voltage of the second gamma reference voltage EGBI2_M may be set to be higher than the base voltage AVSS.

The difference between the low-level voltage of the first gamma reference voltage EGBI1_M and the driving voltage AVDD may be set to be equal to or greater than the amplitude of the first gamma reference voltage EGBI1_M.

Figure 21:
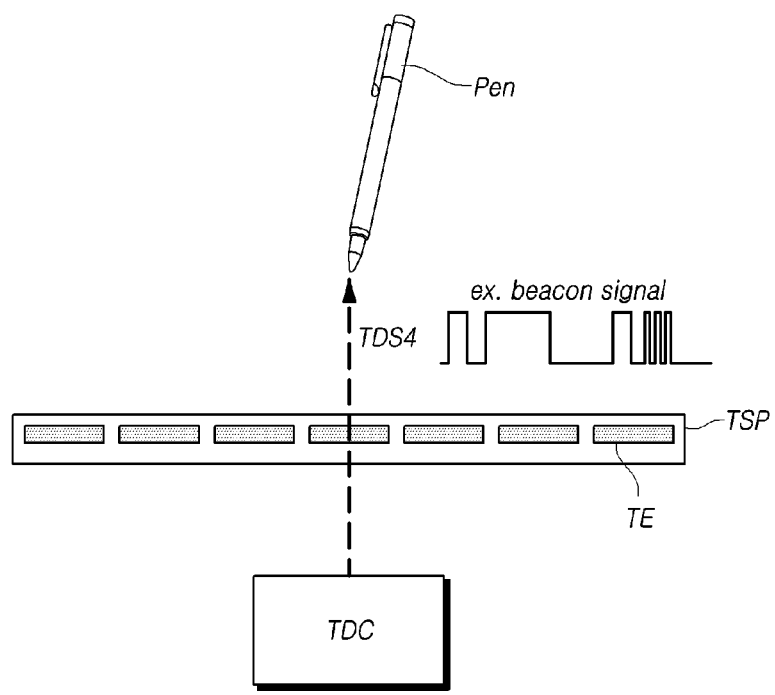
FIGS. 21 and 22 are diagrams illustrating pen sensing operations of the touchscreen display device according to embodiments.
Figure 22:
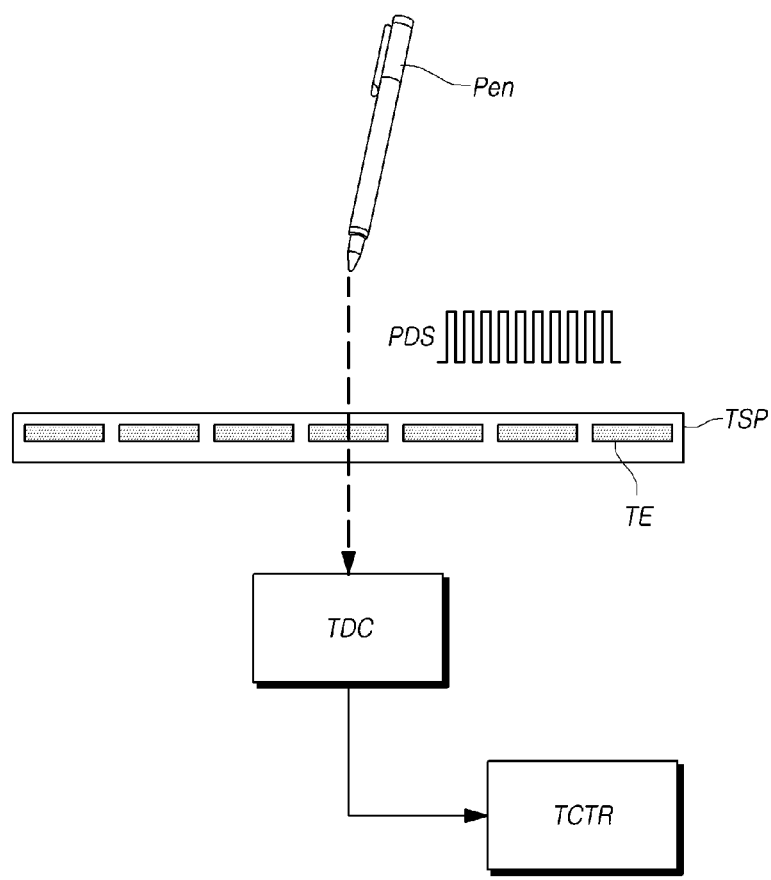

FIGS. 21 and 22 are diagrams illustrating pen sensing operations of the touchscreen display device according to embodiments.

During the blank time, the display driving is not performed.

During the blank time, for the touch driving for the finger sensing, the touch driving circuit TDC may supply the third touch electrode driving signal TDS3 in the form of a regular pulse signal having a constant pulse width to the touch electrodes TE.

In some cases, as illustrated in FIG. 21, during the blank time, the touch driving circuit TDC may output a fourth touch electrode driving signal TDS4 in the form of an irregular pulse signal having a variable pulse width to the entirety or some of the plurality of touch electrodes TE.

Here, the fourth touch electrode driving signal TDS4 may be a beacon signal that the touchscreen display device transmits to the pen for the pen sensing.

Such a beacon signal is a signal, through which information necessary for the pen sensing is transferred from the touchscreen display device to the pen. For example, the beacon signal may represent (or include) panel information, pen driving timing information, and the like.

Referring to FIG. 22, in the active time and in a case (Case 2) in which the second touch electrode driving signal TDS2 in the form of a DC voltage is output to the plurality of touch electrodes TE, the touch driving circuit TDC may receive a pen signal PDS from the pen via the display panel DISP.

The pen signal PDS may be a regular pulse signal having a constant pulse width or an irregular pulse signal having a variable pulse width.

In a case in which the touch driving circuit TDC outputs the sensing data by receiving the pen signal PDS in the form of a regular pulse signal, a touch controller TCR may detect at least one of the position, tilt, or a combination thereof, of the pen, using the sensing data.

In a case in which the touch driving circuit TDC outputs the sensing data by receiving the pen signal PDS in the form of an irregular pulse signal, touch controller TCR may obtain various pieces of additional information of the pen using the sensing data. Here, the various pieces of additional information of the pen may include, for example, at least one of a pressure (writing pressure), a pen identifier (ID), button information, battery information, function information, or combinations thereof. Such various pieces of additional information of the pen may be expressed by pulses of the pen signal PDS.

The driving method of the above-described touchscreen display device according to embodiments may be described, in brief, as including: step S2510 of converting the digital image signal into the analog image signal in response to the gamma reference voltage EGBI_M modulated in synchronization with the first touch electrode driving signal TDS1 applied to the touch electrodes TE disposed in the display panel DISP and swinging with the first amplitude AMP1; and step S2520 of outputting the data signal Vdata corresponding to the converted analog image signal to the data lines DL disposed in the display panel DISP.

The first touch electrode driving signal TDS1 may be a signal applied to the touch electrodes TE in the active time.

The gamma reference voltage EGBI_M being modulated in synchronization with the first touch electrode driving signal TDS1 may indicate that the gamma reference voltage EGBI_M and the first touch electrode driving signal TDS1 swing at the same frequency and have the same phase.

In addition, the amplitude of the gamma reference voltage EGBI_M may correspond to the first amplitude AMP1 of the first touch electrode driving signal TDS1.

Figure 23:
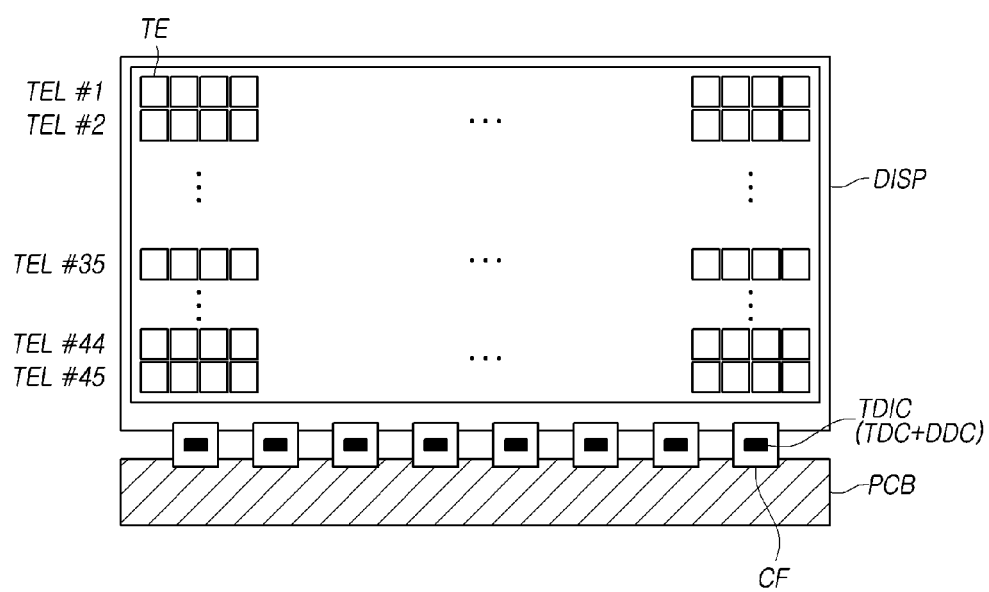
FIG. 23 is a diagram illustrating an application example of the touchscreen display device according to embodiments.

FIG. 23 is a diagram illustrating an application example of the touchscreen display device according to embodiments.

Referring to FIG. 23, in the touchscreen display device according to embodiments, the touch driving circuit TDC and the data driving circuit DDC may be included in the touch/data driving circuit TDIC.

The touchscreen display device according to embodiments may include one or more touch/data driving circuits TDIC.

Each of the touch/data driving circuits TDIC may be directly mounted on a peripheral area of the display panel DISP.

Alternatively, each of the touch/data driving circuits TDIC may be mounted on a circuit film SF electrically connected to a peripheral portion of the display panel DISP. Signal lines electrically connecting the touch/data driving circuit TDIC to the data lines DL and the touch lines TL on the display panel DISP may be disposed in the circuit film SF. The circuit film SF may be a flexible printed circuit.

One portion of the circuit film SF may be electrically connected to the display panel DISP, while the other portion of the circuit film SF may be electrically connected to a printed circuit board PCB. The printed circuit board PCB may allow a variety of components, such as the display controller DCTR and the touch controller TCTR, or may be electrically connected to the variety of components, such as the display controller DCTR and the touch controller TCTR.

In addition, the plurality of touch electrodes TE disposed in the display panel DISP may be arranged in the form of a matrix. For example, the display panel DISP may include 45 touch electrode lines TEL #1 to TEL #45.

Figure 24:
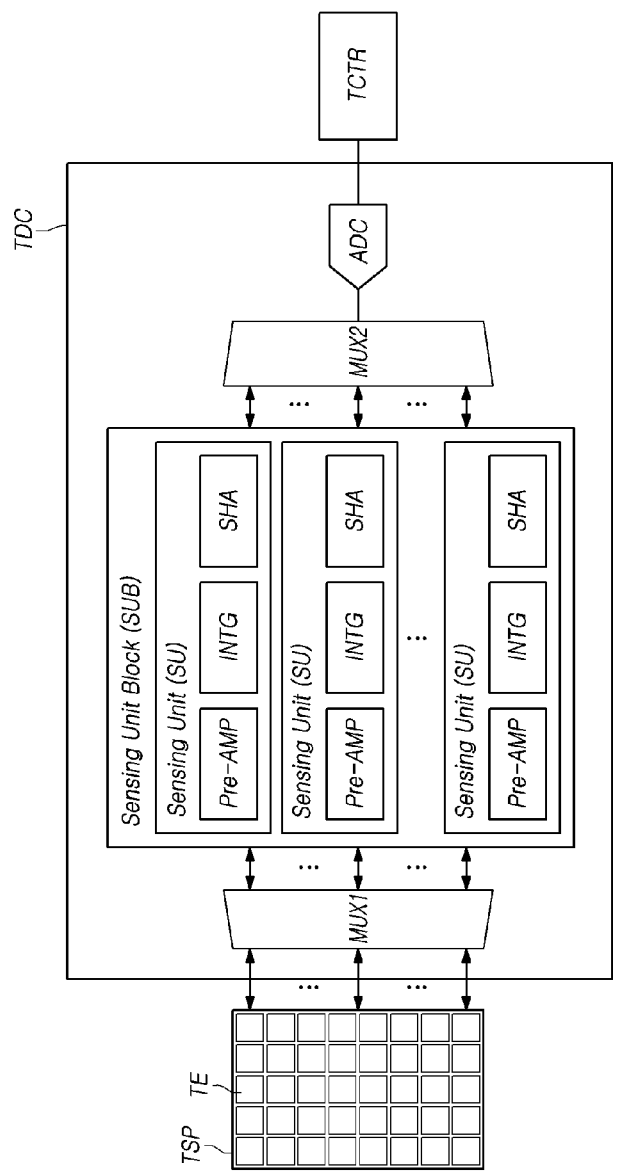
FIG. 24 is a diagram illustrating a configuration of the touch driving circuit of the touchscreen display device according to embodiments.

FIG. 24 is a diagram illustrating a configuration of the touch driving circuit TDC of the touchscreen display device according to embodiments.

Referring to FIG. 24, the touch driving circuit TDC of the touchscreen display device according to embodiments may include a first multiplexer circuit MUX1, a sensing unit block SUB including a plurality of sensing units SU, a second multiplexer circuit MUX2, an analog-to-digital converter ADC, and the like.

The first multiplexer circuit MUX1 may include one or more multiplexers. The second multiplexer circuit MUX2 may include one or more multiplexers.

Referring to FIG. 24, each of the sensing units SU in the sensing unit block SUB may include a preamplifier Pre-AMP, an integrator INTG, a sample and hold circuit SHA, and the like.

The preamplifier Pre-AMP may detect a signal from the touch electrode TE, selected as a sensing target and connected to the preamplifier Pre-AMP, and output the detected signal.

The output signal of the preamplifier Pre-AMP may be input to the integrator INTG. The integrator INTG may output an integrated value by integrating the input signal. The integrated value output from the integrator INTG may be input to the sample and hold circuit. The sample and hold circuit stores the input signal (i.e. the integrated value) therein.

The second multiplexer circuit MUX2 selects one sensing unit SU from among the plurality of sensing units SU and outputs the signal stored in the sample and hold circuit of the selected sensing unit SU. The analog-to-digital converter ADC generates a sensing value by converting the signal, input through the second multiplexer circuit MUX2, into a digital value. The touch driving circuit TDC outputs sensing data including the sensing value generated by the analog-to-digital converter ADC.

The touch controller TCTR may detect at least one of a finger touch, a touch position, or a combination thereof, or may detect information regarding a pen touch, such as a touch, a touch position, a tilt, and additional information regarding the pen 200, on the basis of the sensing data.

The preamplifier Pre-AMP mentioned above may be a charge amplifier. The preamplifier Pre-AMP may be a single-ended charge amplifier to sense a single touch electrode TE or a differential amplifier in the form of a charge amplifier to differentially sense two touch electrodes TE.

Figure 25:
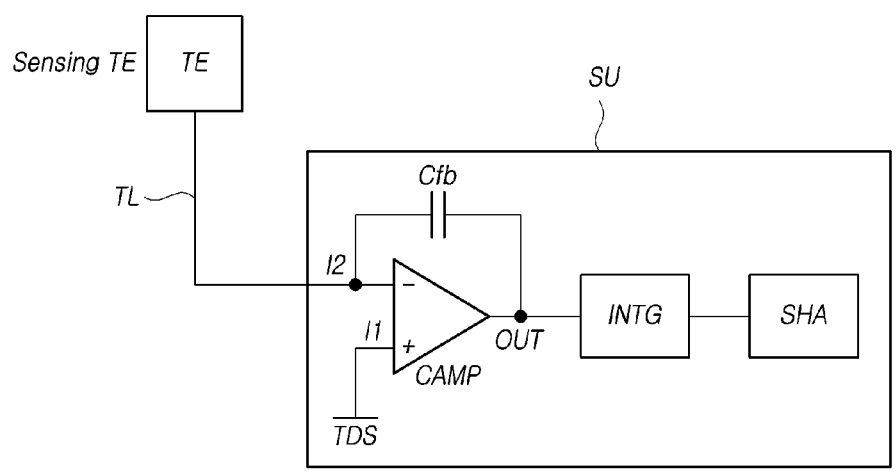
FIG. 25 is a diagram illustrating a sensing unit having a single sensing mode in the touch driving circuit of the touchscreen display device according to embodiments.

FIG. 25 is a diagram illustrating a sensing unit SU having a single sensing mode in the touch driving circuit TDC of the touchscreen display device according to embodiments.

Referring to FIG. 25, the sensing unit SU in the touch driving circuit TDC may sense a single touch electrode TE. This will be referred to as the single sensing mode.

In the case of the single sensing mode, the sensing unit SU may include a single-ended charge amplifier CAMP as a preamplifier Pre-AMP, an integrator INTG, a sample and hold circuit SHA, and the like.

The charge amplifier CAMP may include an operational amplifier and a feedback capacitor Cfb. The touch electrode driving signal TDS is input to the charge amplifier CAMP through a first input port I1. The charge amplifier CAMP may output the input touch electrode driving signal TDS through a second input port I2 to be sent to a corresponding touch electrode TE through a corresponding touch line TL.

The first input port I1 may be a non-inversion input port, while the second input port I2 may be an inversion input port. The first input port I1 and the second input port I2 are ports (or terminals) having opposite polarities. A reference voltage must be applied to the second input port I2 for the operation of the charge amplifier CAMP. The touch electrode driving signal TDS supplied to the touch electrodes TE serves as the reference voltage.

The charge amplifier CAMP may receive the touch sensing signal from the corresponding touch electrode TE through the inversion input port I2. That is, electric charges generated by the touch electrode TE, to which the touch electrode driving signal TDS is applied, are input to the inversion input port I2 of the charge amplifier CAMP. Then, the feedback capacitor Cfb is charged. In response to the feedback capacitor Cfb being charged, a signal is output through an output port OUT of the charge amplifier CAMP.

The integrator INTG outputs an integrated value by integrating the output signal of the charge amplifier CAMP. The sample and hold circuit SHA stores a signal corresponding to the integrated value and outputs the signal to the analog-to-digital converter ADC through the second multiplexer circuit MUX2.

Figure 26:
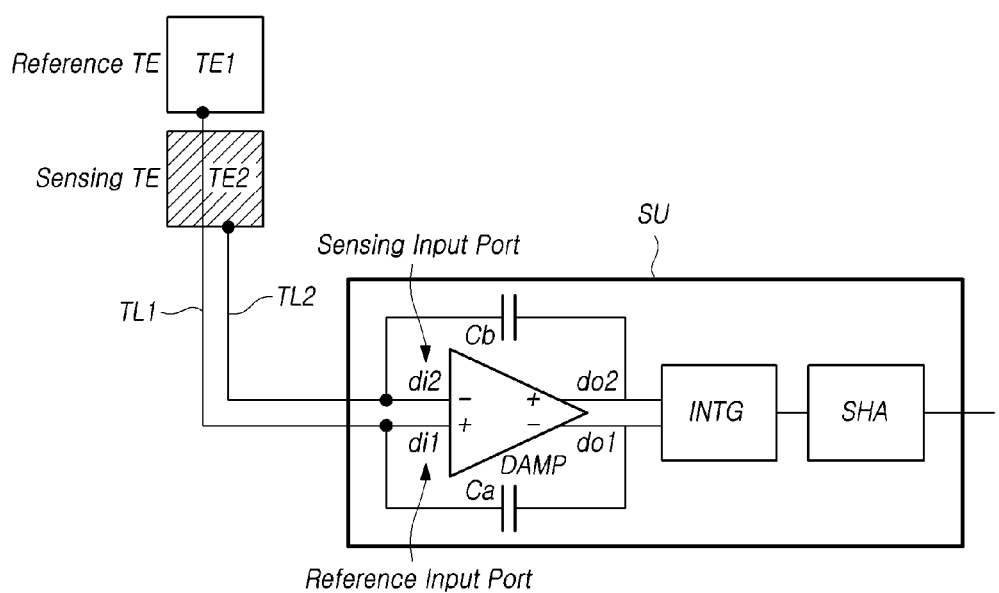
FIG. 26 is a diagram illustrating a sensing unit having a differential sensing mode in the touch driving circuit of the touchscreen display device according to embodiments.

FIG. 26 is a diagram illustrating a sensing unit SU having a differential sensing mode in the touch driving circuit TDC of the touchscreen display device according to embodiments.

Referring to FIG. 26, the sensing unit SU in the touch driving circuit TDC may differentially sense two touch electrodes TE1 and TEL2. This will be referred to as the differential sensing mode. In the two touch electrodes TE1 and TEL2 to be differentially sensed, one touch electrode TE2 is a sensing touch electrode Sensing TE, while the other touch electrode TE1 is a reference touch electrode Reference TE serving as a reference in the sensing of the sensing touch electrode Sensing TE.

In the case of the differential sensing mode, the sensing unit SU may include a differential amplifier DAMP, an integrator INTG, a sample and hold circuit SHA, and the like.

The differential amplifier DAMP may output a differential sensing signal by differentially amplifying a first input signal and a second input signal received from the first touch electrode TE1 and the second touch electrode TE2 through a reference input port di1 and a sensing input port di2.

In the differential amplifier DAMP, the reference input port di1 is an input port to which the reference touch electrode Reference TE is electrically connected, while the sensing input port di2 is an input port to which the sensing touch electrode Sensing TE is electrically connected. In the differential amplifier DAMP, the reference input port di1 may be a non-inversion input port, while the sensing input port di2 may be an inversion input port. The reference input port di1 and the sensing input port di2 may be ports (or terminals) having opposite polarities.

The differential amplifier DAMP may have a single output port.

In some cases, the differential amplifier DAMP may have two output ports do1 and do2. In this case, the differential sensing signal of the differential amplifier DAMP may include a first output signal and a second output signal. Such a differential amplifier DAMP may be a fully differential amplifier.

The difference between the first output signal and the second output signal output from the two output ports do1 and do2 of the differential amplifier DAMP may be proportional to the difference between the first input signal and the second input signal.

In the differential amplifier DAMP, a first capacitor Ca may be connected to the reference input port di1 and the first output port do1, and a second capacitor Cb may be connected to the sensing input port di2 and the second output port do2.

For example, in the sensing unit SU, in a case in which the second touch electrode TE2 is designated as a sensing touch electrode and the first touch electrode TE1 is designated as a reference touch electrode, a result of one-time differential sensing using the differential amplifier DAMP is a sensing result of the second touch electrode TE2, i.e. the sensing touch electrode.

Afterwards, in a case in which a sensing result of the first touch electrode TE1 is necessary, the sensing unit SU may perform differential sensing again by designating the first touch electrode TE1 as a sensing touch electrode and the second touch electrode TE2 as a reference touch electrode.

In addition, in a case in which the touchscreen display device performs the touch driving during the display driving, the display driving may cause a voltage change in the data lines DL and the gate lines GL, so that the voltage change or parasitic capacitance may occur in the touch electrodes TE. When the differential sensing is used, the unnecessary phenomenon occurring in the touch electrodes TE in the simultaneous driving may be canceled by the differential sensing of the two touch electrodes TE1 and TE2, thereby improving touch sensitivity.

Figure 27:
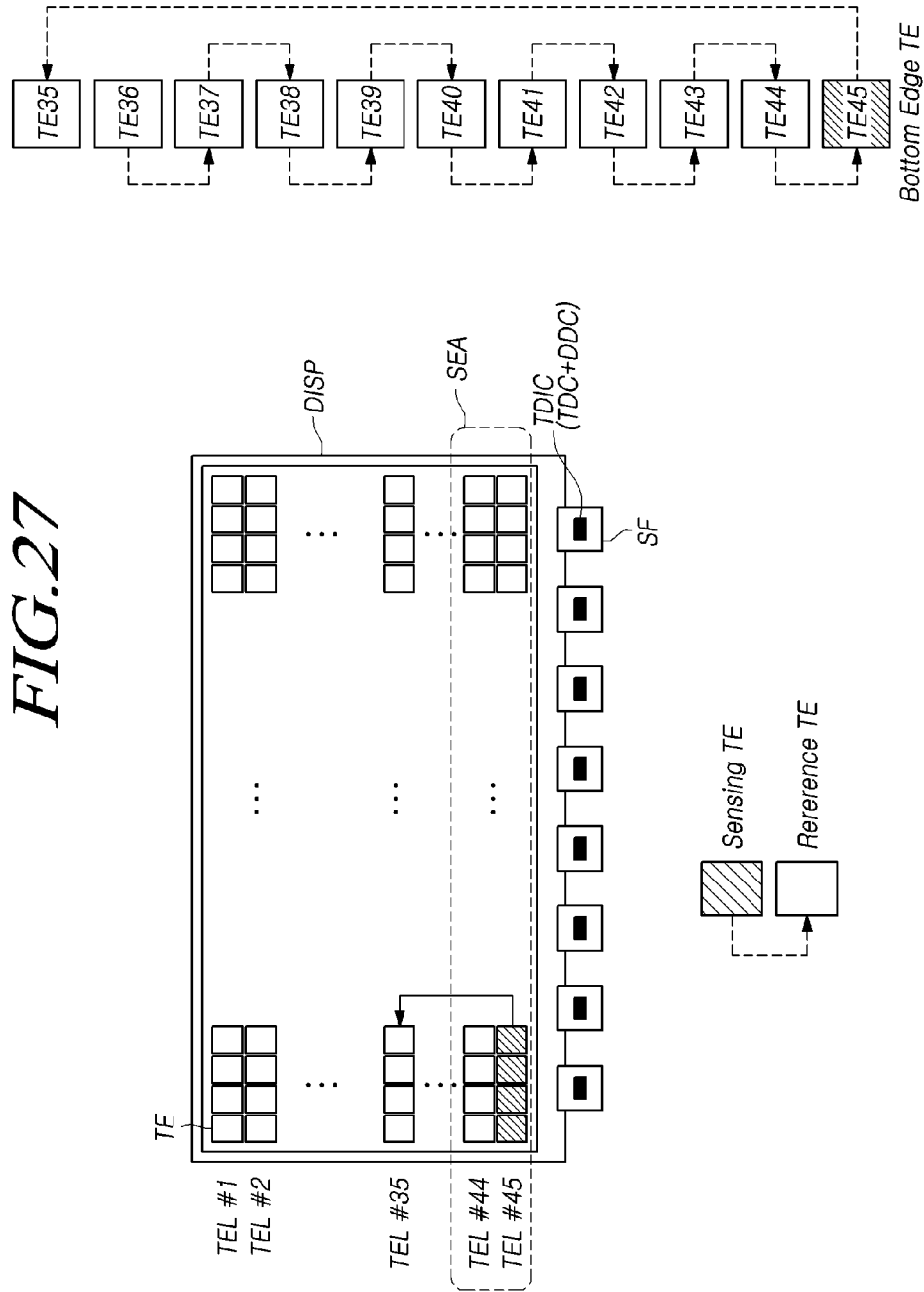
FIG. 27 is a diagram illustrating the differential sensing of the touchscreen display device according to embodiments.

FIG. 27 is a diagram illustrating the differential sensing of the touchscreen display device according to embodiments.

Referring to FIG. 27, one or more touch driving circuits TDC of the touchscreen display device according to embodiments may be disposed on one side of the display panel DISP. One side of the display panel DISP, to which one or more touch driving circuits TDC are electrically connected, may be the upper, lower, right, or left side of the display panel DISP. Hereinafter, for the sake of brevity, one side of the display panel DISP, to which one or more touch driving circuits TDC are electrically connected, will be referred to as the lower side of the display panel DISP. In addition, spatially relative terms, such as "upper (above)", "lower (below)", "right", and "left", may be used herein for convenience in the distinction of the positions or directions, but should be construed as encompassing different positions or directions.

Referring to FIG. 27, an area, in which one or more touch electrode lines (e.g. TEL #44 and TEL #45) close to the bottom of the display panel DISP, from among the plurality of touch electrode lines TEL #1 to TEL #45, are located, will be referred to as a sensing edge area SEA.

Referring to FIG. 27, the touchscreen display device must designate the sensing touch electrode Sensing TE and the reference touch electrode Reference TE to be compared therewith to enable the differential sensing. In this regard, the touchscreen display device designates the touch electrode TE, located "below" the sensing touch electrode Sensing TE, as the reference touch electrode Reference TE.

Here, the reference touch electrode Reference TE located "below" the sensing touch electrode Sensing TE is the touch electrode, located closer to the touch driving circuit TDC connected to one side (e.g. the bottom) of the display panel DISP, of two touch electrodes close to the sensing touch electrode Sensing TE.

Referring to FIG. 27, in a case in which the touchscreen display device performs the differential sensing by using the sensing touch electrode Sensing TE and the reference touch electrode Reference TE located directly "below" the sensing touch electrode Sensing TE, the reference touch electrode Reference TE differentially sensed with respect to the touch electrode TE45, i.e. the "bottom edge touch electrode"

included in the lowermost touch electrode line TEL #45, may be a touch electrode TE located above the bottom edge touch electrode TE45 by several lines, instead of being directly adjacent to the bottom edge touch electrode TE45.

In an example, the reference touch electrode Reference TE differentially sensed with respect to the touch electrode TE45 may be the top edge touch electrode TE included in the uppermost touch electrode line TEL #1.

In another example, the reference touch electrode Reference TE differentially sensed with respect to the touch electrode TE45 may be a touch electrode TE included in a touch electrode line between the second touch electrode line TEL #2 and the 44th touch electrode line TEL #44. In this case, for example, as illustrated in FIG. 27, the reference touch electrode Reference TE differentially sensed with respect to the touch electrode TE45 may be the 35th touch electrode TE TE35 located above the bottom edge touch electrode TE45 by 10 lines.

For example, during a first sensing timing period tSEN1, pairs of touch electrodes (sensing touch electrode-reference touch electrode) for the differential sensing may include TE37-TE38, TE39-TE40, TE41-TE42, TE43-TE44, TE45-TE35, and the like.

During a second sensing timing period tSEN2 different from the first sensing timing period tSEN1, the touch electrode pairs (sensing touch electrode-reference touch electrode) for the differential sensing may include TE37-TE38, TE39-TE40, TE41-TE42, TE43-TE44, TE45-TE35, and the like.

FIG. 28 is a diagram illustrating channel-specific time constants in the differential sensing of FIG. 27. Here, the channels #1 to #45 correspond to the touch electrode lines TEL #1 to TEL #45.

Referring to FIG. 28, the channel-specific time constants are time constants RC that the touch electrodes TE have according to the touch electrode lines TEL #1 to TEL #45. The touch lines TL electrically connected to the touch driving circuit TDC have different lengths according to the touch electrode lines TEL #1 to TEL #45.

For example, the length of the touch line TL45 connecting the touch electrode TE included in the 45th touch electrode line TEL #45 and the touch driving circuit TDC is shorter than the length of the touch line TL1 connecting the touch electrode TE included in the first touch electrode line TEL #1 and the touch driving circuit TDC. Thus, referring to FIG. 28, the touch electrode TE included in the 45th touch electrode line TEL #45 has the smallest time constant of 30 ns. The touch electrode TE included in the first touch electrode line TEL #1 has the largest time constant of 250 ns.

Referring to FIG. 28, in a case in which the sensing touch electrode Sensing TE is not the bottom touch electrode TE45, in the differential sensing of the sensing touch electrode Sensing TE and the reference touch electrode Reference TE located directly below the sensing touch electrode Sensing TE, the deviation of the time constant RC between the sensing touch electrode Sensing TE and the reference touch electrode Reference TE is about 5 ns.

However, in a case in which the sensing touch electrode Sensing TE is the bottom touch electrode TE45, in the differential sensing of the bottom touch electrode TE45 and the touch electrode TE35 located above the reference touch electrode Reference TE by several lines, the deviation of the time constant RC between the sensing touch electrode Sensing TE and the reference touch electrode Reference TE is about 50 ns.

As described above, it may be appreciated that, when the differential sensing is performed, the time constant 80 ns of the reference touch electrode Reference TE of the sensing touch electrode TE45, i.e. the bottom touch electrode, is significantly increased by 166% from the time constant 30 ns of the sensing touch electrode TE45, i.e. the bottom touch electrode. Due to such an increase in the time constant, sensing data that the touchscreen display device obtains from the sensing edge area SEA may be meaningless and abnormal, and thus, the touch sensing itself may be impossible Hereinafter, a plurality of methods able to not only reduce poor touch sensitivity in the sensing edge area SEA, but also improve touch sensing performance, will be described herein.

Hereinafter, three methods for reducing poor touch sensitivity in the sensing edge area SEA will be proposed. The three methods may include 1) a method of controlling the sequence of differential sensing, 2) a method of using internal correction resistors of the touch driving circuit TDC, and 3) a method of controlling signal characteristics.

1) Differential Sensing Based on Differential Sensing Sequence

Figure 29:
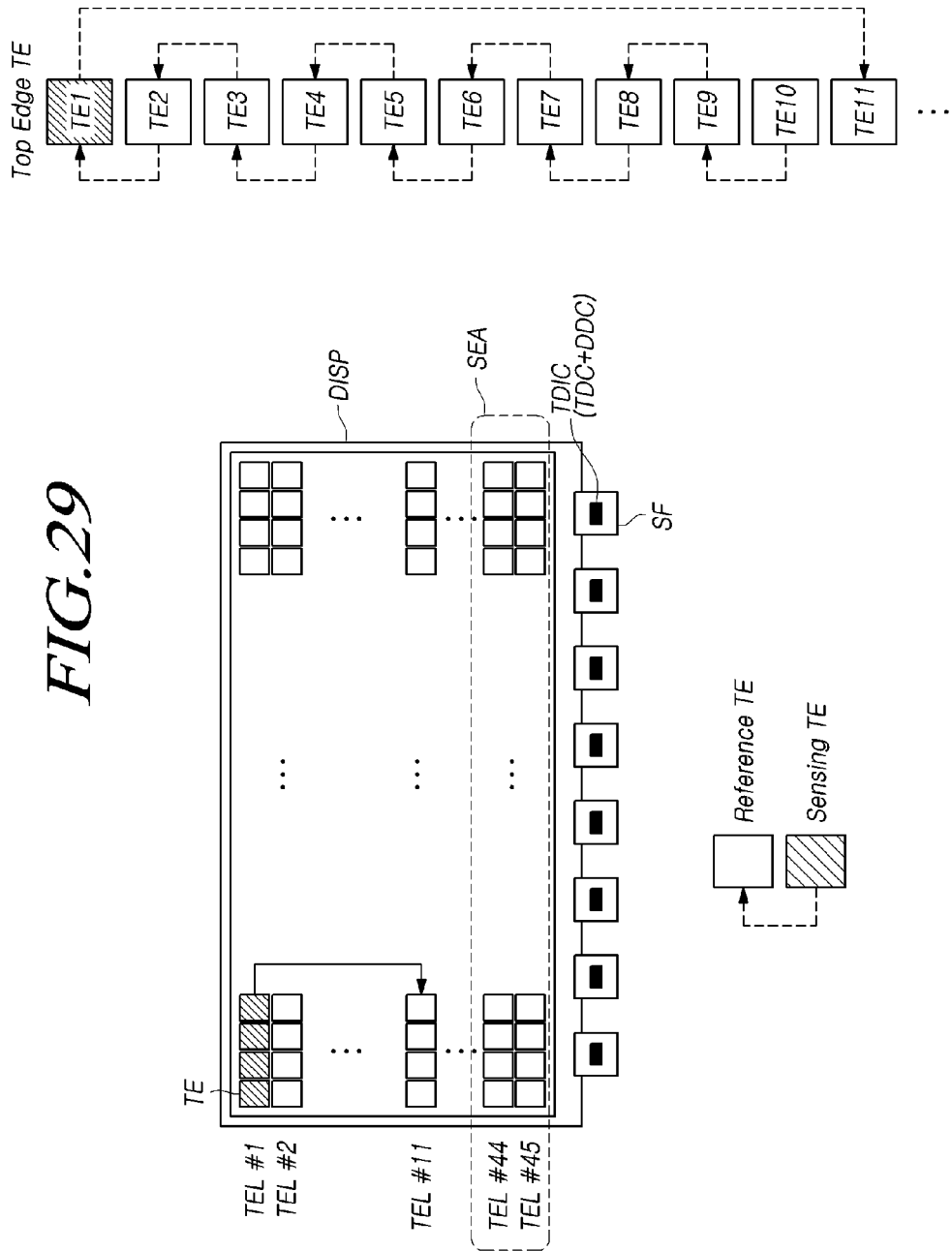
FIGS. 29 and 30 are diagrams illustrating a differential sensing method based on differential sensing sequence control, designed to improve touch sensing performance in the edge area in the touchscreen display device according to embodiments.
Figure 30:
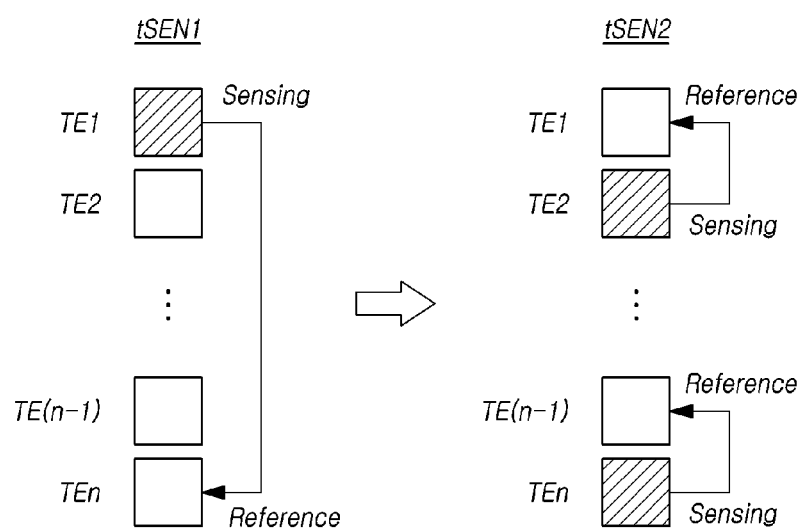

FIGS. 29 and 30 are diagrams illustrating a differential sensing method based on differential sensing sequence control, designed to improve touch sensing performance in the edge area in the touchscreen display device according to embodiments, and FIG. 31 is a diagram illustrating channel-specific time constants in the differential sensing method illustrated in FIGS. 29 and 30.

Referring to FIG. 29, the touchscreen display device according to embodiments may include: the display panel DISP including the plurality of data lines DL, the plurality of gate lines GL, the plurality of touch electrodes TE, and the plurality of touch lines TL; and the touch driving circuit TDC located on one side of the display panel DISP, electrically connected to the touch electrodes TE through the plurality of touch lines TL, and differentially sensing two touch electrodes TE selected from among the plurality of touch electrodes TE.

Referring to FIG. 29, the touchscreen display device must designate the sensing touch electrode Sensing TE and the reference touch electrode Reference TE to be compared therewith.

Referring to FIG. 29, the touchscreen display device may perform the differential sensing in an order opposite to that of the differential sensing illustrated in FIG. 27. In this regard, the touchscreen display device designates the touch electrode TE located "above" the sensing touch electrode Sensing TE as the reference touch electrode Reference TE.

The reference touch electrode Reference TE located "above" the sensing touch electrode Sensing TE is the touch electrode TE located farther from the touch driving circuit TDC connected to one side (e.g. the bottom) of the display panel DISP, of two touch electrodes TE close to the sensing touch electrode Sensing TE.

Referring to FIG. 29, when the touchscreen display device performs the differential sensing by using the sensing touch electrode Sensing TE and the reference touch electrode Reference TE located directly "above" the sensing touch electrode Sensing TE, the reference touch electrode Reference TE to be differentially sensed with respect to the touch electrode TE1, i.e. the "top edge touch electrode" included in the uppermost touch electrode line TEL #45, may be a touch electrode TE located below the top edge touch electrode TE1 by several lines, instead of being directly adjacent to the top edge touch electrode TE1.

In an example, the reference touch electrode Reference TE to be differentially sensed with respect to the top edge touch electrode TE1 may be the bottom edge touch electrode TE45 included in the lowermost touch electrode line TEL #45.

In another example, the reference touch electrode Reference TE to be differentially sensed with respect to the top edge touch electrode TE1 may be a touch electrode TE included in a touch electrode line between the second touch electrode line TEL #2 and the 44th touch electrode line TEL #44. In this case, for example, as illustrated in FIG. 29, the reference touch electrode Reference TE to be differentially sensed with respect to the top edge touch electrode TE1 may be the 11th touch electrode TE11 located below the top edge touch electrode TE1 by 10 lines.

For example, during the first sensing timing period tSEN1, touch electrode pairs (sensing touch electrode-reference touch electrode) for the differential sensing may include T2-T1, T4-T3, T6-T5, T8-T7, T10-T9, and the like.

During the second sensing timing period tSEN2 different from the first sensing timing period tSEN1, touch electrode pairs (sensing touch electrode-reference touch electrode) for the differential sensing may include T3-T2, T5-T4, T7-T6, T9-T8, and the like.

Briefly described in a generalized manner with reference to FIG. 30, the plurality of touch electrodes TE disposed in the display panel DISP may include n number of touch electrodes TE (where n=11 in FIG. 29).

The first touch electrode TE1 among the n number of touch electrodes TE may be located farthest from the touch driving circuit TDC. The nth touch electrode TEn among the n number of touch electrodes TE may be disposed closest to the touch driving circuit TDC.

Here, according to the touch electrode arrangement structure of the display panel DISP illustrated in FIG. 29 and a case in which the reference touch electrode Reference TE to be differentially sensed with respect to the top edge touch electrode TE1 is the 11th touch electrode TE11 located 10 line below, the first touch electrode TE1 may be touch electrodes included in the first touch electrode line TEL #1, the 12th touch electrode line TEL #12, the 23rd touch electrode line TEL #23, the 34th touch electrode line TEL #34, and the like. The nth touch electrode TEn may be a touch electrode included in the 11th touch electrode line TEL #11, the 22nd touch electrode line TEL #22, the 33rd touch electrode line TEL #33, the 44th touch electrode line TEL #44, or the like.

During the first sensing timing period tSEN1, the touch driving circuit TDC may differentially sense the third touch electrode TE3 selected as the sensing touch electrode Sensing TE from among the n number of touch electrodes TE1 to TEn and the second touch electrode TE2 selected as the reference touch electrode Reference TE from among the n number of touch electrodes TE1 to TEn. The second touch electrode TE2 is located directly above the third touch electrode TE3.

During the first sensing timing period tSEN1, the touch driving circuit TDC may differentially sense the first touch electrode TE1 selected as the sensing touch electrode Sensing TE from among the n number of touch electrodes TE1 to TEn and the nth touch electrode TEn selected as the reference touch electrode Reference TE from among the n number of touch electrodes TE1 to TEn.

During the second sensing timing period tSEN2 different from the first sensing timing period tSEN1, the touch driving circuit TDC may differentially sense the nth touch electrode TEn and the (n−1)th touch electrodes TE by selecting the nth touch electrode TEn as the sensing touch electrode Sensing TE for the differential sensing and selecting the (n−1)th touch electrodes TE as the reference touch electrode Reference TE for the differential sensing from among the n number of touch electrodes TE.

During the second sensing timing period tSEN2 different from the first sensing timing period tSEN1, the touch driving circuit TDC may differentially sense the second touch electrodes TE and the first touch electrode TE1 by selecting the second touch electrode TE as the sensing touch electrode Sensing TE for the differential sensing from among the n number of touch electrodes TE and selecting the first touch electrode TE1 as the reference touch electrode Reference TE for the differential sensing.

The time constant of the first touch electrode TE1 may be greater than the time constant of the nth touch electrode TEn. The deviation of the time constant between the first touch electrode TE1 and the nth touch electrode TEn may be greater than the deviation of the time constant between the second touch electrodes TE and the first touch electrode TE1. The deviation of the time constant between the first touch electrode TE1 and the nth touch electrode TEn may be greater than the deviation of the time constant between the (n−1)th touch electrodes TE and the nth touch electrode TEn, from among the n number of touch electrodes TE.

In a touch electrode pair in which the first touch electrode TE1 is the sensing touch electrode and the nth touch electrode TEn is the reference electrode, the time constant of the nth touch electrode TEn serving as the reference touch electrode may be smaller than that of the first touch electrode TE1 serving as the sensing touch electrode.

However, in the touch electrode pairs other than the touch electrode pair in which first touch electrode TE1 is the sensing touch electrode and the nth touch electrode TEn is the reference touch electrode, the time constant of the reference touch electrode may be greater than that of the sensing touch electrode.

Referring to FIG. 31, the time constant 250 ns of the first touch electrode TE1 may be greater than the time constant 200 ns of the 11th touch electrode TE11.

Referring to FIG. 31, the deviation 50 ns of the time constant between the first touch electrode TE1 and the 11th touch electrode TE11 may be greater than the deviation 5 ns of the time constant between the second touch electrodes TE and the first touch electrode TE1. The deviation 50 ns of the time constant between the first touch electrode TE1 and the 11th touch electrode TE11 may be greater than the deviation 5 ns of the time constant between the 10th touch electrodes TE and 11th touch electrode TEn.

It may be appreciated that the time constant 200 ns related to the reference touch electrode Reference TE of the sensing touch electrode TE1, i.e. the top touch electrode, is reduced by about 20% from the time constant 250 ns of the sensing touch electrode TE1, i.e. the top touch electrode. Such a decrease in the time constant may be regarded as being significant compared to the relatively large increase in the time constant in FIG. 28. Accordingly, the touchscreen display device may obtain appropriate sensing data from the sensing edge area SEA by the differential sensing sequence control, and thus, touch sensing performance may be significantly improved.

Figure 32:
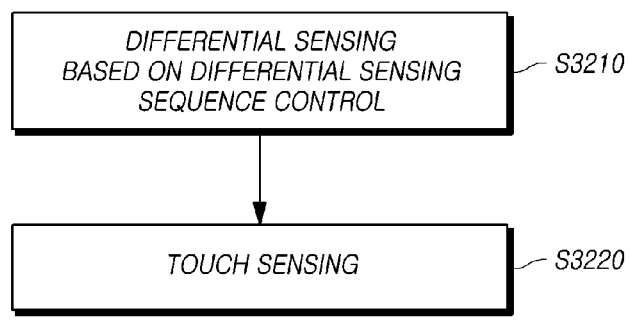
FIG. 32 is a flowchart illustrating a driving method of the touchscreen display device according to embodiments.

FIG. 32 is a flowchart illustrating a driving method of the touchscreen display device according to embodiments.

Referring to FIG. 32, the driving method of the touchscreen display device according to embodiments may include differential sensing step S3210 of differentially sensing, by the touch driving circuit TDC, two touch electrodes TE selected from among the plurality of touch electrodes TE, that is, differential sensing based on differential sensing sequence control; touch sensing step S3220 of detecting a touch according to a result of the differential sensing; and the like.

The plurality of touch electrodes TE disposed in the display panel DISP may include n number of touch electrodes TE disposed in order (where n=11 in FIG. 29).

The first touch electrode TE1 among the n number of touch electrodes TE may be disposed farthest from the touch driving circuit TDC. The nth touch electrode TEn among the n number of touch electrodes TE may be disposed closest to the touch driving circuit TDC.

In step S3210, the touch driving circuit TDC may differentially sense the third touch electrode TE3 selected as the sensing touch electrode Sensing TE from among the n number of touch electrodes TE1 to TEn and the second touch electrode TE2 selected as the reference touch electrode Reference TE from among the n number of touch electrodes TE1 to TEn. The second touch electrode TE2 is located directly above the third touch electrode TE3.

In step S3210, the touch driving circuit TDC may differentially sense the first touch electrode TE1 selected as the sensing touch electrode Sensing TE from among the n number of touch electrodes TE1 to TEn and the and the nth touch electrode TEn selected as the reference touch electrode Reference TE from among the n number of touch electrodes TE1 to TEn.

The touch driving circuit TDC of the touchscreen display device according to embodiments may include: the differential amplifier DAMP differentially sensing two touch electrodes TE selected from among the plurality of touch electrodes TE; the analog-to-digital converter ADC outputting a sensing value on the basis of the output signal of the differential amplifier DAMP; and the like.

The touch driving circuit TDC may be located on one side of the display panel DISP.

The plurality of touch electrodes TE disposed in the display panel DISP may include n number of touch electrodes TE disposed in order (where n=11 in FIG. 29).

The first touch electrode TE1 among the n number of touch electrodes TE may be disposed farthest from the touch driving circuit TDC. The nth touch electrode TEn among the n number of touch electrodes TE may be disposed closest to the touch driving circuit TDC.

The differential amplifier DAMP may differentially sense the third touch electrode TE3 selected as the sensing touch electrode Sensing TE from among the n number of touch electrodes TE1 to TEn and the second touch electrode TE2 selected as the reference touch electrode Reference TE from among the n number of touch electrodes TE1 to TEn. The second touch electrode TE2 is located directly above the third touch electrode TE3.

The differential amplifier DAMP may differentially sense the first touch electrode TE1 selected as the sensing touch electrode Sensing TE from among the n number of touch electrodes TE1 to TEn and the nth touch electrode TEn selected as the reference touch electrode Reference TE from among the n number of touch electrodes TE1 to TEn.

According to the touchscreen display device, the driving method thereof, and the touch driving circuit TDC as described above, appropriate data may be obtained from the sensing edge area SEA by the differential sensing sequence control, and thus, touch sensing performance may be significantly improved.

Figure 33:
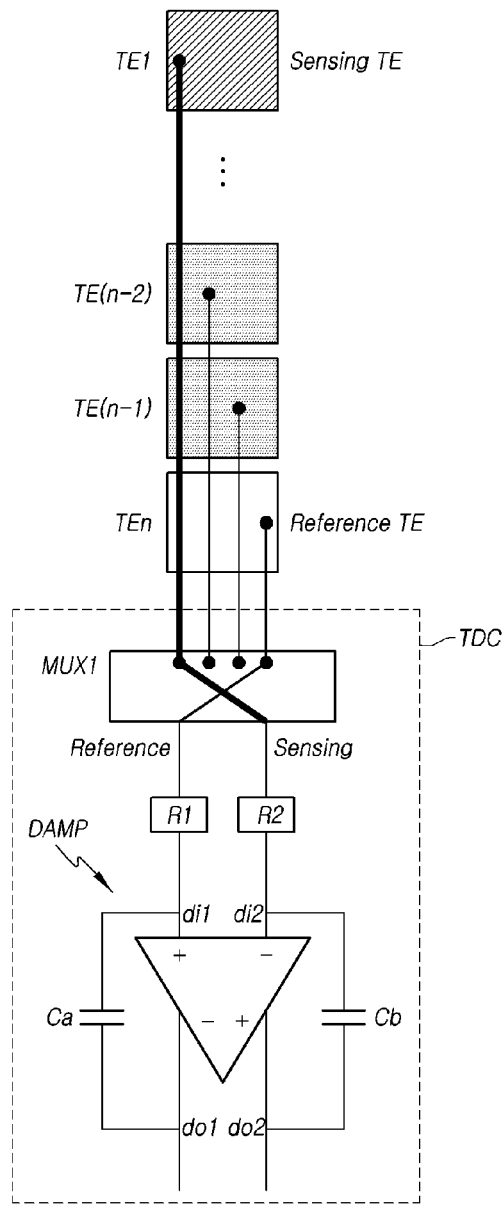
FIGS. 33 and 34 are diagrams illustrating a differential sensing method based on correction resistance within the touch driving circuit, designed to improve touch sensing performance in the edge area in the touchscreen display device according to embodiments.
Figure 34:
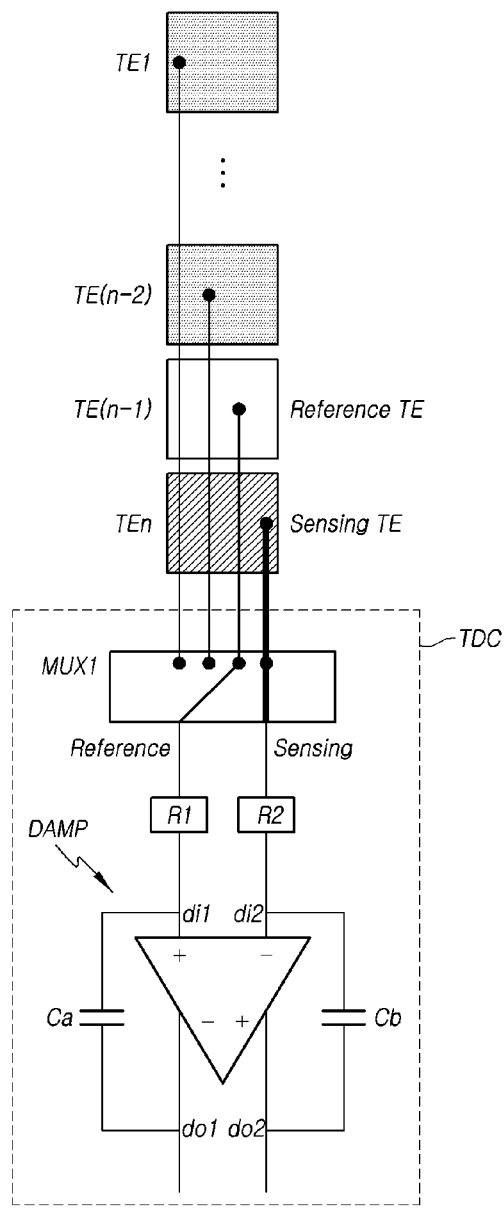

2) Differential Sensing Based on Internal correction resistors in Touch Driving Circuit FIGS. 33 and 34 are diagrams illustrating a differential sensing method based on correction resistance within the touch driving circuit TDC, designed to improve touch sensing performance in the edge area in the touchscreen display device according to embodiments.

Referring to FIGS. 33 and 34, the touch driving circuit TDC may include the differential amplifier DAMP differentially sensing two touch electrodes TE selected from among the plurality of touch electrodes TE and first and second correction resistors R1 and R2 electrically connected between the two touch electrodes TE and the differential amplifier DAMP.

Referring to FIG. 33, during the first sensing timing period tSEN1, the differential amplifier DAMP may differentially sense the first touch electrode TE1 selected as the sensing touch electrode Sensing TE by the first multiplexer circuit MUX1 and the nth touch electrode TEn selected as the reference touch electrode Reference TE by the first multiplexer circuit MUX1.

The first correction resistor R1 may be electrically connected between the nth touch electrode TEn selected as the reference touch electrode Reference TE and the differential amplifier DAMP.

More specifically, the first correction resistor R1 may be electrically connected between the touch line TL, connected to the nth touch electrode TEn selected as the reference touch electrode Reference TE, and the reference input port di1 of the differential amplifier DAMP.

The second correction resistor R2 may be electrically connected between the first touch electrode TE1 selected as the sensing touch electrode Sensing TE and the differential amplifier DAMP.

More specifically, the second correction resistor R2 may be electrically connected between the touch line TL, connected to the first touch electrode TE1 selected as the sensing touch electrode Sensing TE, and the sensing input port dig of the differential amplifier DAMP.

Each of the first correction resistor R1 and the second correction resistor R2 may be a variable resistor, the resistance of which may be set variably.

During the first sensing timing period tSEN1, the resistance of the first correction resistor R1 may be higher than that of the second correction resistor R2 (resistance of R1>resistance of R2).

Accordingly, the time constant present between the nth touch electrode TEn selected as the reference touch electrode Reference TE and the reference input port di1 of the differential amplifier DAMP and the time constant present between the first touch electrode TE1 selected as the sensing touch electrode Sensing TE and the sensing input port dig of the differential amplifier DAMP may be the same or similar to a level at which touch sensitivity reduction may be reduced.

Referring to FIG. 34, during the second sensing timing period tSEN2 different from the first sensing timing period tSEN1, the differential amplifier DAMP may differentially sense the nth touch electrode TEn selected as the sensing touch electrode Sensing TE and the (n−1)th touch electrode TE(n−1) selected as the reference touch electrode Reference TE.

The first correction resistor R1 may be electrically connected between the (n−1)th touch electrode TE(n−1) selected as the reference touch electrode Reference TE and the differential amplifier DAMP.

More specifically, the first correction resistor R1 may be electrically connected to the touch line TL, connected between the (n−1)th touch electrode TE(n−1) selected as the reference touch electrode Reference TE, and the reference input port di1 of the differential amplifier DAMP.

The second correction resistor R2 may be electrically connected between the nth touch electrode TEn selected as the sensing touch electrode Sensing TE and the differential amplifier DAMP.

More specifically, the second correction resistor R2 may be electrically connected between the touch line TL, connected to the nth touch electrode TEn selected as the sensing touch electrode Sensing TE, and the sensing input port di2 of the differential amplifier DAMP.

During the second sensing timing period tSEN2, the resistance of the second correction resistor R2 may be higher than that of the first correction resistor R1 (resistance of R2>resistance of R1).

Accordingly, the time constant present between the (n−1)th touch electrode TE(n−1) selected as the reference touch electrode Reference TE and the reference input port di1 of the differential amplifier DAMP and the time constant present between the nth touch electrode TEn selected as the sensing touch electrode Sensing TE and the sensing input port di2 may be the same or similar at a level at which touch sensitivity reduction may be reduced.

Figure 35:
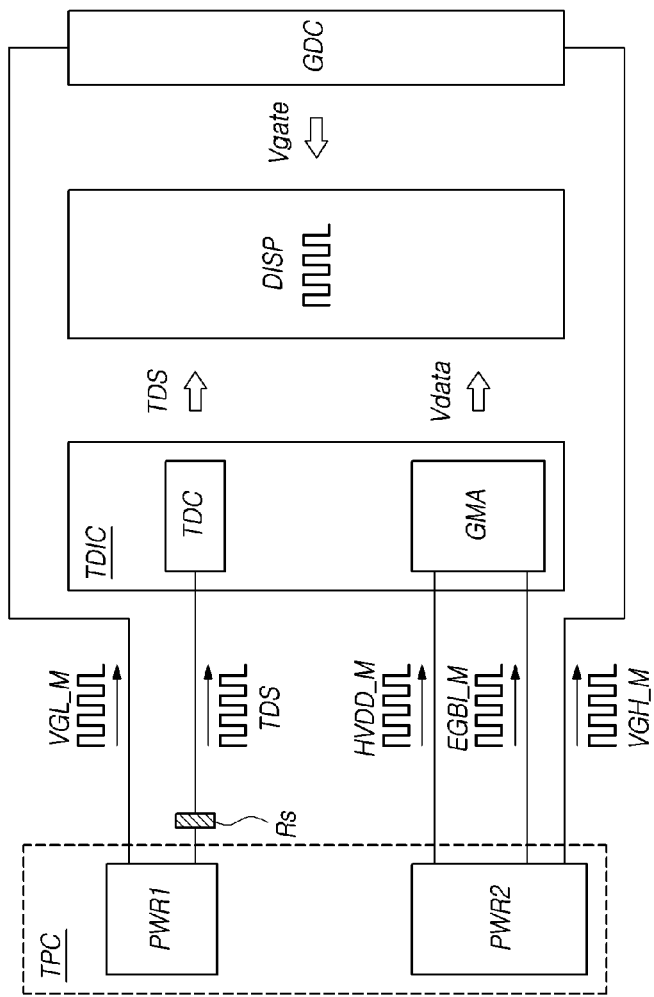
FIGS. 35 and 36 are diagrams illustrating a sensing method based on signal characteristics control in relation to a first power circuit, designed to improve touch sensing performance in the edge area in the touchscreen display device according to embodiments.
Figure 36:
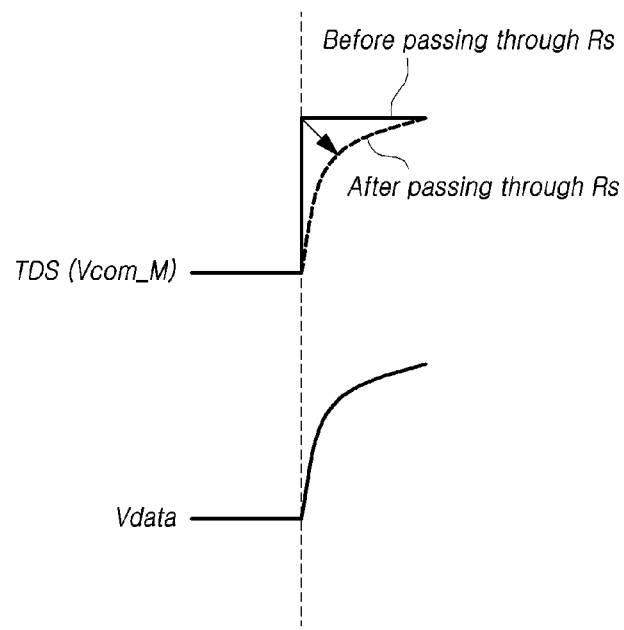

3) Sensing Based on Signal Characteristics Control 3-1) Sensing Based on Signal Characteristics Control in Relation to First Power circuit FIGS. 35 and 36 are diagrams illustrating a sensing method based on signal characteristics control in relation to a first power circuit PWR1, designed to improve touch sensing performance in the edge area in the touchscreen display device according to embodiments.

Referring to FIG. 35, the touchscreen display device according to embodiments may include: the display panel DISP including the plurality of data lines DL, the plurality of gate lines GL, and the plurality of touch electrodes TE; the gate driving circuit GDC sequentially outputting gate signals Vgate to the plurality of gate lines GL; the data driving circuit DDC outputting data signals Vdata, converted from digital image signals in response to the gamma reference voltage EGBI_M, to the plurality of data lines DL; and the touch driving circuit TDC outputting the touch electrode driving signal TDS to at least one touch electrodes TE among the plurality of touch electrodes TE.

Referring to FIG. 35, the touch power circuit of the touchscreen display device according to embodiments may include: the first power circuit PWR1 supplying the touch electrode driving signal TDS to the touch driving circuit TDC; and a second power circuit PWR2 supplying the gamma reference voltage EGBI_M modulated in synchronization with the touch electrode driving signal TDS to the data driving circuit DDC.

Referring to FIG. 35, the first power circuit PWR1 outputs the touch electrode driving signal TDS, the modulated turn-off-level gate voltage, and the like. The gamma reference voltage EGBI_M, the half driving voltage HVDD_M, and the modulated turn-on-level gate voltage VGH_M are output from the second power circuit PWR2.

The data driving circuit DDC stores the image data Data input from the display controller DCTR, performs digital-to-analog conversion using the gamma reference voltage EGBI_M and the half driving voltage HVDD_M output from the second power circuit PWR2, performs signal amplification or the like, and thus, outputs data signals Vdata.

As described above, the data signals Vdata are supplied to the display panel DISP after having passed through a plurality of relatively complicated processes in the data driving circuit DDC. Thus, a significant amount of time may be required before the data signals Vdata are actually applied to the display panel DISP from points in time at which the gamma reference voltage EGBI_M and the half driving voltage HVDD_M are output from the second power circuit PWR2.

In contrast, the touch driving circuit TDC supplies the touch electrode driving signals TDS, output from the first power circuit PWR1, to the display panel DISP without relatively complicated processing.

Accordingly, a significant amount of time is not required for the touch electrode driving signals TDS to be actually applied to the display panel DISP from points in time at which the touch electrode driving signals TDS are output from the first power circuit PWR1.

In a case (Case 1) in which the display driving and the touch driving are simultaneously performed, the data signals Vdata must be modulated according to the swing characteristics (e.g. frequency, amplitude, or phase) of the touch electrode driving signals TDS, as illustrated in FIG. 18 or 19.

Then, when the touch electrode driving signals TDS are omitted from the data signals Vdata, the original data signals for the image display may be restored so that the image display may be enabled properly. That is, the image display may not be performed properly unless the load free driving is accurately performed. In addition, accurate touch sensing may not be performed unless accurate load free driving is performed.

However, as described above, due to the delay difference between the data signals Vdata and the touch electrode driving signals TDS, accurate load free driving may not be performed.

In this regard, the touchscreen display device according to embodiments may control signal characteristics in relation to the first power circuit PWR1.

Referring to FIG. 35, the touchscreen display device according to embodiments may further include at least one resistor Rs disposed on a path through which the touch electrode driving signal TDS is transferred from the first power circuit PWR1 to the display panel DISP through the touch driving circuit TDC.

The at least one resistor Rs is a device controlling signal characteristics (e.g. a voltage variation rate/gradient, rising rate/gradient, or falling rate/gradient) of the touch electrode driving signal TDS output from the first power circuit PWR1.

The at least one resistor Rs may be directly connected to the output port of the first power circuit PWR1 or may be present on a signal line (possibly a signal line provided on the PCB or the SF) between the power circuit PWR1 and the touch driving circuit TDC.

The at least one resistor Rs may forcibly delay the output of the touch electrode driving signal TDS from the first power circuit PWR1 or forcibly cause a signal transfer delay in a signal path before the touch electrode driving signal TDS output from the first power circuit PWR1 is applied to the display panel DISP.

The delay resistor Rs may be disposed on a path through which the touch electrode driving signal TDS is transferred to all of the touch electrodes TE. The delay resistor Rs may be selectively disposed on a path through which the touch electrode driving signal TDS is transferred to the touch electrodes TE remote from the touch driving circuit TDC.

Referring to FIG. 36, the voltage variation gradient of the touch electrode driving signal TDS between the delay resistor Rs and the display panel DISP may be smaller than the voltage variation gradient of the touch electrode driving signal TDS between the first power circuit PWR1 and the delay resistor Rs.

The touch electrode driving signal TDS output from the first power circuit PWR1 may have a signal waveform having a lower voltage variation rate after having passed through the delay resistor Rs. That is, the delay resistor Rs may forcibly cause a transfer delay in the touch electrode driving signal TDS between the first power circuit PWR1 and the touch driving circuit TDC.

The delay resistor Rs may be disposed on a printed circuit (e.g. PCB or SF) between the first power circuit PWR1 and the touch driving circuit TDC or may be connected to an output port of the first power circuit PWR1.

The touch power circuit TPC including the first power circuit PWR1 and the second power circuit PWR2 may be implemented as a single TPIC. Alternatively, in the first power circuit PWR1 and the second power circuit PWR2 of the touch power circuit TPC, the first power circuit PWR1 may be included in the TPIC, while the second power circuit PWR2 may be provided outside the TPIC.

Figure 37:
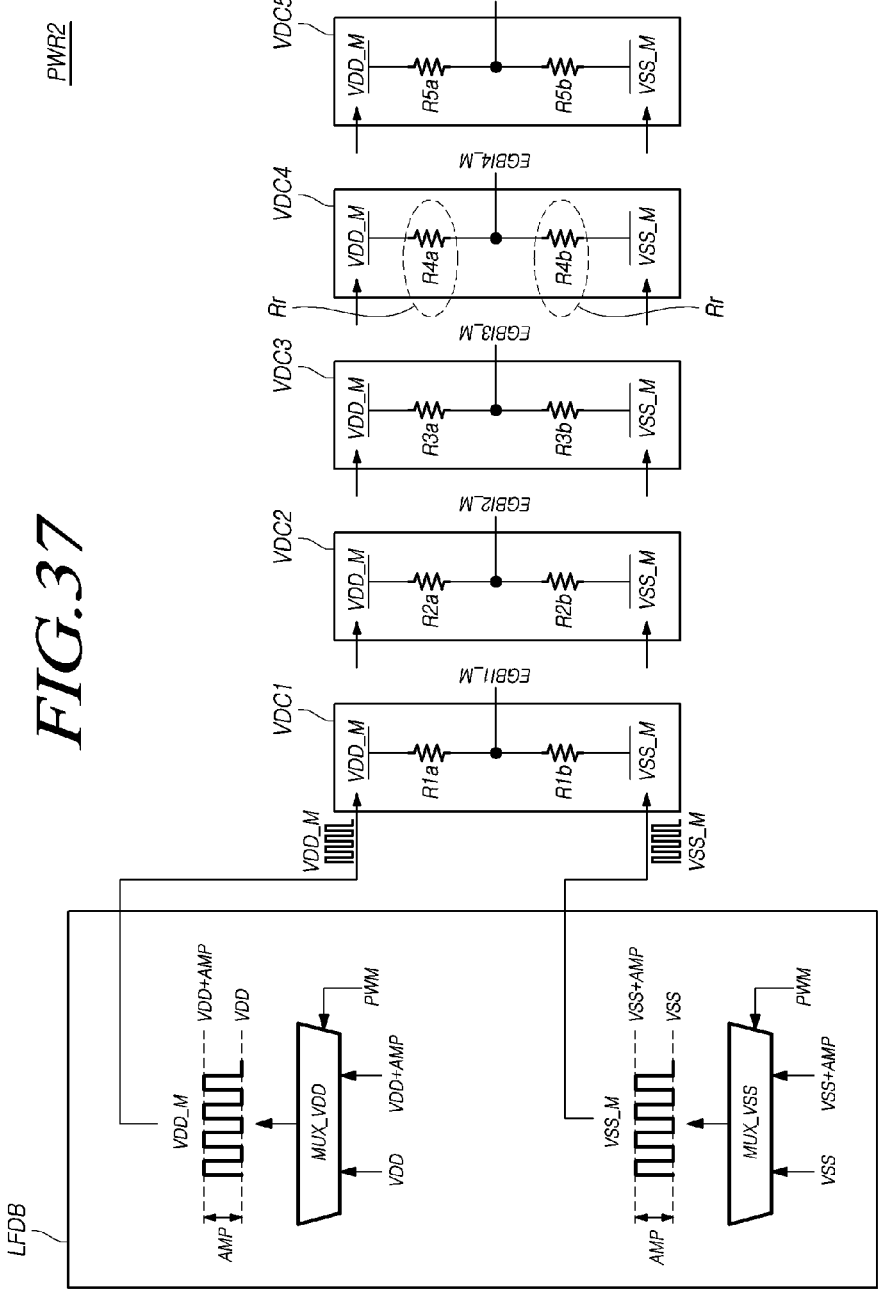
FIGS. 37 and 38 are diagrams illustrating a sensing method based on signal characteristics control in relation to the second power circuit, designed to improve touch sensing performance in the edge area in the touchscreen display device according to embodiments.
Figure 38:
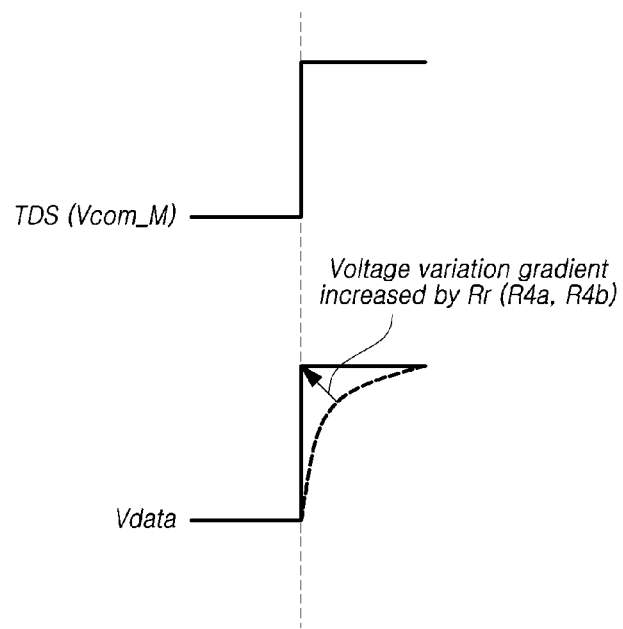
Figure 39:
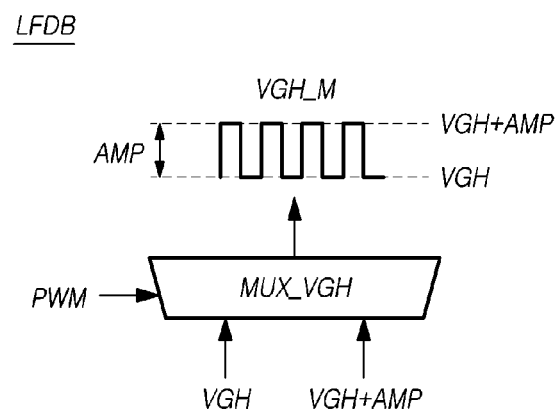
FIG. 39 is a diagram illustrating a circuit generating the turn-on-level gate voltage in the second power circuit of the touchscreen display device according to embodiments.

3-2) Sensing Based on Signal Characteristics Control in Relation to Second Power Circuit FIGS. 37 and 38 are diagrams illustrating a sensing method based on signal characteristics control in relation to the second power circuit PWR2, designed to improve touch sensing performance in the edge area in the touchscreen display device according to embodiments. FIG. 39 is a diagram illustrating a circuit generating the turn-on-level gate voltage VGH_M in the second power circuit PWR2 of the touchscreen display device according to embodiments.

Referring to FIG. 37, the touchscreen display device according to embodiments may include: the display panel DISP including the plurality of data lines DL, the plurality of gate lines GL, the plurality of touch electrodes TE, and the plurality of touch lines TL; the gate driving circuit GDC sequentially outputting the gate signals Vgate to the plurality of gate lines GL; the data driving circuit DDC outputting the data signals Vdata, converted from the digital image signal (i.e. image data) in response to the gamma reference voltage EGBI_M, to the plurality of data lines DL; and the touch driving circuit TDC outputting the touch electrode driving signal TDS to at least one touch electrode TE among the plurality of touch electrodes TE.

Referring to FIG. 37, the touch power circuit TPC of the touchscreen display device according to embodiments may include: the first power circuit PWR1 supplying the touch electrode driving signal TDS to the touch driving circuit TDC; and the second power circuit PWR2 supplying the plurality of gamma reference voltages EGBI1_M, EGBI2_M, EGBI3_M, and EGBI4_M modulated to have signal characteristics corresponding to those of the touch electrode driving signal TDS, to the data driving circuit DDC. The plurality of gamma reference voltages EGBI1_M, EGBI2_M, EGBI3_M, and EGBI4_M may be two gamma reference voltages or four gamma reference voltages. Hereinafter, the plurality of gamma reference voltages will be described as being four gamma reference voltages as an example.

One or more signal characteristics, such as the frequency, phase, and amplitude, of the plurality of gamma reference voltages EGBI1_M, EGBI2_M, EGBI3_M, and EGBI4_M may be the same as, or within a predetermined range of, those of the touch electrode driving signal TDS.

As described above with reference to FIG. 17, the touch power circuit TPC may include the voltage distribution circuits VDC1, VDC2, VDC3, VDC4, and VDC5 generating and outputting the plurality of gamma reference voltages EGBI1_M, EGBI2_M, EGBI3_M, and EGBI4_M and the half driving voltage HVDD_M.

In addition, the touch power circuit TPC may further include the load free driving block LFDB supplying the modulated driving voltage VDD_M and the modulated base voltage VSS_M to the first to fifth voltage distribution circuits VDC1, VDC2, VDC3, VDC4, and VDC5.

Referring to FIG. 37, the voltage distribution circuits VDC1, VDC2, VDC3, VDC4, and VDC5 and the load free driving block LFDB may be included in the second power circuit PWR2 of the touch power circuit TPC.

Referring to FIG. 37, the load free driving block LFDB may generate, for example, the modulated driving voltage VDD_M and the modulated base voltage VSS_M using the multiplexers MUX_VDD and MUX_VSS.

Each of the modulated driving voltage VDD_M and the modulated base voltage VSS_M may be modulated to have a signal waveform corresponding to that of the touch electrode driving signal TDS.

Each of the modulated driving voltage VDD_M and the modulated base voltage VSS_M may have swing characteristics, such as a frequency, phase, or amplitude, corresponding to those of the touch electrode driving signal TDS.

Referring to FIG. 37, the touchscreen display device may further include rapid resistors Rr disposed on a path through which one or more gamma reference voltages among the plurality of gamma reference voltages EGBI1_M, EGBI2_M, EGBI3_M, and EGBI4_M are transferred from the second power circuit PWR2 of the touch power circuit TPC to the data driving circuit DDC or disposed in the second power circuit PWR2.

As described above, the rapid resistors Rr are disposed on the path on which one or more gamma reference voltages among the plurality of gamma reference voltages EGBI1_M, EGBI2_M, EGBI3_M, and EGBI4_M are generated or one or more gamma reference voltage among the plurality of gamma reference voltages EGBI_M are transferred, such that the low voltage variation rate of the data signals Vdata may be increased. Consequently, the voltage variation rate (or voltage variation gradient) of the data signals Vdata may be the same as the voltage variation rate (or voltage variation gradient) of the touch electrode driving signal TDS or similar to a level at which improvements in display performance or touch sensing performance may be enabled.

Referring to FIG. 37, the second power circuit PWR2 may include the plurality of voltage distribution circuits VDC1 to VDC4 outputting the plurality of gamma reference voltages EGBI1_M, EGBI2_M, EGBI3_M, and EGBI4_M as distribution voltages.

The second power circuit PWR2 may further include the voltage distribution circuit VDC5 outputting the half driving voltage HVDD_M as a distribution voltage.

Each of the plurality of voltage distribution circuit VDC1 to VDC5 may include distribution resistors connected between the modulated driving voltage VDD_M and the modulated base voltage VSS_M.

Referring to FIGS. 37 and 15, each of the distribution resistors R4a and R4b in the voltage distribution circuit VDC4 outputting the lowermost gamma reference voltage EGBI4_M, among the plurality of voltage distribution circuit VDC1 to VDC5, may have a lower resistance than the distribution resistors R1a, Rib, R2a, R2b, R1a, R3b, R5a, and R5b in the remaining voltage distribution circuit VDC1 to VDC3 and VDC5.

Referring to FIGS. 37 and 15, each of the distribution resistors R4a and R4b in the voltage distribution circuit VDC4 outputting the lowermost gamma reference voltage EGBI4_M, among the plurality of voltage distribution circuit VDC1 to VDC5, may be rapid resistors Rr accelerating the low voltage variation rate of the data signals Vdata.

For example, the plurality of gamma reference voltages EGBI1_M, EGBI2_M, EGBI3_M, and EGBI4_M may include the first gamma reference voltage EGBI1_M, the second gamma reference voltage EGBI2_M, the third gamma reference voltage EGBI3_M, and the fourth gamma reference voltage EGBI4_M.

The second power circuit PWR2 may include the first voltage distribution circuit VDC1, the second voltage distribution circuit VDC2, the third voltage distribution circuit VDC3, and the fourth voltage distribution circuit VDC4.

The first voltage distribution circuit VDC1 includes first distribution resistors R1a and R1b connected between the modulated driving voltage VDD_M and the modulated base voltage VSS_M. The first voltage distribution circuit VDC1 may output the first gamma reference voltage EGBI1_M at a point, at which the first distribution resistors R1a and R1b are connected, as a distribution voltage.

The second voltage distribution circuit VDC2 includes second distribution resistors R2a and R2b connected between the modulated driving voltage VDD_M and the modulated base voltage VSS_M. The second voltage distribution circuit VDC2 may output the second gamma reference voltage EGBI2_M at a point, at which the second distribution resistors R2a and R2b are connected, as a distribution voltage.

The third voltage distribution circuit VDC3 includes third distribution resistors R3a and R3b connected between the modulated driving voltage VDD_M and the modulated base voltage VSS_M. The voltage distribution circuit VDC3 may output the third gamma reference voltage EGBI3_M at a point, at which the third distribution resistors R3a and R3b are connected, as a distribution voltage.

The fourth voltage distribution circuit VDC4 includes fourth distribution resistors R4a and R4b connected between the modulated driving voltage VDD_M and the modulated base voltage VSS_M. The fourth voltage distribution circuit VDC4 may output the fourth gamma reference voltage EGBI4_M at a point, at which the fourth distribution resistors R4a and R4b are connected, as a distribution voltage.

The fourth gamma reference voltage EGBI4_M may be the lowest voltage value from among the first gamma reference voltage EGBI1_M, the second gamma reference voltage EGBI2_M, the third gamma reference voltage EGBI3_M, and the fourth gamma reference voltage EGBI4_M.

The fourth distribution resistors R4a and R4b may have the lowest resistances from among the first distribution resistors R1a and R1b, the second distribution resistors R2a and R2b, the third distribution resistors R3a and R3b, and the fourth distribution resistors R4a and R4b.

The fourth distribution resistors R4a and R4b, from among the first distribution resistors R1a and R1b, the second distribution resistors R2a and R2b, the third distribution resistors R3a and R3b, and the fourth distribution resistors R4a and R4b, may be the rapid resistors Rr intentionally designed to have low resistances.

The second power circuit PWR2 may further include a fifth voltage distribution circuit VDC5 including fifth distribution resistors R5a and R5b connected between the modulated driving voltage VDD_M and the modulated base voltage VSS_M. The fifth voltage distribution circuit VDC5 outputs the half driving voltage HVDD_M at a point, at which the fifth distribution resistors R5a and R5b are connected, as a distribution voltage.

The fourth distribution resistors R4a and R4b, from among the first distribution resistors R1a and R1b, the second distribution resistors R2a and R2b, the third distribution resistors R1a and R3b, the fourth distribution resistors R4a and R4b, and the fifth distribution resistors R5a and R5b, may be the rapid resistors Rr intentionally designed to have low resistances.

Referring to FIG. 37, the load free driving block LFDB of the second power circuit PWR2 may include the driving multiplexer MUX_VDD generating the modulated driving voltage VDD_M, signal characteristics of which correspond to those of the touch electrode driving signal TDS, and the base multiplexer MUX_VSS generating the modulated base voltage VSS_M, signal characteristics of which correspond to those of the touch electrode driving signal TDS.

The driving multiplexer MUX_VDD receives the pulse-width modulated signal PWM having a predetermined frequency, amplitude, phase, or the like, and receives a DC driving voltage VDD and a DC control driving voltage VDD+AMP.

The control driving voltage VDD+AMP is a voltage higher than the driving voltage VDD by a predetermined voltage value AMP. Here, the predetermined voltage value AMP determines the amplitude of the modulated driving voltage VDD_M. In addition, the predetermined voltage value AMP corresponds to the amplitude AMP of the touch electrode driving signal TDS.

The driving multiplexer MUX_VDD may generate the modulated driving voltage VDD_M swinging with a predetermined amplitude AMP between the driving voltage VDD and the control driving voltage VDD+AMP by outputting a base voltage VSS and the control driving voltage VDD+AMP in an alternating manner, according to the frequency or the like of the pulse-width modulated signal PWM.

The base multiplexer MUX_VSS receives the pulse-width modulated signal PWM having a predetermined frequency, amplitude, phase, or the like, and receives the base voltage VSS in the form of a DC voltage and a control base voltage VSS+AMP in the form of a DC voltage.

The control base voltage VSS+AMP is higher than base voltage VSS by the predetermined voltage value AMP. Here, the predetermined voltage value AMP determines the amplitude of the modulated base voltage VSS_M. In addition, the predetermined voltage value AMP corresponds to the amplitude AMP of the touch electrode driving signal TDS.

The base multiplexer MUX_VSS may generate the modulated base voltage VSS_M swinging with the predetermined amplitude AMP between the base voltage VSS and the control base voltage VSS+AMP by outputting the base voltage VSS and the control base voltage VSS+AMP in an alternating manner, according to the frequency or the like of the pulse-width modulated signal PWM.

Referring to FIG. 38, the second power circuit PWR2 included in the touch power circuit TPC generates the latest gamma reference voltage EGBI4_M, from among the plurality of gamma reference voltages EGBI1_M, EGBI2_M, EGBI3_M, and EGBI4_M, by using the rapid resistors Rr and supplies the gamma reference voltage EGBI4_M to the data driving circuit DDC. The data driving circuit DDC generates the data signals Vdata by receiving the plurality of gamma reference voltages EGBI1_M, EGBI2_M, EGBI3_M, and EGBI4_M and supplies the data signals Vdata to the display panel DISP.

Referring to FIG. 38, the voltage variation gradient of the data signals Vdata supplied to the display panel DISP may correspond to the voltage variation gradient of the touch electrode driving signal TDS. That is, the data signals Vdata supplied to the display panel DISP may have a signal waveform, the voltage variation gradient of which is similar to that of the touch electrode driving signal TDS supplied to the display panel DISP.

Referring to FIG. 38, if the fourth distribution resistors R4a and R4b, from among the first distribution resistors R1a and Rib, the second distribution resistors R2a and R2b, the third distribution resistors R1a and R3b, the fourth distribution resistors R4a and R4b, and the fifth distribution resistors R5a and R5b, are not the rapid resistors Rr intentionally designed to have low resistances, the voltage variation gradient of the data signals Vdata supplied to the display panel DISP may be smaller than the voltage variation gradient of the touch electrode driving signal TDS supplied to the display panel DISP. That is, the data signals Vdata supplied to the display panel DISP may have a signal waveform, the voltage variation gradient of which is lower than that of the touch electrode driving signal TDS supplied to the display panel DISP.

The touch power circuit TPC including the first power circuit PWR1 and the second power circuit PWR2 may be implemented as a single TPIC. Alternatively, in the first power circuit PWR1 and the second power circuit PWR2 of the touch power circuit TPC, the first power circuit PWR1 may be included in the TPIC, while the second power circuit PWR2 may be provided outside the TPIC.

Referring to FIG. 39, the load free driving block LFDB of the second power circuit PWR2 may further include a high gate multiplexer MUX_VGH generating and outputting a modulated turn-on level gate voltage VGH_M, the signal characteristics of which correspond to those of the touch electrode driving signal TDS.

The high gate multiplexer MUX_VGH receives the pulse-width modulated signal PWM having a predetermined frequency, amplitude, phase, or the like, and receives the high-level gate voltage VGH in the form of a DC voltage and a control and high-level gate voltage VGH+AMP in the form of a DC voltage.

The control and high-level gate voltage VGH+AMP is higher than the high-level gate voltage VGH by the predetermined voltage value AMP. Here, the predetermined voltage value AMP determines the amplitude of the modulated turn-on-level gate voltage VGH_M. In addition, the predetermined voltage value AMP corresponds to the amplitude AMP of the touch electrode driving signal TDS.

The base multiplexer MUX_VSS may output the high-level gate voltage VGH and the control and high-level gate voltage VGH+AMP in an alternating manner, according to the frequency or the like of the pulse-width modulated (PWM), thereby generating the modulated turn-on-level gate voltage VGH_M swinging with a predetermined amplitude AMP between the high-level gate voltage VGH and the control and high-level gate voltage VGH+AMP.

Figure 40:
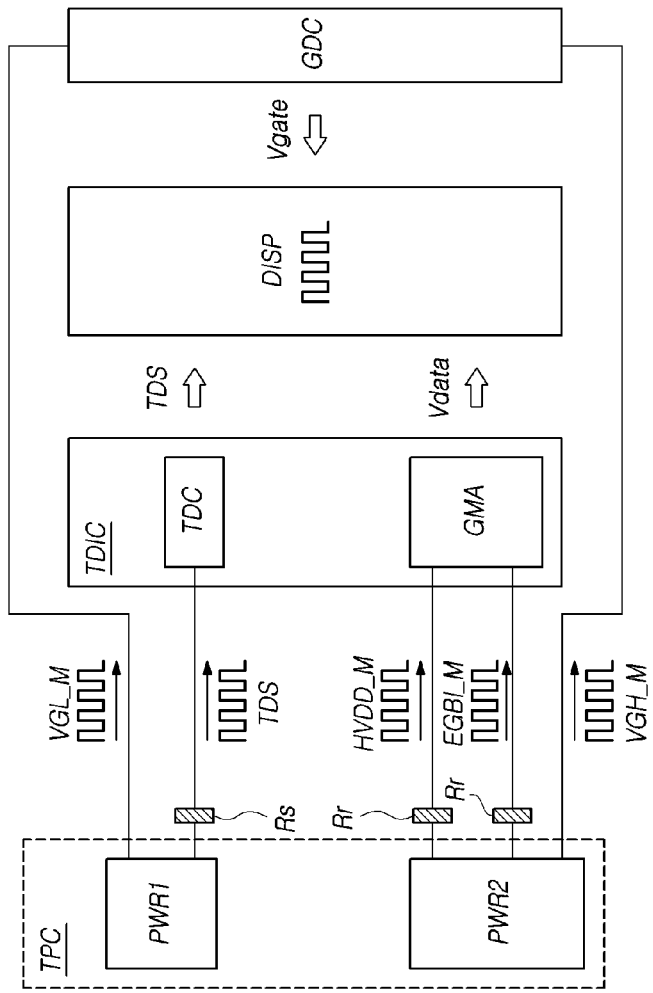
FIG. 40 is a diagram illustrating a differential sensing method based on signal characteristics control in relation to the first power circuit and the second power circuit, designed to improve touch sensing performance in the edge area in the touchscreen display device according to embodiments.

FIG. 40 is a diagram illustrating a differential sensing method based on signal characteristics control in relation to the first power circuit PWR1 and the second power circuit PWR2, designed to improve touch sensing performance in the edge area in the touchscreen display device according to embodiments.

Referring to FIG. 40, the touchscreen display device according to embodiments may include all of the at least one resistor Rs and the rapid resistors Rr. The at least one resistor Rs are disposed on a path through the touch electrode driving signal TDS is transferred from the first power circuit PWR1 to the display panel DISP through the touch driving circuit TDC. The rapid resistors Rr are disposed on a path through which one or more gamma reference voltages among the plurality of gamma reference voltages EGBI1_M, EGBI2_M, EGBI3_M, and EGBI4_M and the half driving voltage HVDD_M are transferred from the second power circuit PWR2 of the touch power circuit TPC to the data driving circuit DDC or are disposed in the second power circuit PWR2.

As set forth above, according to the embodiments, the image display and the touch sensing may be simultaneously performed in an efficient manner.

According to the embodiments, it may be possible to minimize or remove the interference between display driving and touch driving while simultaneously performing the image display and the touch sensing, thereby obtaining excellent image display and touch sensing performance.

According to the embodiments, even in the case in which the touch sensing is performed simultaneously with the image display, the touch sensing may be performed so as to minimize the influence of the display driving.

According to the embodiments, it may be possible to reduce poor touch sensitivity from occurring in a specific area (e.g. an edge area). In particular, touch sensing performance in the edge area adjacent to the touch driving circuit TDC may be improved.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A touchscreen display device comprising:
a display panel including a plurality of data lines, a plurality of gate lines, a plurality of touch electrodes, and a plurality of touch lines; and
a touch driving circuit located on one side of the display panel, electrically connected to the plurality of touch electrodes through the plurality of touch lines, and configured to differentially sense at least two touch electrodes selected from among the plurality of touch electrodes,
wherein the plurality of touch electrodes include n number of touch electrodes disposed in order, a first touch electrode among the n number of touch electrodes being disposed farthest from the touch driving circuit, and an nth touch electrode among the n number of touch electrodes being disposed closest to the touch driving circuit, wherein n is an integer greater than or equal to 3, and
during a first sensing timing period, the touch driving circuit is configured to differentially sense a third touch electrode selected as a sensing touch electrode from among the n number of touch electrodes and a second touch electrode selected as a reference touch electrode from among the n number of touch electrodes, and is configured to differentially sense the first touch electrode selected as a sensing touch electrode from among the n number of touch electrodes and the nth touch electrode selected as a reference touch electrode from among the n number of touch electrodes, wherein, in a touch electrode pair in which the first touch electrode is the sensing touch electrode and the nth touch electrode is the reference touch electrode, the reference touch electrode has a smaller time constant than that of the sensing touch electrode, and in another touch electrode pair other than the touch electrode pair in which the first touch electrode is the sensing touch electrode and the nth touch electrode is the reference touch electrode, the reference touch electrode has a greater time constant than that of the sensing touch electrode.

2. The touchscreen display device according to claim 1, wherein, during a second sensing timing period different from the first sensing timing period, the touch driving circuit is configured to differentially sense the nth touch electrode selected as a sensing touch electrode from among the n number of touch electrodes and an (n−1)th touch electrode selected as a reference touch electrode from among the n number of touch electrodes.

3. The touchscreen display device according to claim 1, wherein, during a second sensing timing period different from the first sensing timing period, the touch driving circuit is configured to differentially sense the second touch electrode selected as a sensing touch electrode from among the n number of touch electrodes and the first touch electrode selected as a reference touch electrode from among the n number of touch electrodes.

4. The touchscreen display device according to claim 1, wherein the touch driving circuit includes:

a differential amplifier configured to differentially sense two touch electrodes selected from among the plurality of touch electrodes; and a first correction resistor and a second correction resistor configured to be respectively electrically connected between the two touch electrodes and the differential amplifier, wherein, during the first sensing timing period, the differential amplifier is configured to differentially sense the first touch electrode selected as the sensing touch electrode and the nth touch electrode selected as the reference touch electrode, the first correction resistor is configured to be electrically connected between the nth touch electrode selected as the reference touch electrode and the differential amplifier, the second correction resistor is configured to be electrically connected between the first touch electrode selected as the sensing touch electrode and the differential amplifier, and the first correction resistor and the second correction resistor are variable resistors.

5. The touchscreen display device according to claim 4, wherein, during the first sensing timing period, the first correction resistor is configured to have a higher resistance than the second correction resistor.

6. The touchscreen display device according to claim 5, wherein, during a second sensing timing period different from the first sensing timing period, the differential amplifier is configured to differentially sense the nth touch electrode selected as the sensing touch electrode and an (n−1)th touch electrode selected as the reference touch electrode, the first correction resistor is configured to be electrically connected between the (n−1)th touch electrode selected as the reference touch electrode and the differential amplifier, and the second correction resistor is configured to be electrically connected between the nth touch electrode selected as the sensing touch electrode and the differential amplifier.

7. The touchscreen display device according to claim 6, wherein, during the second sensing timing period, the second correction resistor is configured to have a higher resistance than the first correction resistor.

8. A touchscreen display device comprising:

a display panel including a plurality of data lines, a plurality of gate lines, a plurality of touch electrodes, and a plurality of touch lines;

a gate driving circuit configured to sequentially output gate signals to the plurality of gate lines;

a data driving circuit configured to output data signals, converted from digital image signals in response to a gamma reference voltage, to the plurality of data lines;

a touch driving circuit configured to output a touch electrode driving signal to at least one touch electrode among the plurality of touch electrodes;

a first power circuit configured to supply the touch electrode driving signal to the touch driving circuit;

a second power circuit configured to supply a half driving voltage and the gamma reference voltage, signal characteristics of which correspond to those of the touch electrode driving signal, to the data driving circuit; and a delay resistor configured to be disposed on a path through which the touch electrode driving signal is transferred from the first power circuit to the display panel through the touch driving circuit, wherein for digital-to-analog conversion of the digital image signals, the data driving circuit uses the gamma reference voltage and the half driving voltage output from the second power circuit different from the first power circuit supplying the touch electrode driving signal.

9. The touchscreen display device according to claim 8, wherein a voltage variation gradient of the touch electrode driving signal between the delay resistor and the display panel is smaller than a voltage variation gradient of the touch electrode driving signal between the first power circuit and the delay resistor.

10. The touchscreen display device according to claim 8, wherein the delay resistor is disposed on a printed circuit between the first power circuit and the touch driving circuit or is connected to an output port of the first power circuit.

11. The touchscreen display device according to claim 8, wherein the first power circuit is included in a touch power integrated circuit, and the second power circuit is provided outside the touch power integrated circuit.

12. A touchscreen display device comprising:

a display panel including a plurality of data lines, a plurality of gate lines, a plurality of touch electrodes, and a plurality of touch lines;

a gate driving circuit configured to sequentially output gate signals to the plurality of gate lines;

a data driving circuit configured to output data signals, converted from digital image signals in response to a plurality of gamma reference voltages, to the plurality of data lines;

a touch driving circuit configured to output a touch electrode driving signal to at least one touch electrode among the plurality of touch electrodes;

a first power circuit configured to supply the touch electrode driving signal to the touch driving circuit;

a second power circuit configured to supply the plurality of gamma reference voltages, signal characteristics of which correspond to those of the touch electrode driving signal, to the data driving circuit; and rapid resistors configured to be disposed on a circuit generating one or more gamma reference voltages among the plurality of gamma reference voltages or disposed on a path through which one or more gamma reference voltages among the plurality of gamma reference voltages are transferred, wherein the second power circuit includes a plurality of voltage distribution circuits configured to output the plurality of gamma reference voltages as distribution voltages, each of the plurality of voltage distribution circuits includes distribution resistors connected between a modulation driving voltage and a modulated base voltage, the distribution resistors in a voltage distribution circuit configured to output a lowest gamma reference voltage, among the plurality of voltage distribution circuits, have a lower resistance than the distribution resistors in remaining voltage distribution circuits among the plurality of voltage distribution circuits, and the distribution resistors in a voltage distribution circuit configured to output a lowest gamma reference voltage, among the plurality of voltage distribution circuits, are the rapid resistors.

13. The touchscreen display device according to claim 12, wherein a voltage variation gradient of the data signals corresponds to a voltage variation gradient of the touch electrode driving signal.

14. The touchscreen display device according to claim 12, wherein each of the modulated driving voltage and the modulated base voltage has signal characteristics corresponding to those of the touch electrode driving signal.

15. The touchscreen display device according to claim 14, wherein the second power circuit includes a driving multiplexer configured to generate the modulated driving voltage, signal characteristics of which correspond to those of the touch electrode driving signal, and a base multiplexer configured to generate the modulated base voltage, signal characteristics of which correspond to those of the touch electrode driving signal.

16. The touchscreen display device according to claim 12, wherein the first power circuit is configured to be included in a touch power integrated circuit, and the second power circuit is configured to be provided outside the touch power integrated circuit.

17. A method of driving a touchscreen display device including a display panel including a plurality of data lines, a plurality of gate lines, a plurality of touch electrodes, and a plurality of touch lines, the method comprising:

differentially sensing, by a touch driving circuit in the touchscreen display device, two touch electrodes selected from among the plurality of touch electrodes; and detecting a touch according to a result of the differential sensing, wherein the plurality of touch electrodes include n number of touch electrodes disposed in order, a first touch electrode among the n number of touch electrodes being disposed farthest from the touch driving circuit, and an nth touch electrode among the n number of touch electrodes being disposed closest to the touch driving circuit, wherein n is an integer greater than or equal to 3, wherein, in the differential sensing, the touch driving circuit differentially senses a third touch electrode selected as a sensing touch electrode from among the n number of touch electrodes and a second touch electrode selected as a reference touch electrode from among the n number of touch electrodes, and differentially senses the first touch electrode selected as a sensing touch electrode from among the n number of touch electrodes and the nth touch electrode selected as a reference touch electrode from among the n number of touch electrodes, and wherein, in a touch electrode pair in which the first touch electrode is the sensing touch electrode and the nth touch electrode is the reference touch electrode, the reference touch electrode has a smaller time constant than that of the sensing touch electrode, and in another touch electrode pair other than the touch electrode pair in which the first touch electrode is the sensing touch electrode and the nth touch electrode is the reference touch electrode, the reference touch electrode has a greater time constant than that of the sensing touch electrode.

18. A touch driving circuit of a touchscreen display device including a display panel including a plurality of data lines, a plurality of gate lines, a plurality of touch electrodes, and a plurality of touch lines, the touch driving circuit comprises:

a differential amplifier configured to differentially sense two touch electrodes selected from among the plurality of touch electrodes; and an analog-to-digital converter configured to output a sensing value in accordance with an output signal of the differential amplifier, wherein the touch driving circuit is located on one side of the display panel, the plurality of touch electrodes include n number of touch electrodes disposed in order, wherein n is an integer greater than or equal to 3, a first touch electrode among the n number of touch electrodes is disposed farthest from the touch driving circuit, and an nth touch electrode among the n number of touch electrodes being disposed closest to the touch driving circuit, and the differential amplifier is configured to differentially sense a third touch electrode selected as a sensing touch electrode from among the n number of touch electrodes and a second touch electrode selected as a reference touch electrode from among the n number of touch electrodes, and is configured to differentially sense the first touch electrode selected as a sensing touch electrode from among the n number of touch electrodes and the nth touch electrode selected as a reference touch electrode from among the n number of touch electrodes, wherein, in a touch electrode pair in which the first touch electrode is the sensing touch electrode and the nth touch electrode is the reference touch electrode, the reference touch electrode has a smaller time constant than that of the sensing touch electrode, and in another touch electrode pair other than the touch electrode pair in which the first touch electrode is the sensing touch electrode and the nth touch electrode is the reference touch electrode, the reference touch electrode has a greater time constant than that of the sensing touch electrode.

* * * * *